(12) United States Patent
Higginson

(10) Patent No.: US 11,383,809 B2
(45) Date of Patent: Jul. 12, 2022

(54) WIND-PROPELLED BOAT HAVING PARALLEL SELF-RIGHTING PAIRED MASTS FOR WIND-ASSISTED PROPULSION FOR BOATS

(71) Applicant: Timothy B. Higginson, Cohasset, MA (US)

(72) Inventor: Timothy B. Higginson, Cohasset, MA (US)

(73) Assignee: Timothy B. Higginson, Cohasset, MA (US)

( * ) Notice: Subject to any disclaimer, the term of this patent is extended or adjusted under 35 U.S.C. 154(b) by 213 days.

(21) Appl. No.: 16/795,948

(22) Filed: Feb. 20, 2020

(65) Prior Publication Data

US 2020/0262530 A1 Aug. 20, 2020

Related U.S. Application Data

(60) Provisional application No. 62/808,138, filed on Feb. 20, 2019.

(51) Int. Cl.
*B63H 9/061* (2020.01)
*B63B 15/00* (2006.01)
*G06N 20/00* (2019.01)
*B63H 9/08* (2006.01)

(52) U.S. Cl.
CPC ......... *B63H 9/061* (2020.02); *B63B 15/0083* (2013.01); *G06N 20/00* (2019.01); *B63B 2015/0058* (2013.01); *B63B 2015/0066* (2013.01); *B63H 2009/082* (2013.01)

(58) Field of Classification Search
CPC ............ B63B 15/00; B63B 2015/0016; B63B 2015/005; B63B 15/0083; B63B 2015/0025; B63B 2015/0058; B63B 2015/0066; B63H 9/04; B63H 9/06; B63H 9/061; B63H 9/08; B63H 2009/082; G06N 20/00
USPC .............................................. 114/114, 89, 90
See application file for complete search history.

(56) References Cited

U.S. PATENT DOCUMENTS 4,467,699 A * 8/1984 LeBlanc ............... F01B 11/006
91/231
4,562,784 A * 1/1986 Lineback ................. B63H 9/10
114/91

\* cited by examiner

*Primary Examiner* — Daniel V Venne
(74) *Attorney, Agent, or Firm* — Leydig, Voit & Mayer, Ltd.

(57) ABSTRACT

A wind-propelled vessel is described herein. The vessel includes at least one hull and at least one set of paired masts. Each paired mast of the at least one set of paired masts has a first mast located to one side of the vessel and a second mast located on the opposite side of the vessel. Also, each mast of the at least one set of paired masts has a spar located at or near the top of the mast. Moreover, each one of the spar located at or near the top of the mast extends inwards towards a center plane of the vessel, and an inward end of the spar is connected by a connector to another inward end of another one of the each one of the spar located at or near the top of the mast. In accordance with the illustrative examples provided herein, the connector imparts a dynamic force upon connected spars that responsively pulls the connected ones of the inward ends of the spars to their nearest position when tops of the masts to which the spars are fixably attached move away from a relative nearest position to a paired one of one set of paired masts.

15 Claims, 52 Drawing Sheets

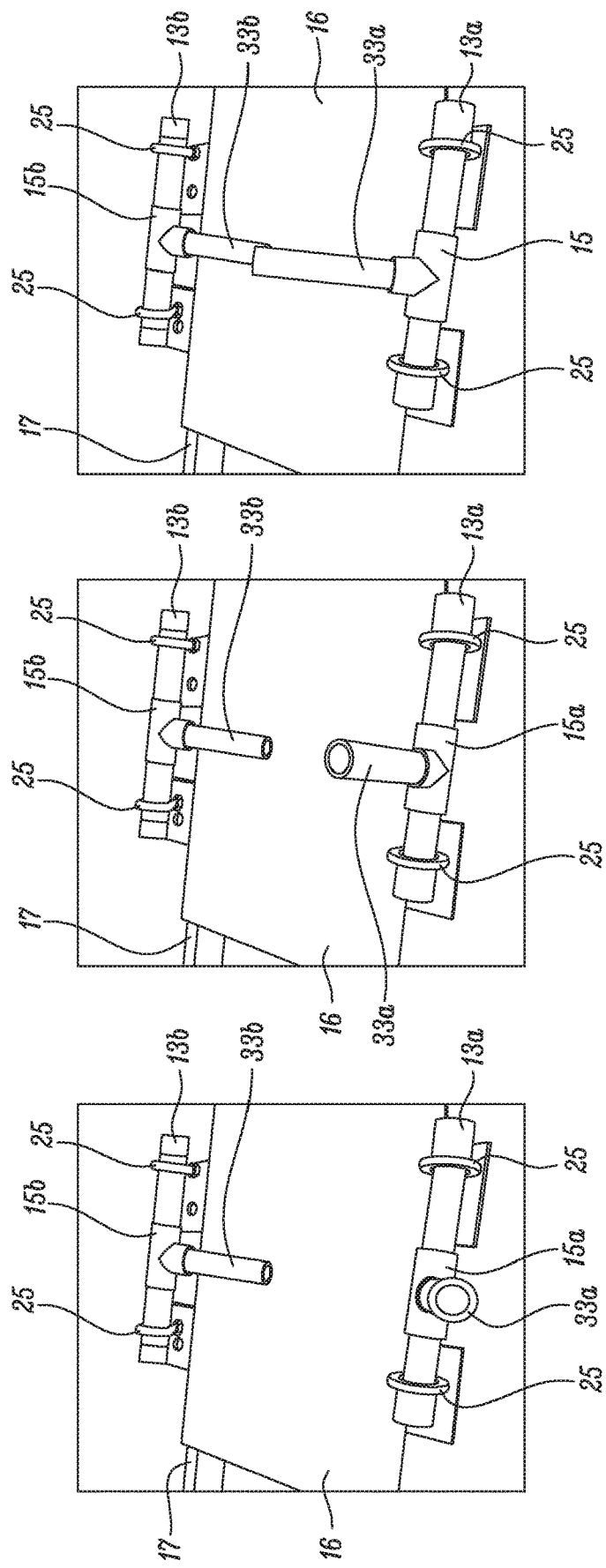

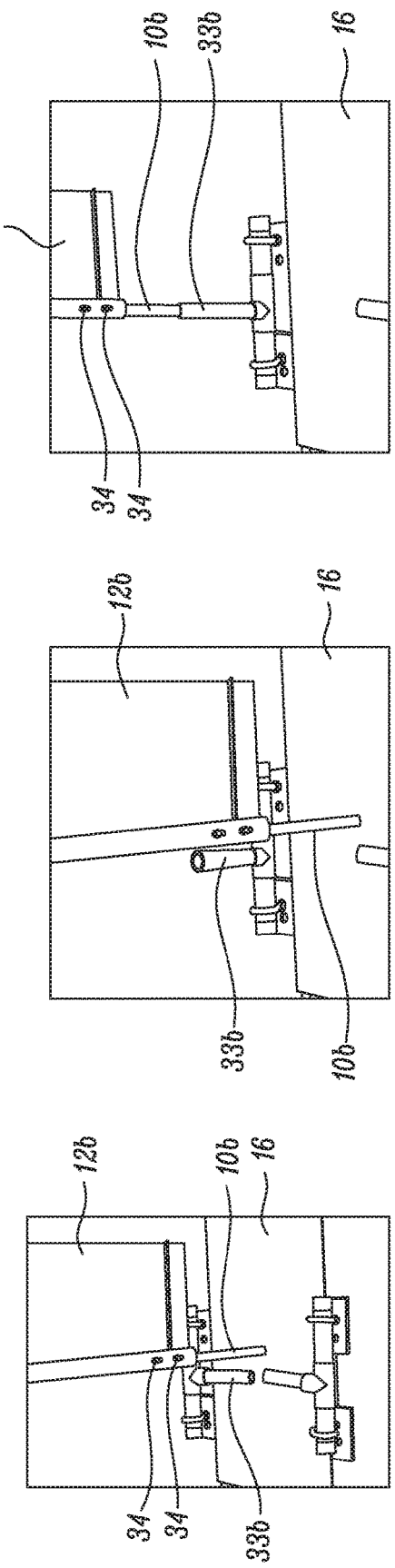
FIG. 42a
FIG. 42b
FIG. 42c
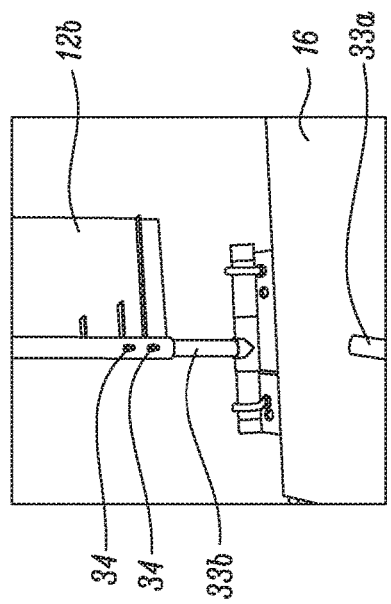
FIG. 42d
FIG. 42e

WIND-PROPELLED BOAT HAVING PARALLEL SELF-RIGHTING PAIRED MASTS FOR WIND-ASSISTED PROPULSION FOR BOATS

CROSS REFERENCE TO RELATED APPLICATIONS

This application is a non-provisional of, and claims the priority of, U.S. Provisional Application No. 62/808,138, filed on Feb. 20, 2019, entitled "Parallel Self-Righting Paired Masts for Wind-Assisted Propulsion for Boats", the contents of which are hereby incorporated by reference in their entirety.

TECHNICAL FIELD

The present disclosure generally relates to masts for vessels, and more particularly, the disclosure relates to an improved design of a parallel (dual side-by-side self-righting paired masts for wind-assisted propulsion for sail-powered and sail-assisted boats.

BACKGROUND OF THE INVENTION

People have been sailing in boats for thousands of years and for many reasons, including transportation of goods, fishing, exploration, scientific research, naval offense and defense, sports and competition, and general enjoyment of the oceans, seas and other bodies of water.

Generally, sailboat design from antiquity to the present involves one or more masts aligned fore-and-aft along the center axis of the main body of the boat. This design requires extensive rigging from the mast to the sides of the boats, in addition to fore-and-aft rigging. The combined side-to-side and fore-and-aft rigging serves to orient and maintain the masts in an upright position, enabling them to hold the sails in proper position and to manage the loads put on the sails and masts by the wind in the sails, all such that the lift generating by the wind in the sails translates to power the boat to move through the water in the desired direction.

For some small sailing vessels, such as wind surfers, the sail is located along the center long axis of the main body of the boat, but the mast is moveably attached to the hull at a specific location, has no rigging, and, instead, is supported by the counter-weight and body-position of the sailor.

For some types of outrigger boats, the mast may be positioned on the fore-and-after centerline of the main (generally, larger) of the two hulls.

For boats, such as cargo ships and multi-hull cruising sailboats where a substantial superstructure and/or cargo is located across and rising above much of the surface area of the deck, the location of one more masts located fore-and-aft along the centerline of the hull presents inherent and difficult comprises in terms of allocation of space and supporting structures. The footing of such masts and the supporting structure at the foot of the such masts (frequently going from the deck, through any superstructure, through the hull and down to or near the base of the hull) significantly impair the ability to utilize all those spaces for other purposes. The sail area of such masts further impairs the ability to utilize the space above the deck for superstructure and cargo, or, alternatively, the sail area is reduced thereby impairing the sailing qualities of the boat. Further, sail booms and the rigging for such masts additionally requires allocating substantial space for those purposes instead of such uses as for superstructure, cargo and space for people's activities.

In the context of scientific studies showing serious degradation of oceans and other waterways caused in part by boats with combustion engines and boats driven by propellers (causing, for instance, acoustic interference with orcas and other marine life, as well as compromised mixing of surface and subsurface ocean layers) and other motor-driven propulsion systems, advances in and broadened application of sail/wind powered systems for a wide range of boat designs (everything from small and large inflatable hull boats and recreational daysailers to the most advanced racing sailboats to large cargo container ships and cruise ships) become imperatives.

BRIEF SUMMARY OF THE INVENTION

Illustrative examples are provided herein of a vessel that includes at least one hull and at least one set of paired masts. Each paired mast of the at least one set of paired masts has a first mast located to one side of the vessel and a second mast located on the opposite side of the vessel. Also, each mast of the at least one set of paired masts has a spar located at or near the top of the mast. Moreover, each one of the spar located at or near the top of the mast extends inwards towards a center plane of the vessel, and an inward end of the spar is connected by a connector to another inward end of another one of the each one of the spar located at or near the top of the mast. In accordance with the illustrative examples provided herein, the connector imparts a dynamic force upon connected spars that responsively pulls the connected ones of the inward ends of the spars to their nearest position when tops of the masts to which the spars are fixably attached move away from a relative nearest position to a paired one of one set of paired masts.

BRIEF DESCRIPTION OF THE DRAWING(S)

While the appended claims set forth the aspects of the present invention with particularity, the invention and its advantages are best understood from the following detailed description taken in conjunction with the accompanying drawings, of which:

Figure 8:
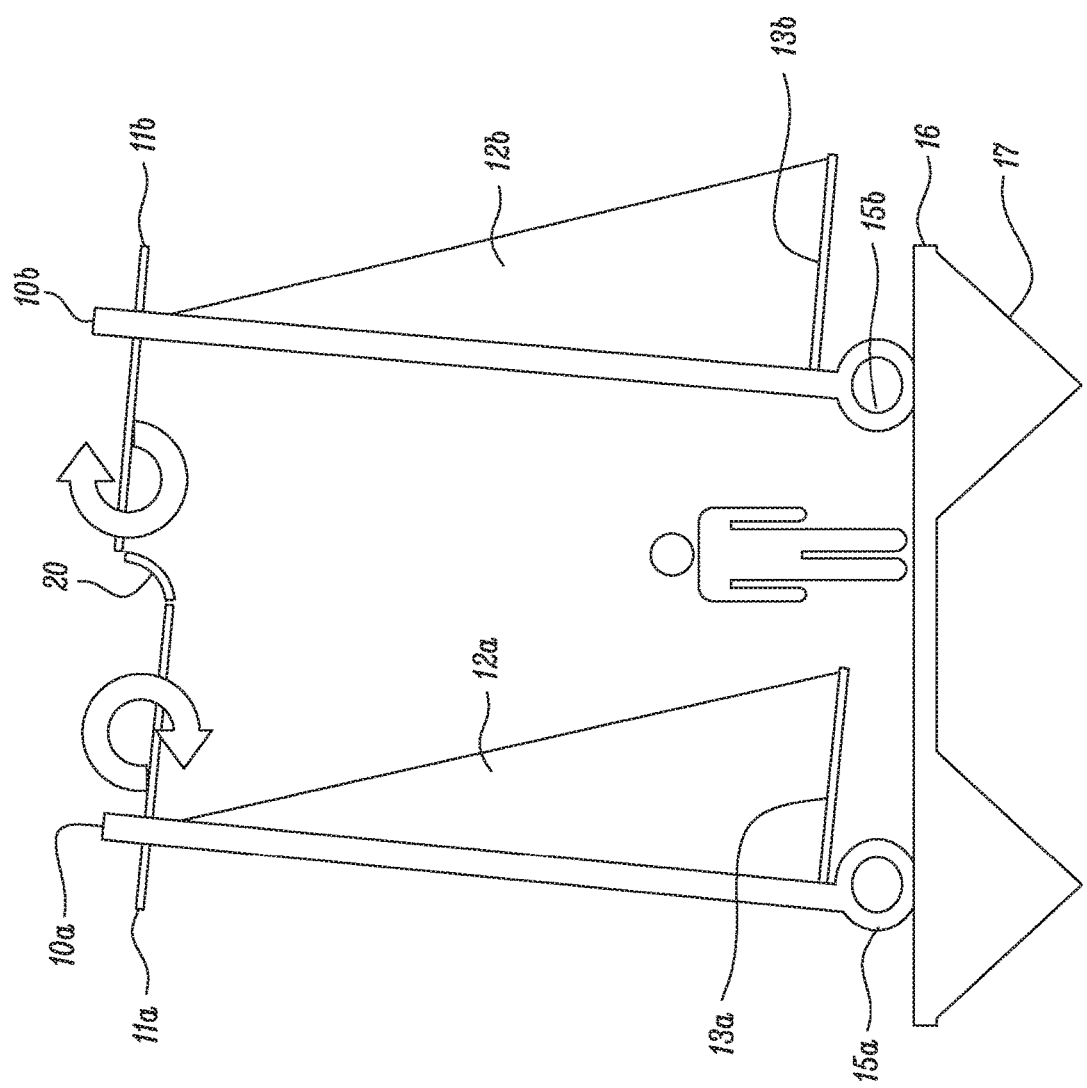
Figure 9:
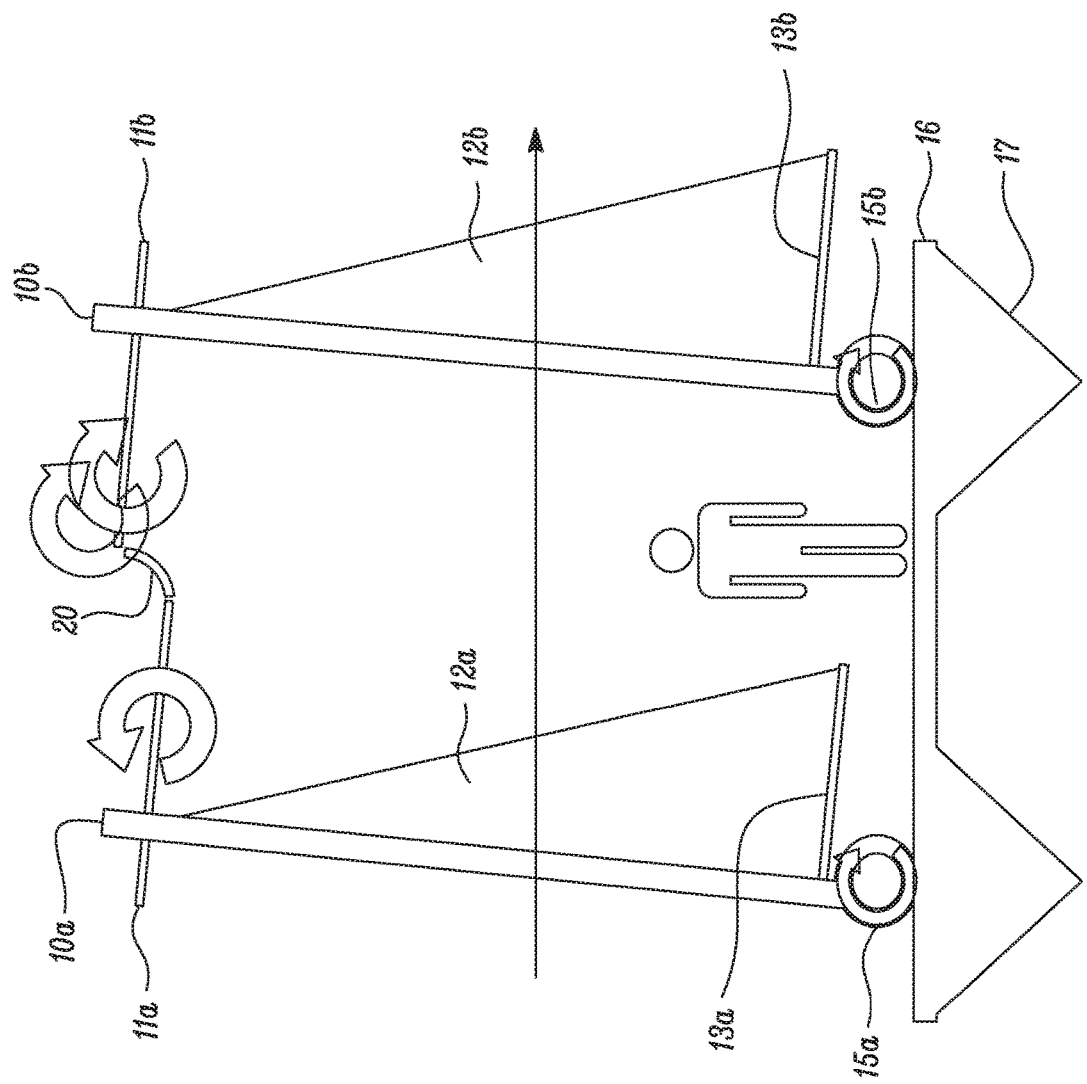
Figure 10:
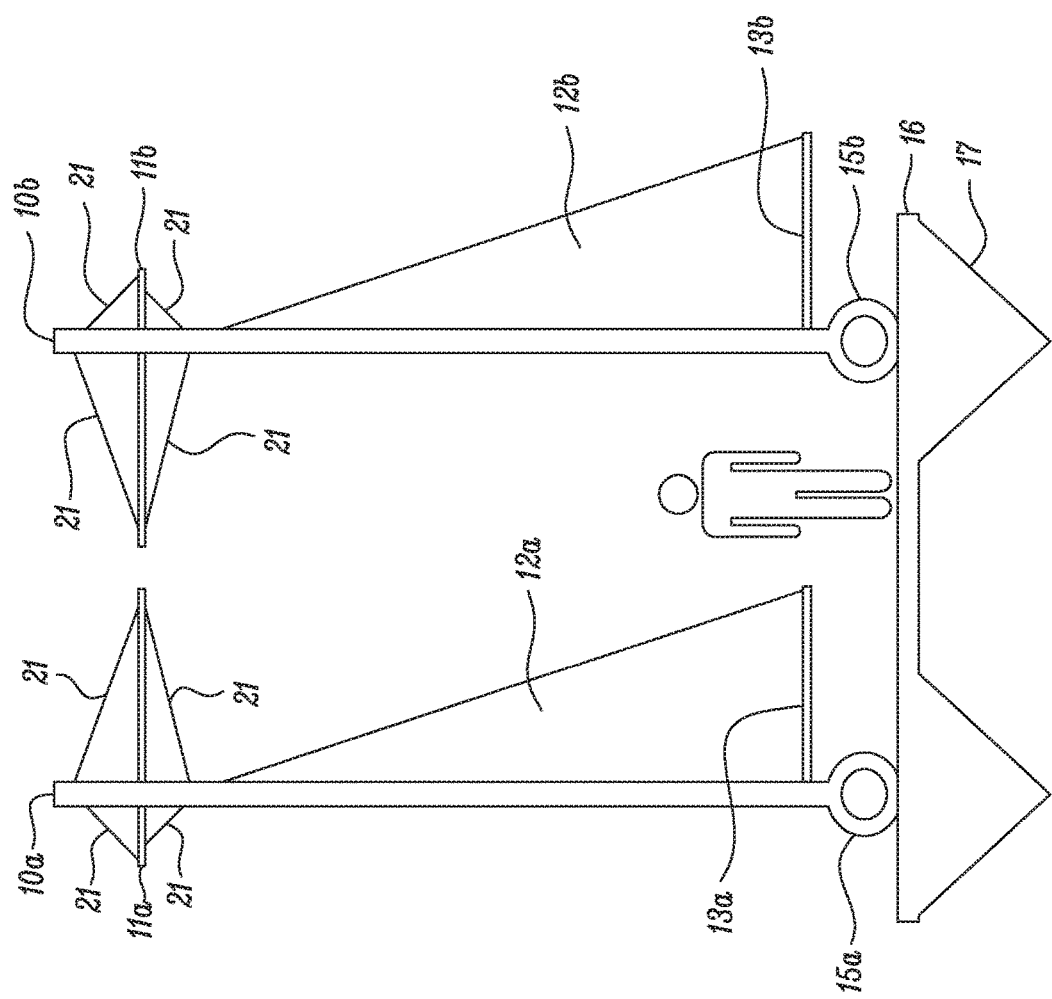
Figure 11:
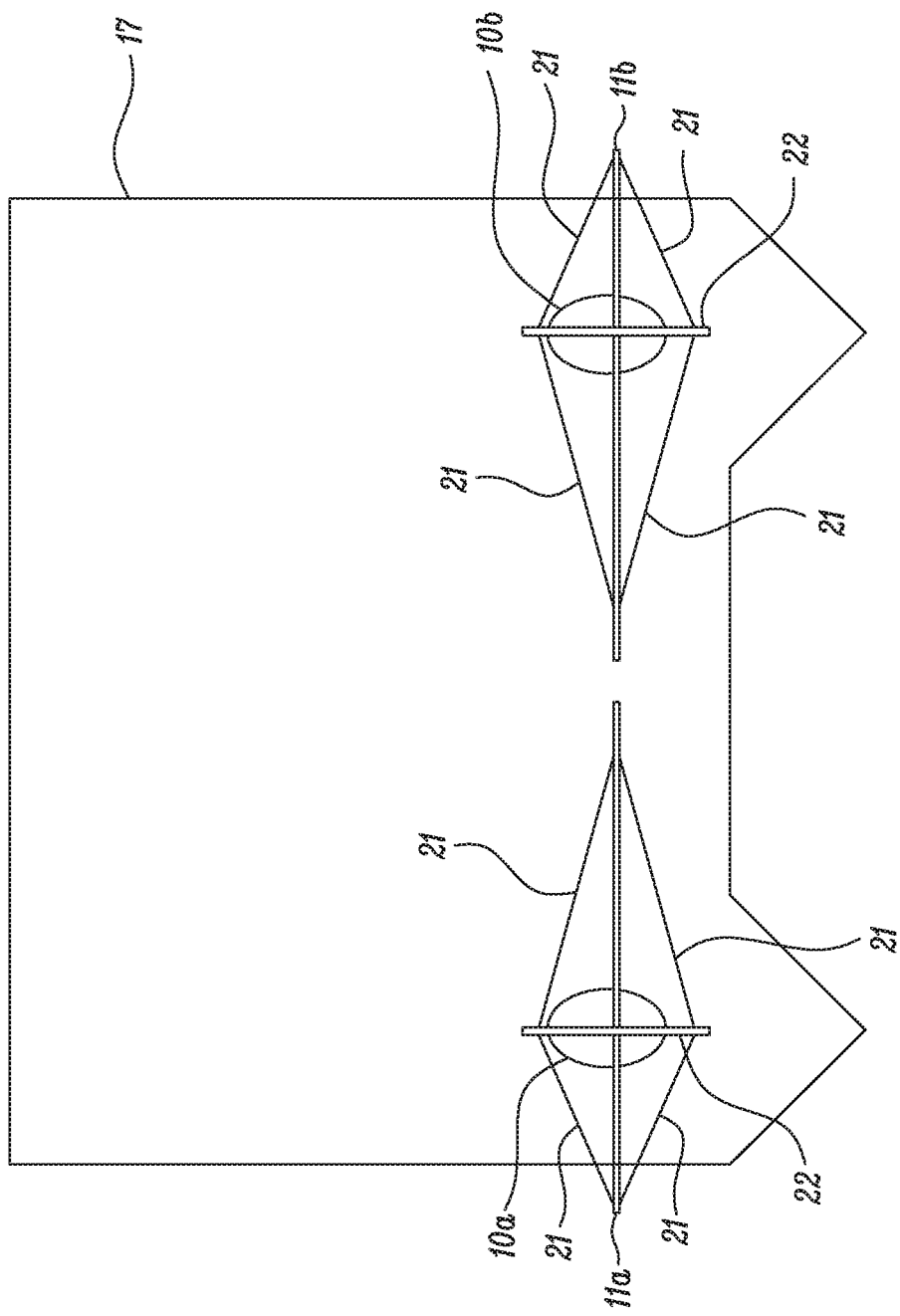
Figure 12:
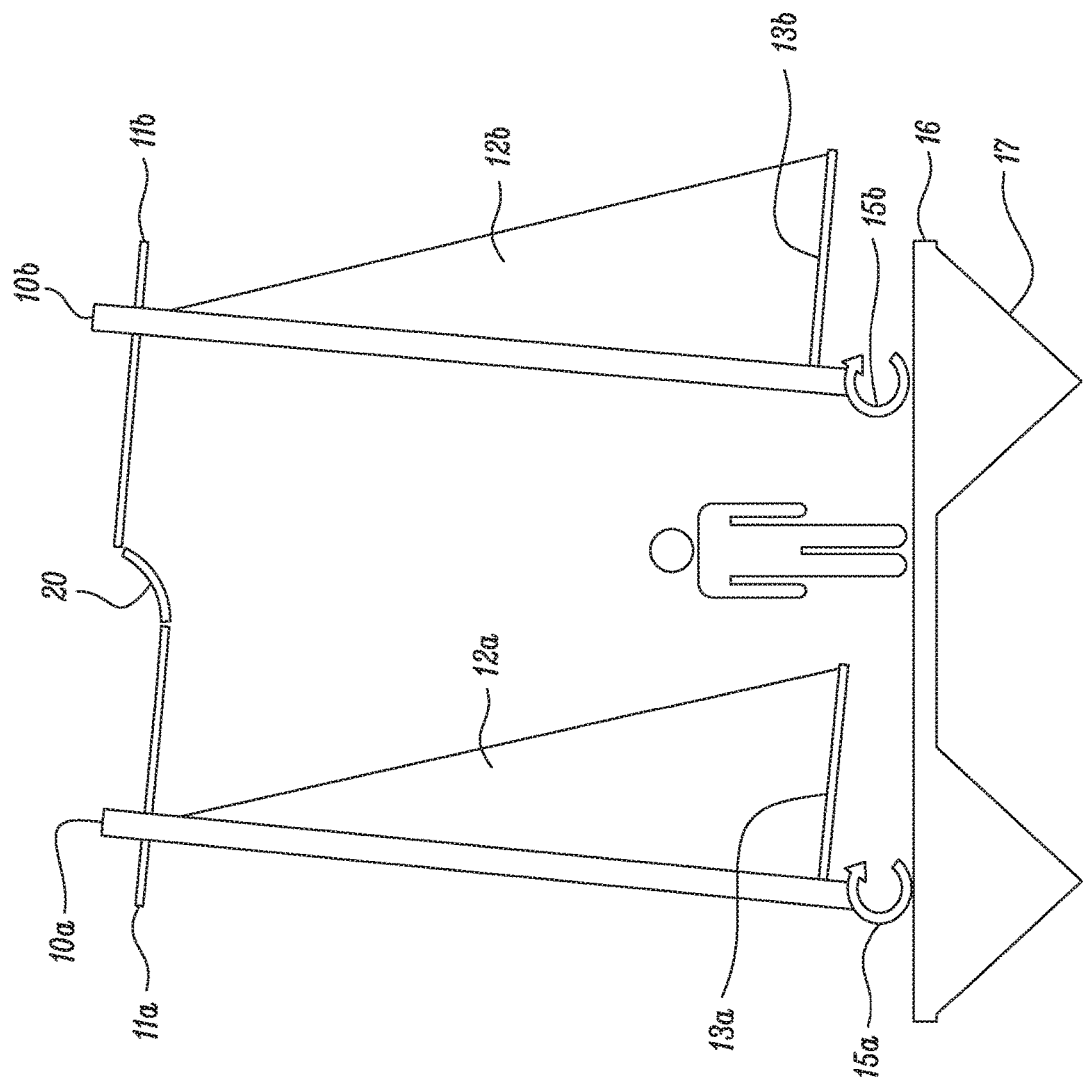
Figure 13:
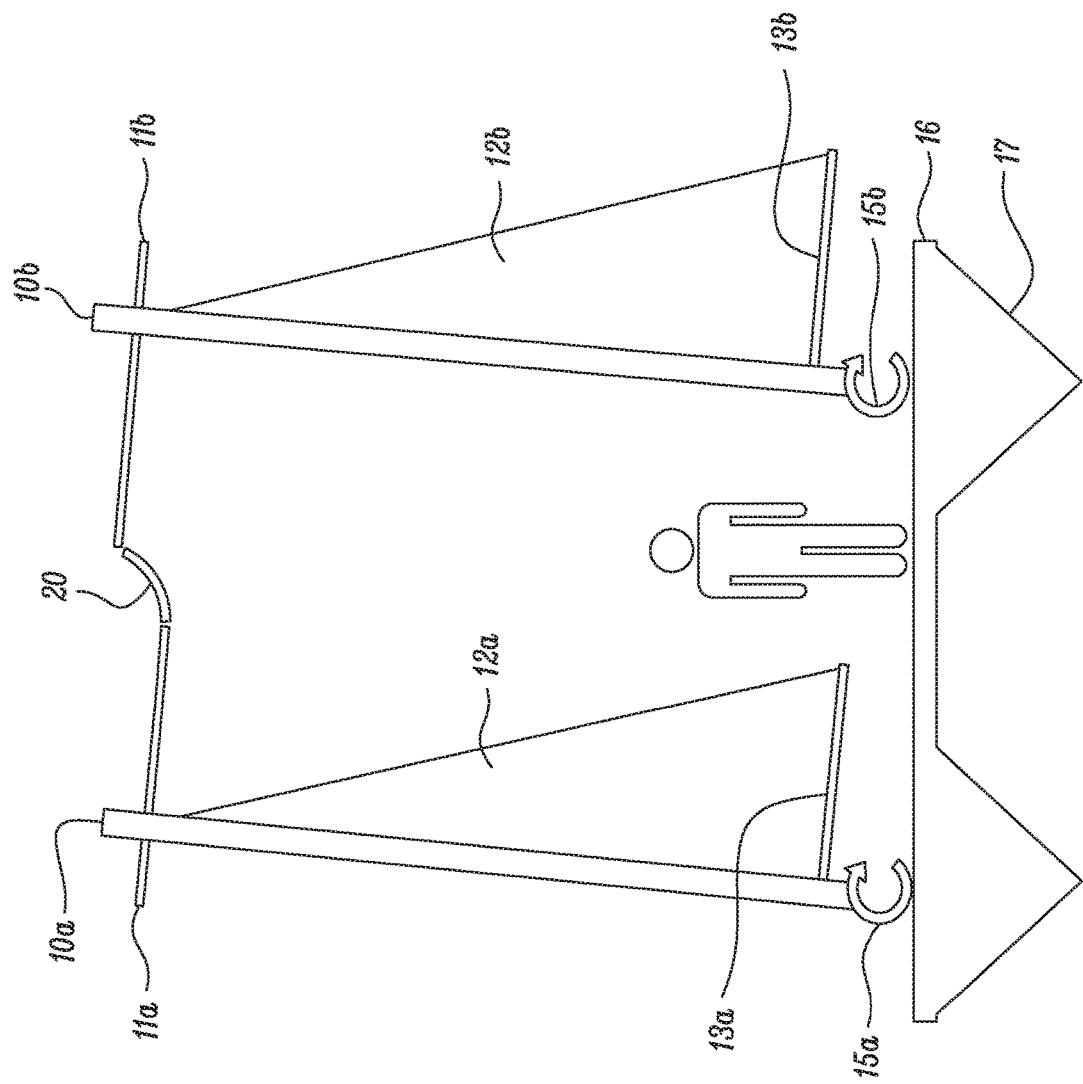
Figure 14:
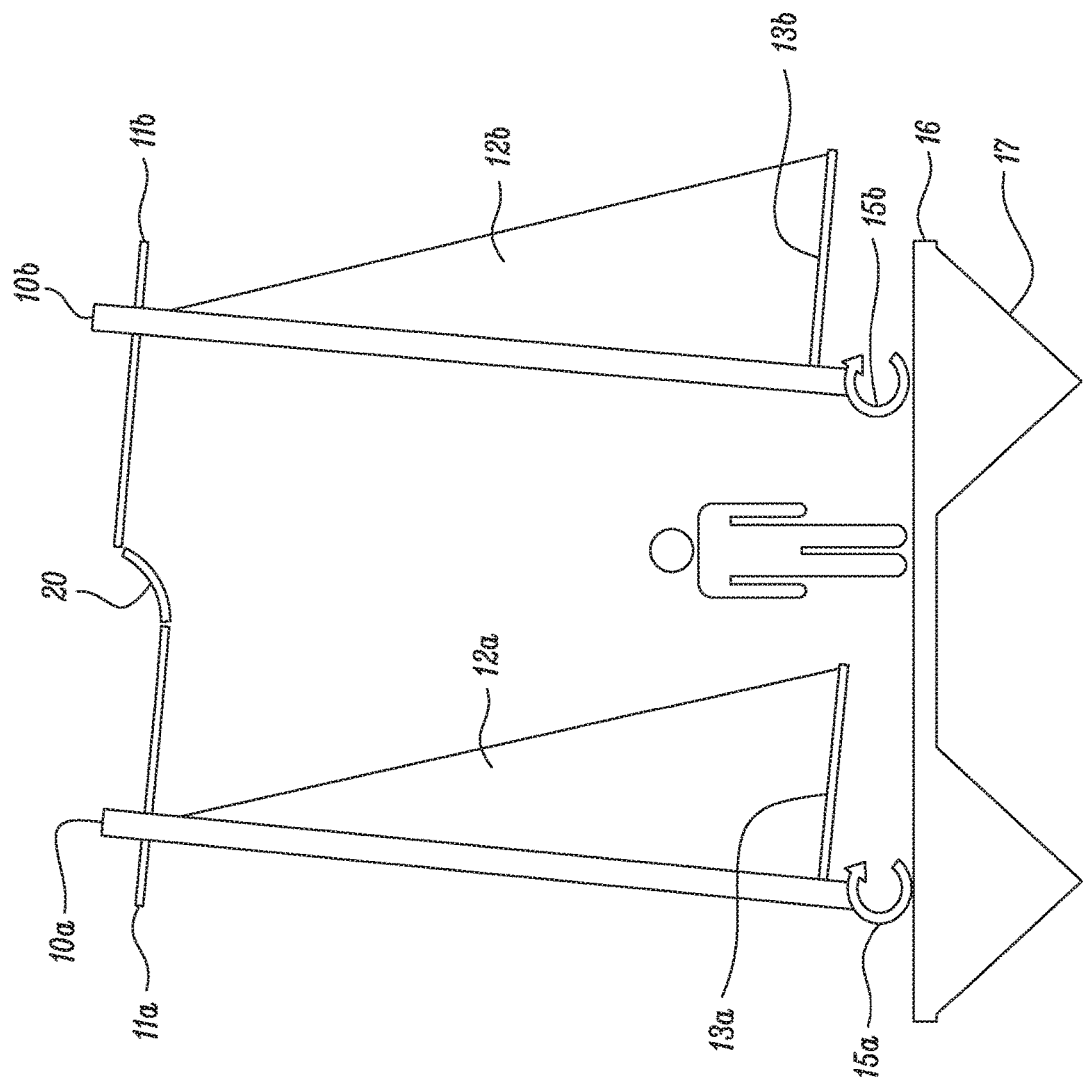
Figure 15:
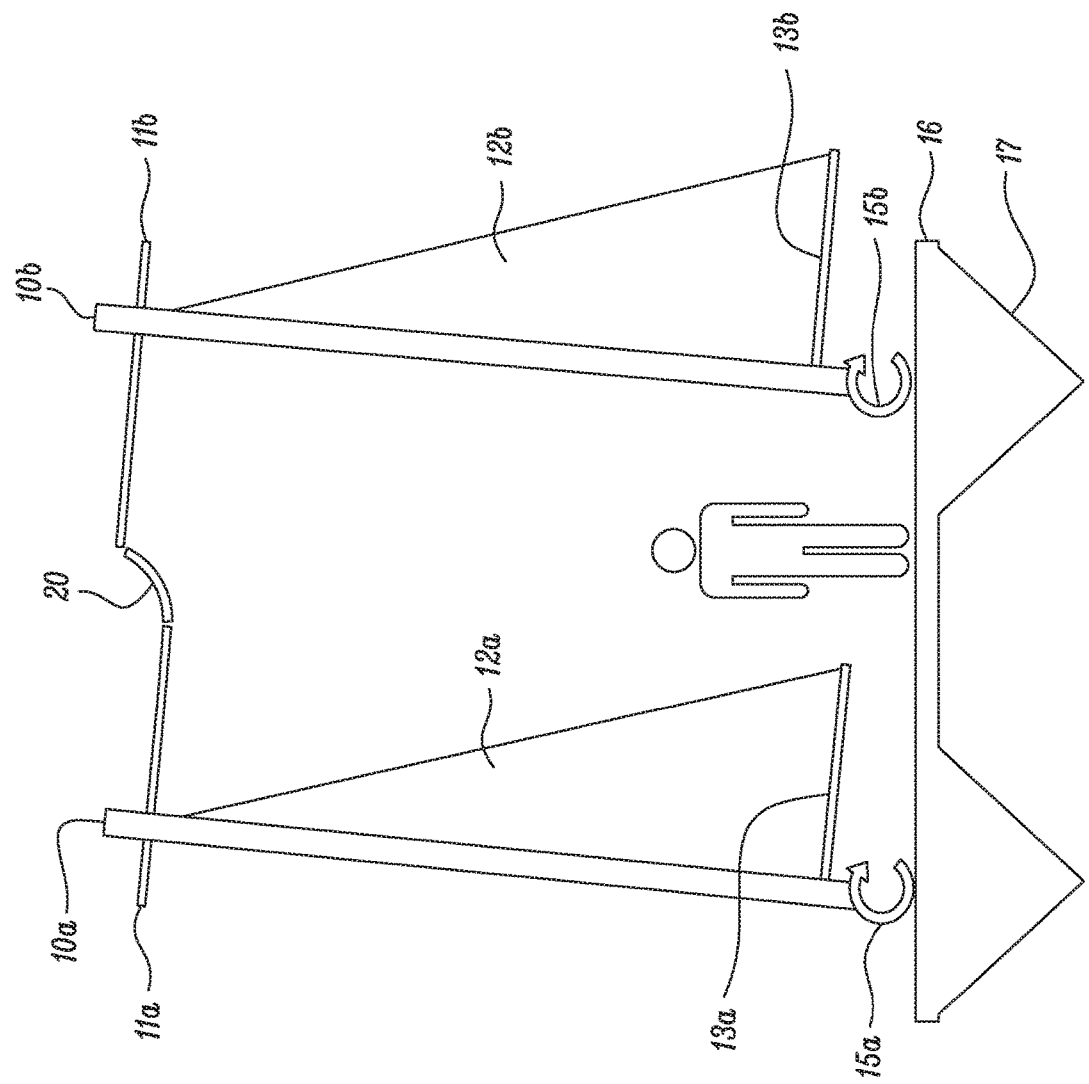
Figure 16:
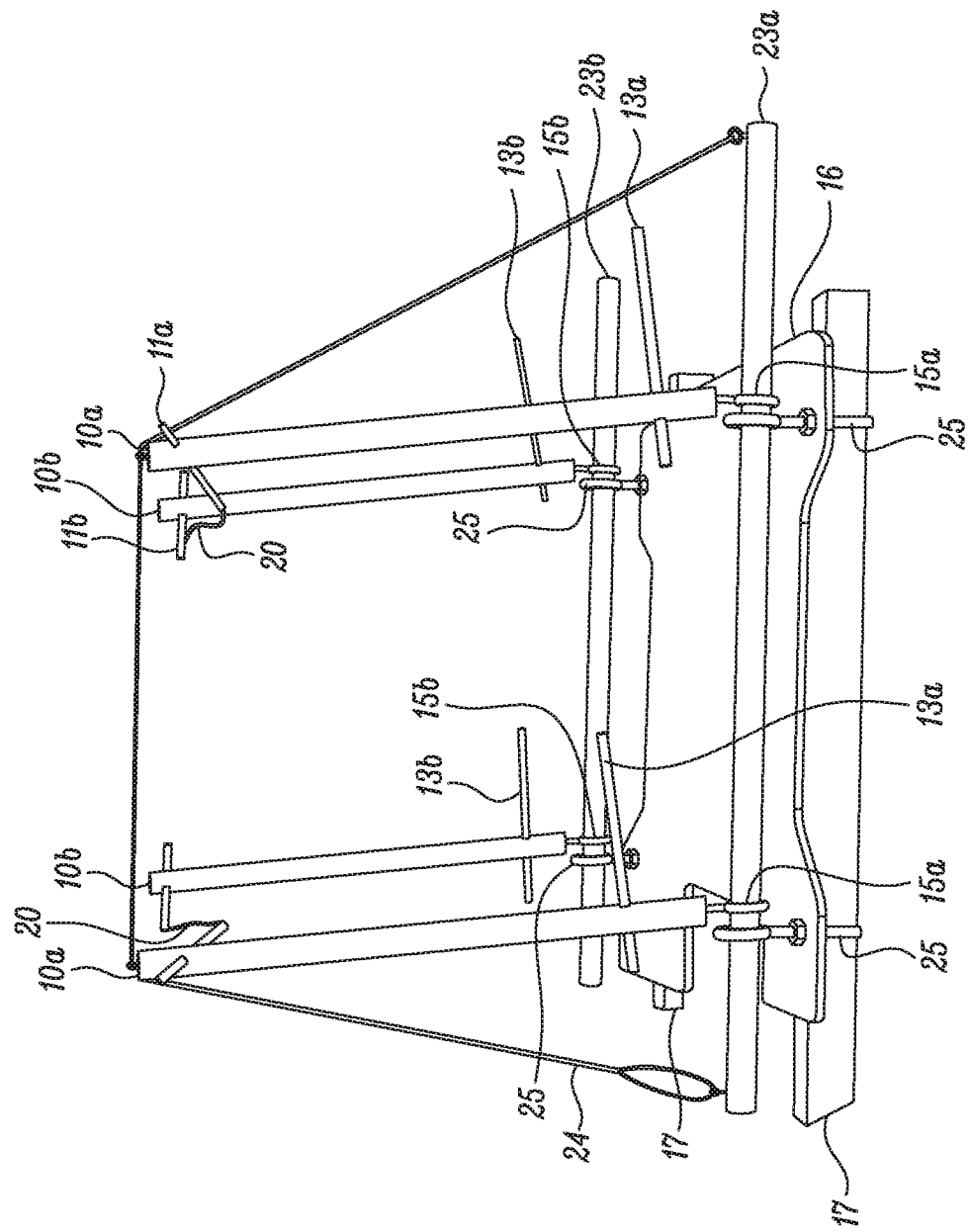
Figure 17:
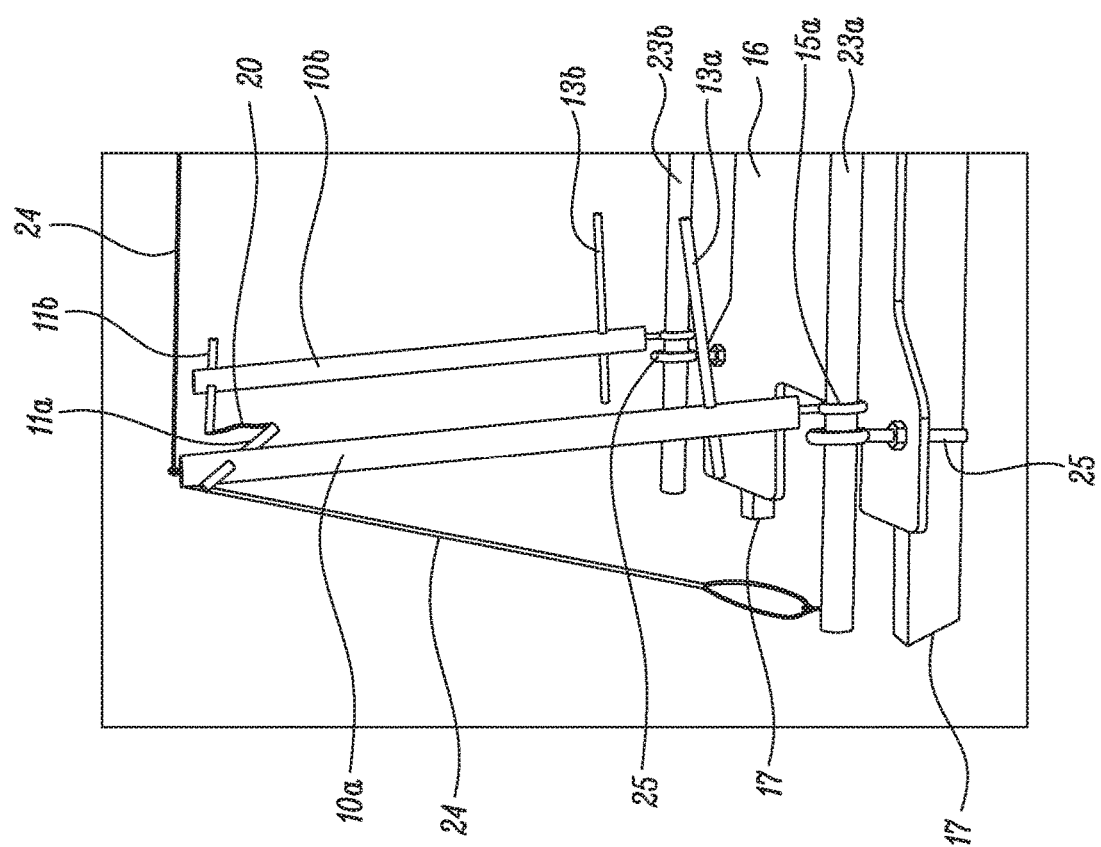
Figure 18:
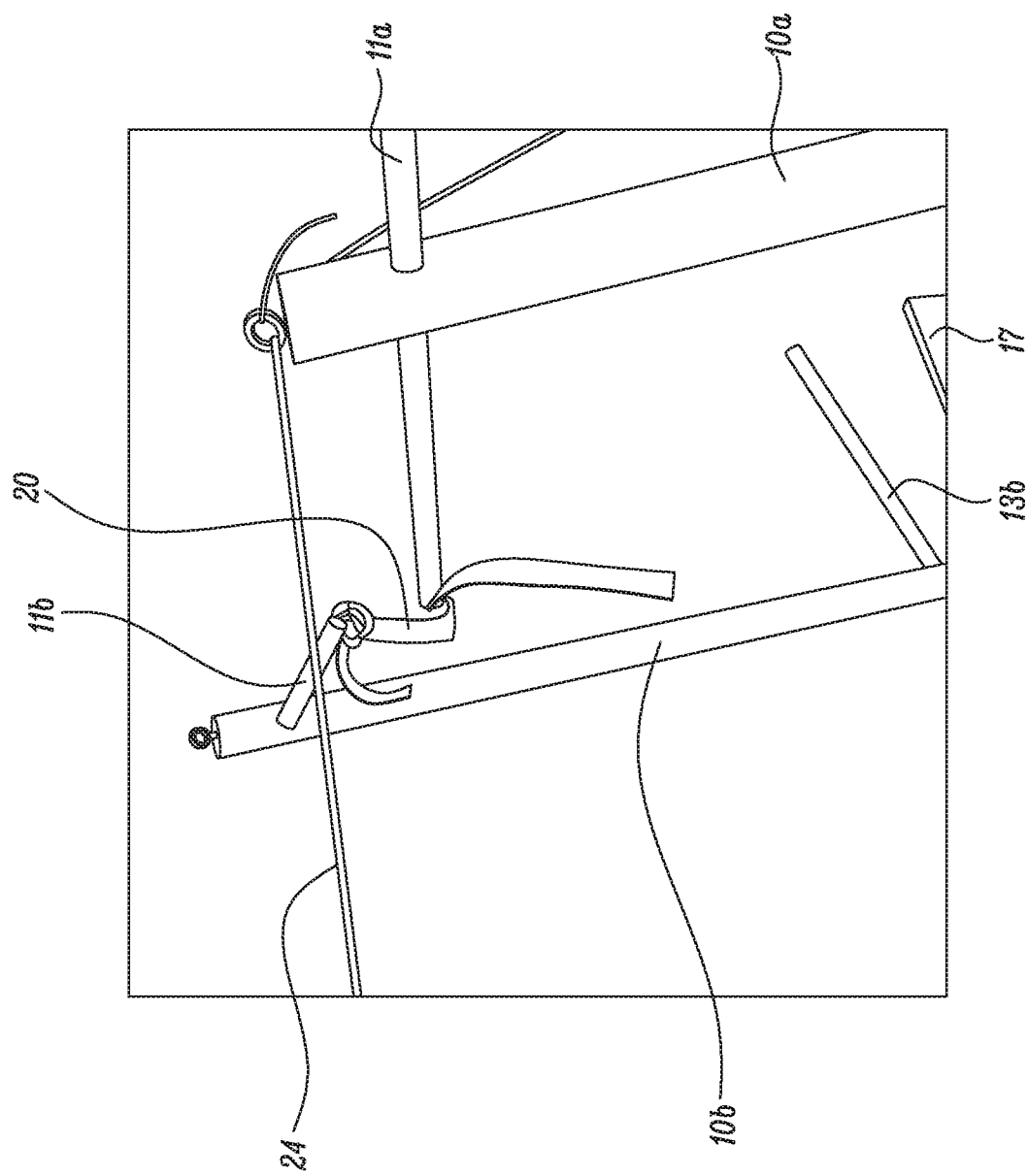
Figure 19:
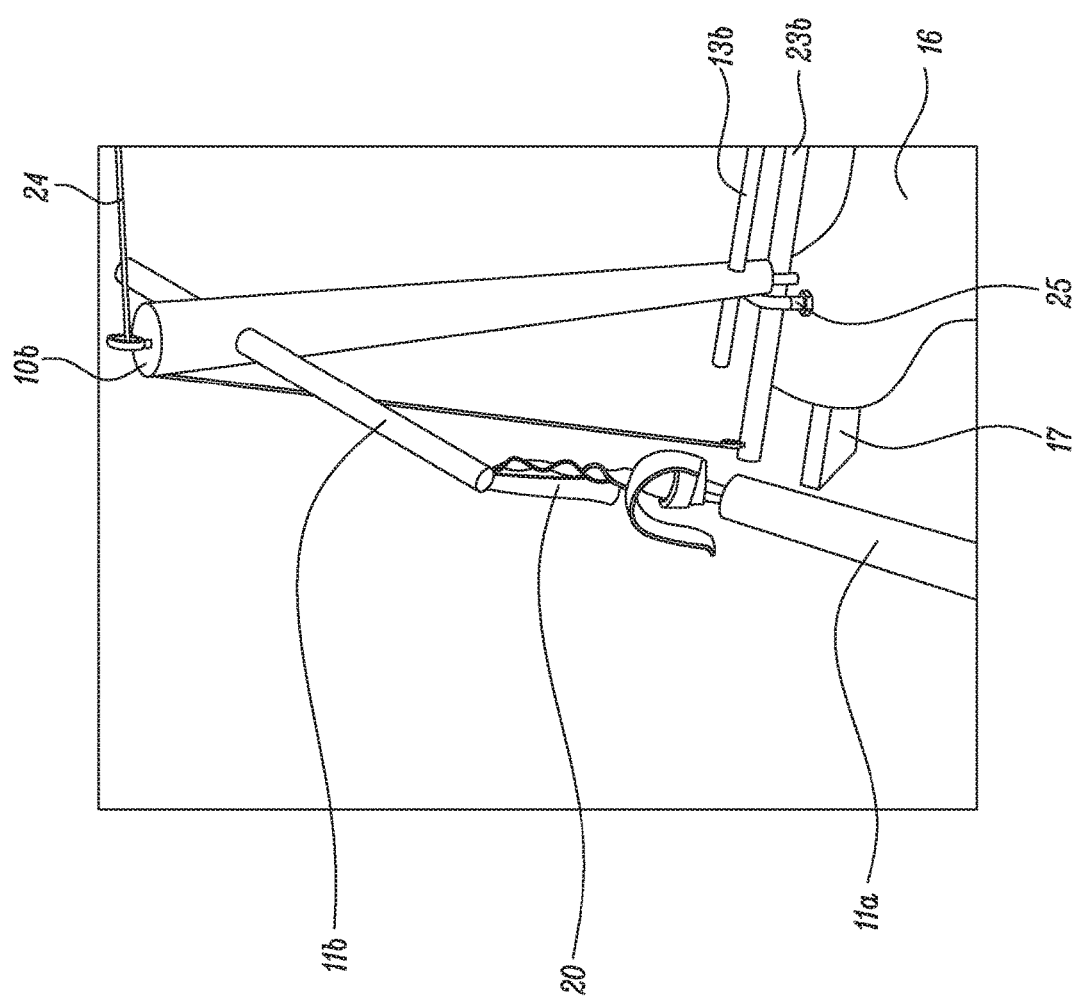
Figure 20:
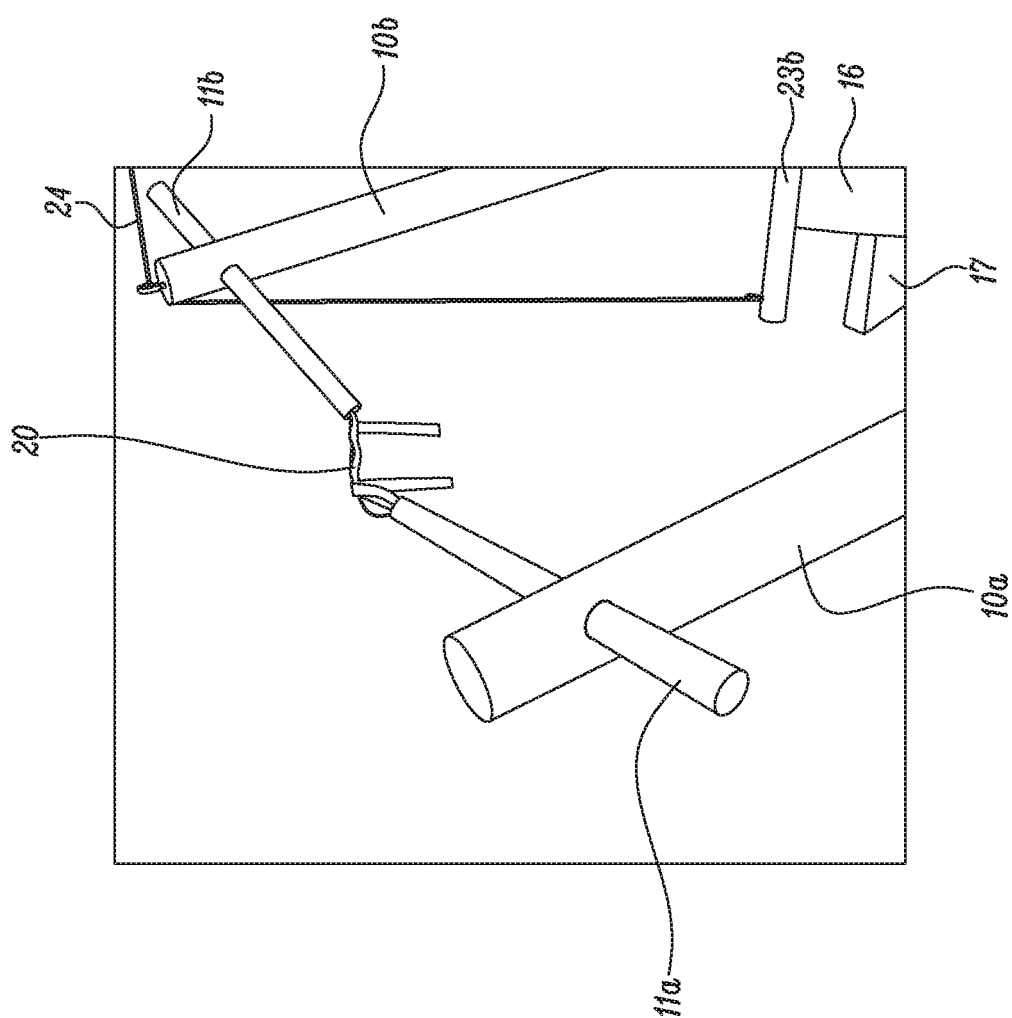
Figure 21:
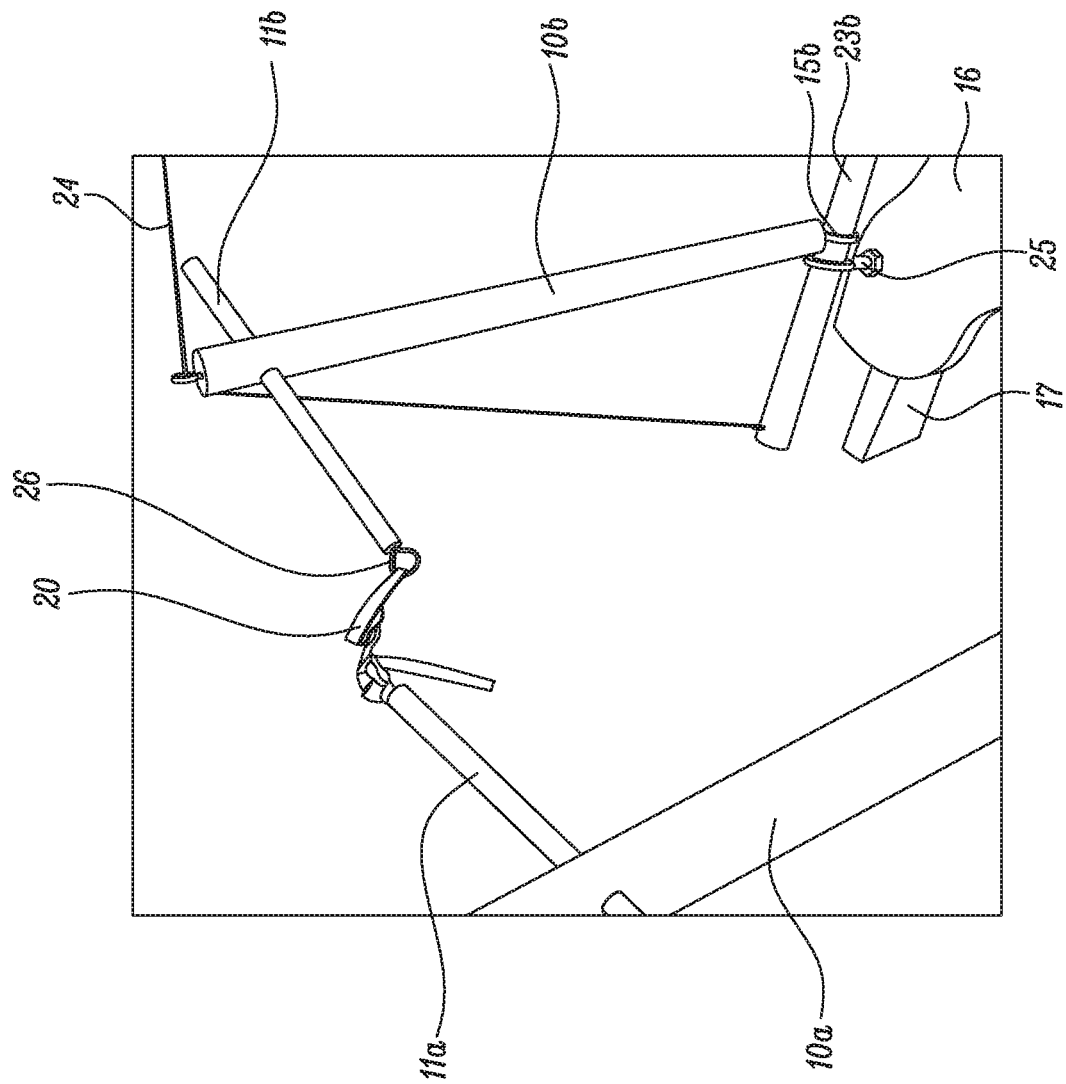
Figure 22:
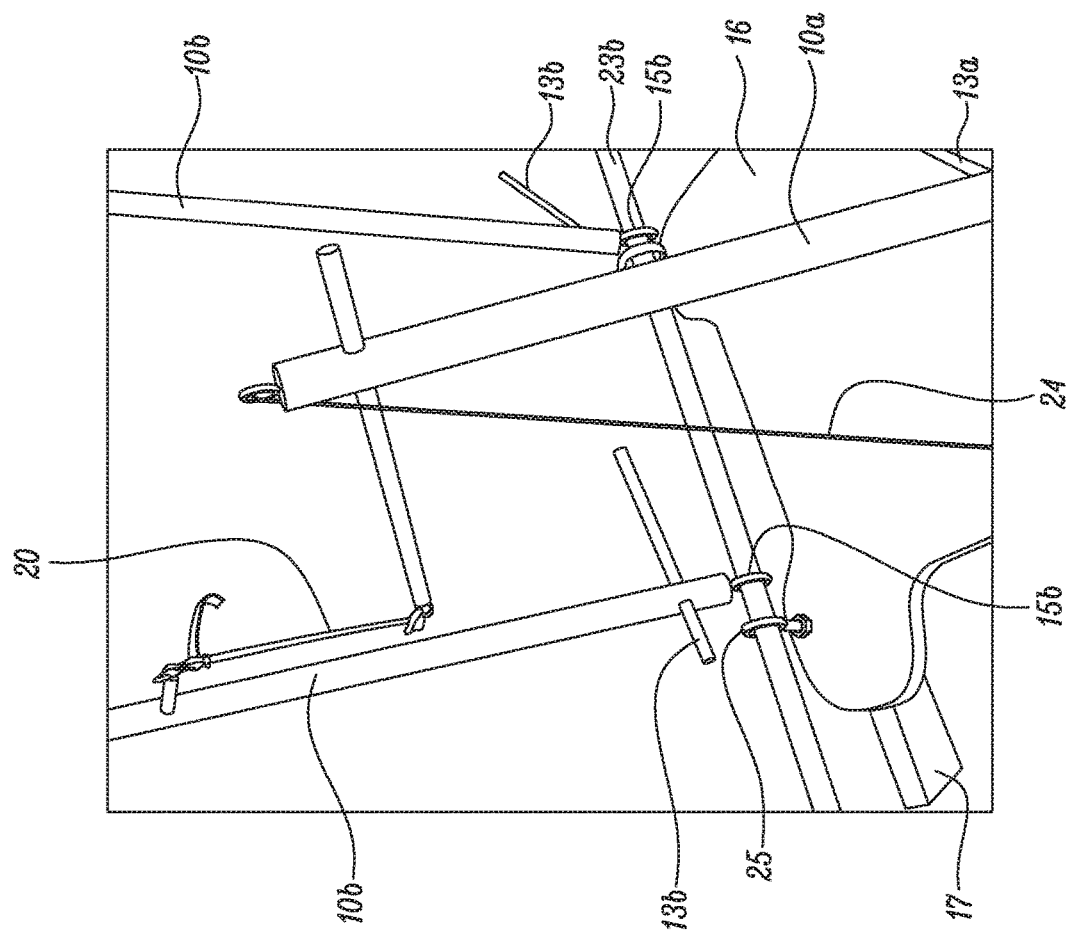
Figure 23:
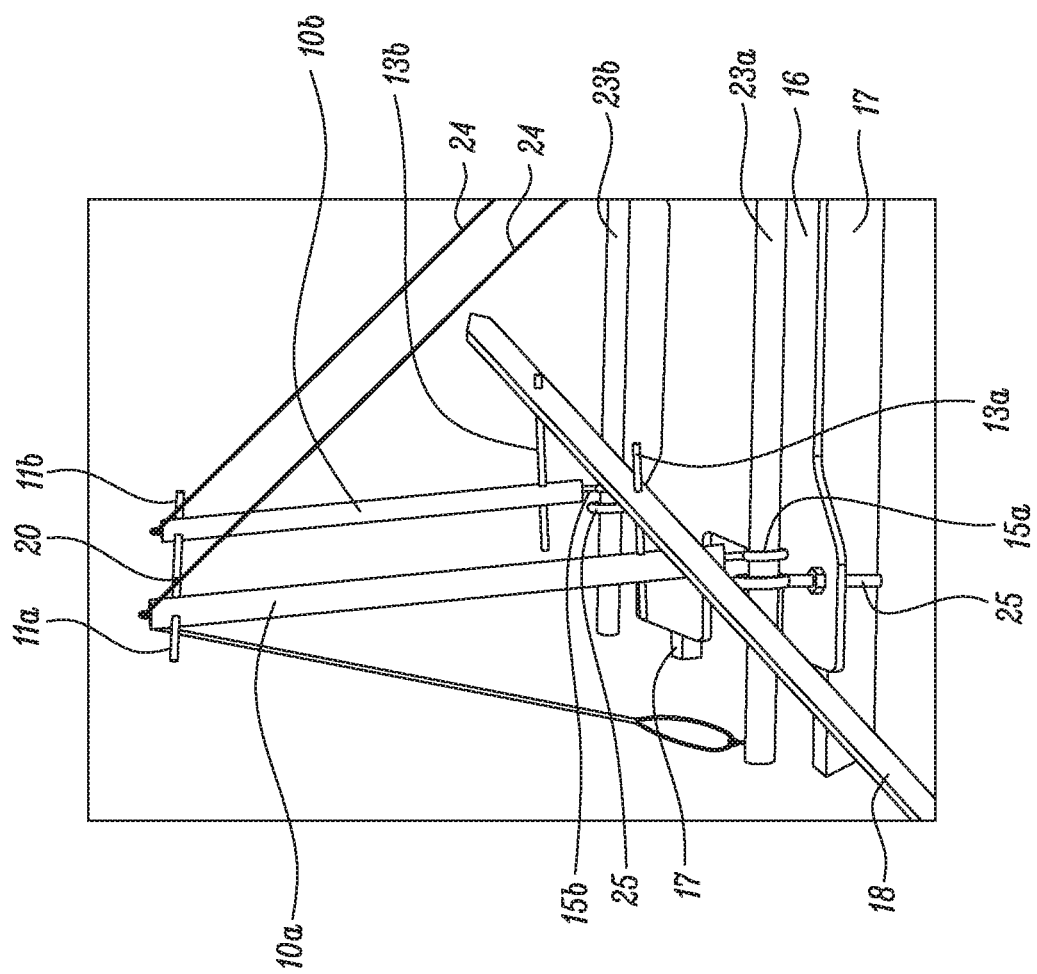
Figure 24:
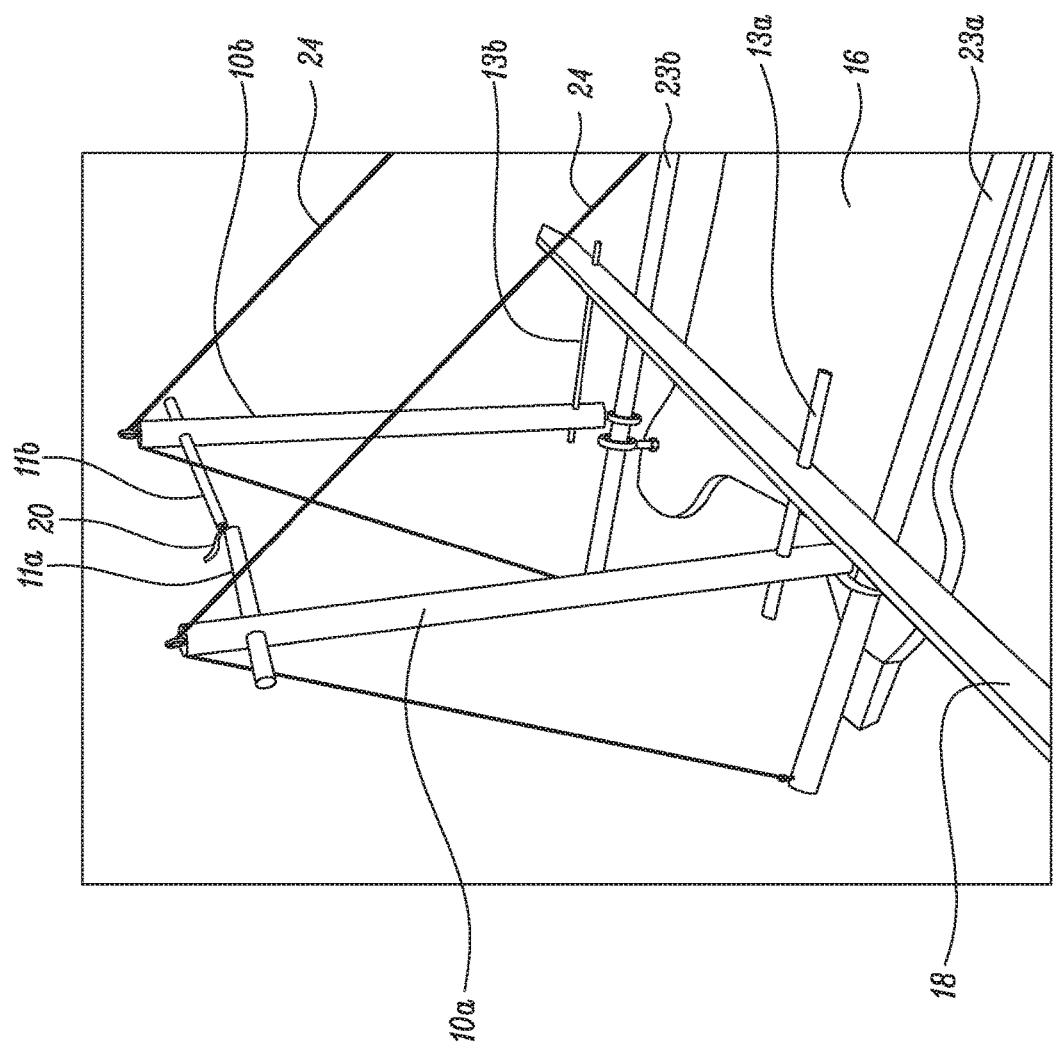
Figure 25:
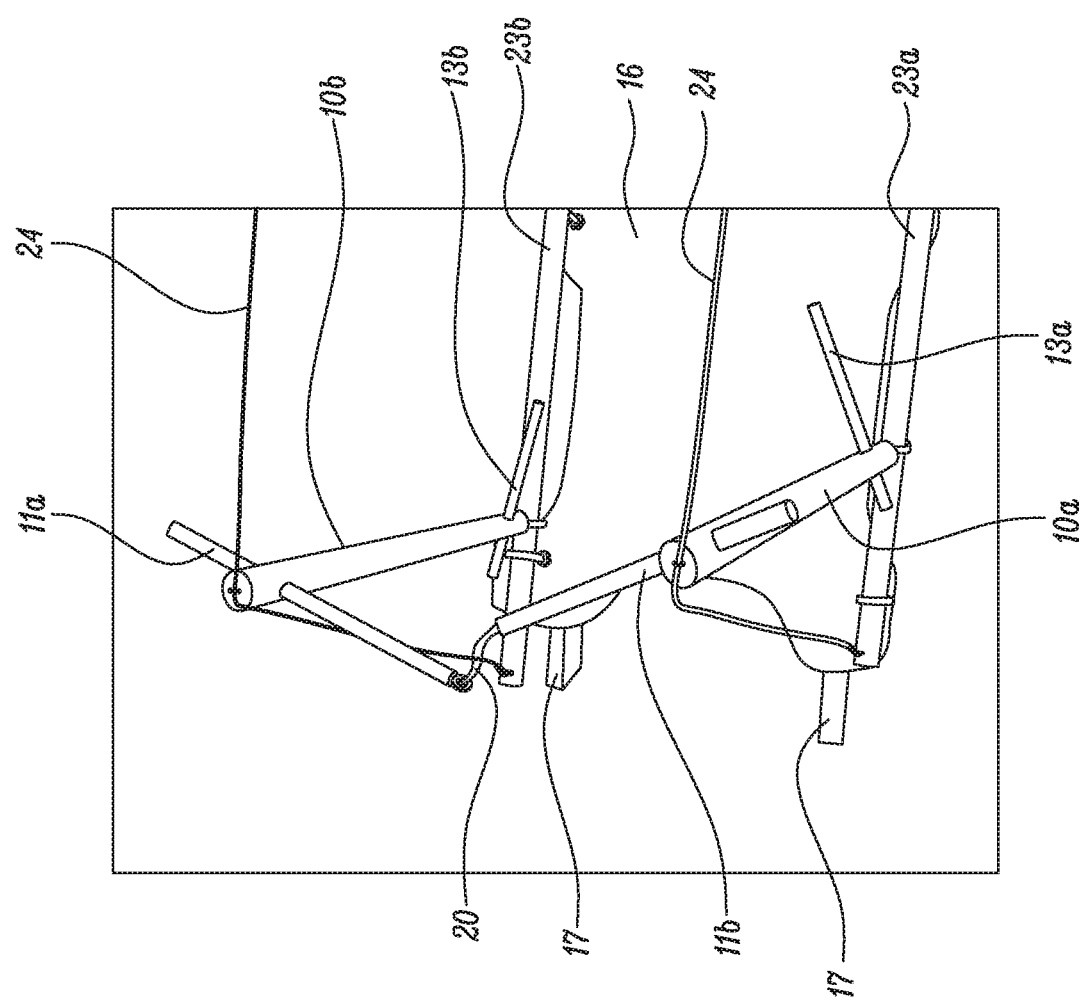
Figure 26:
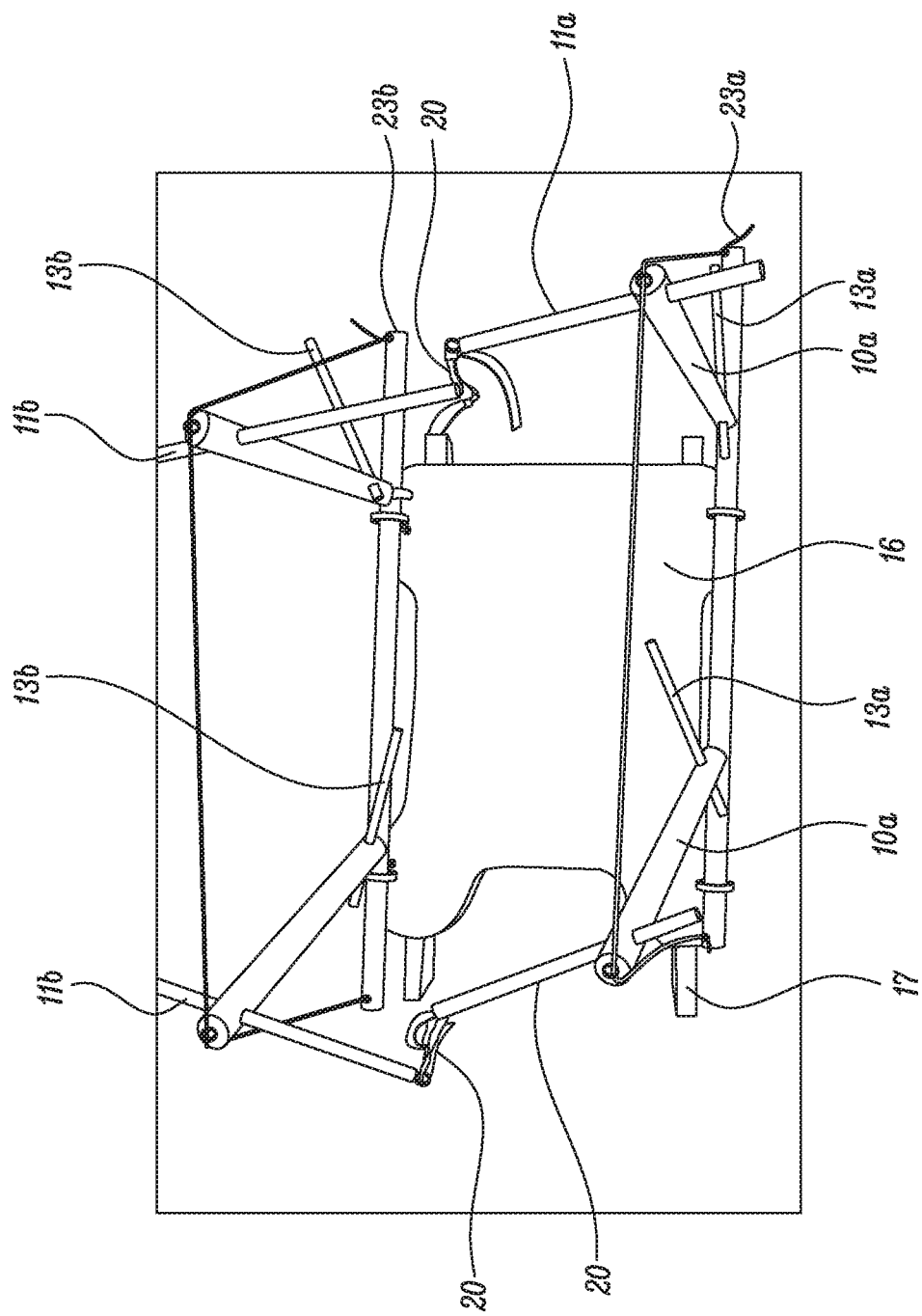
Figure 27:
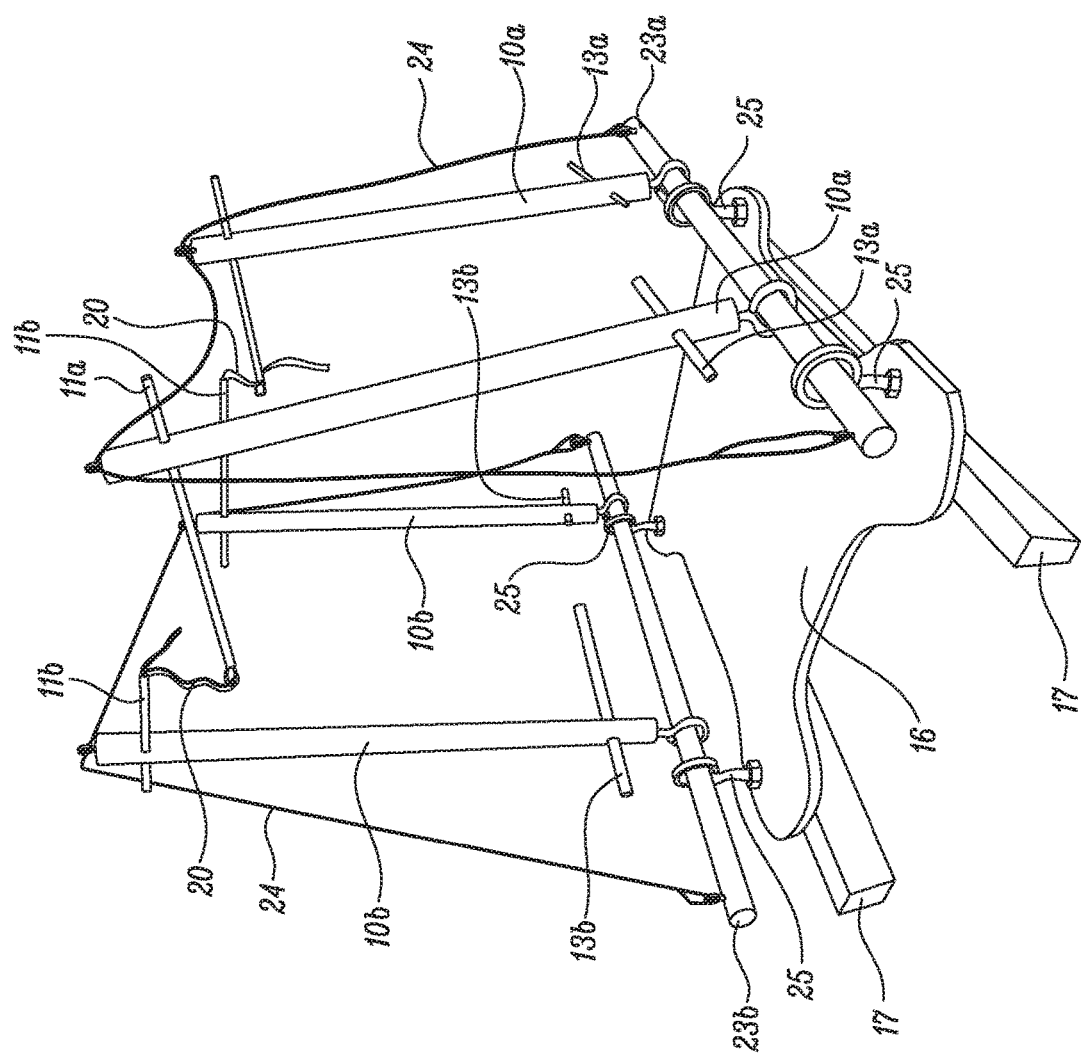
Figure 28:
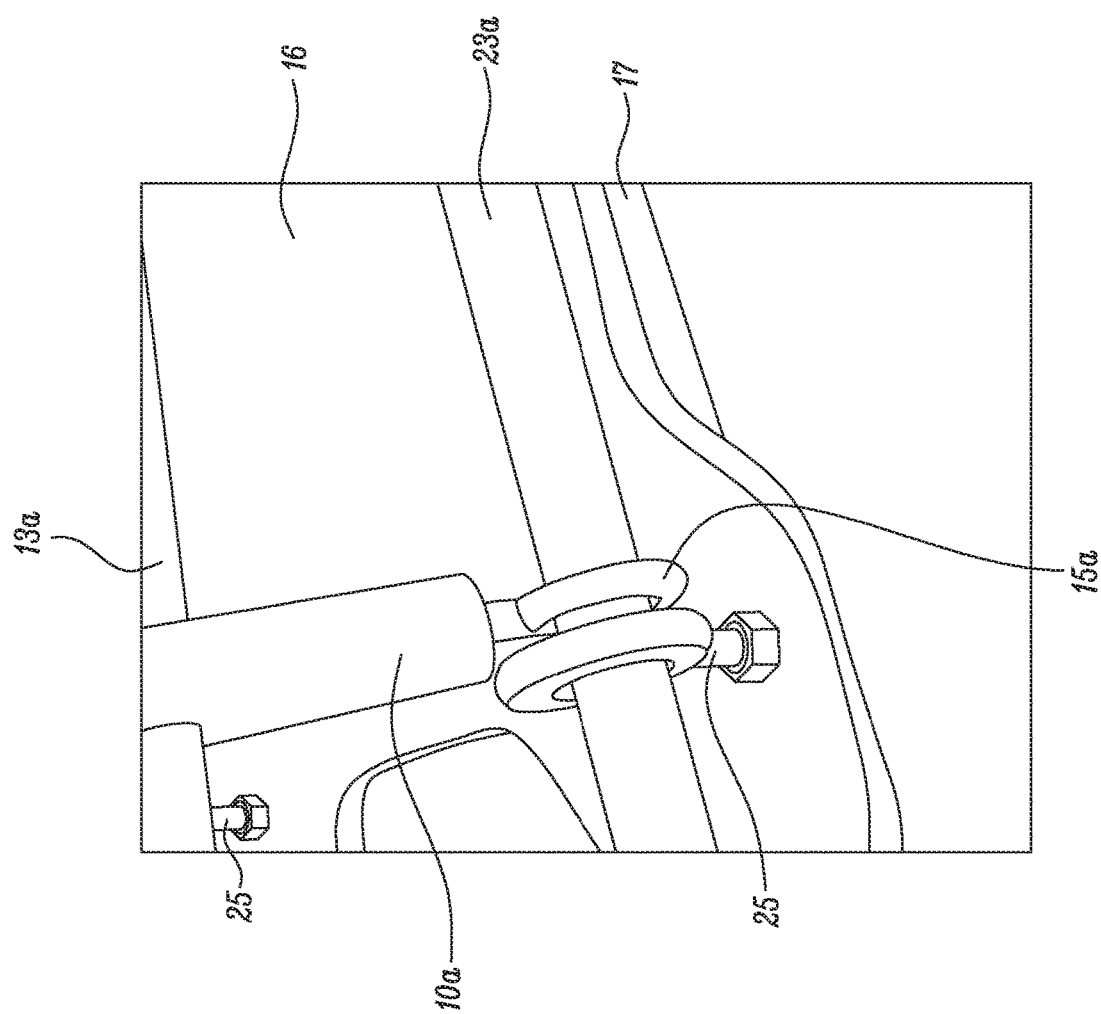
Figure 29:
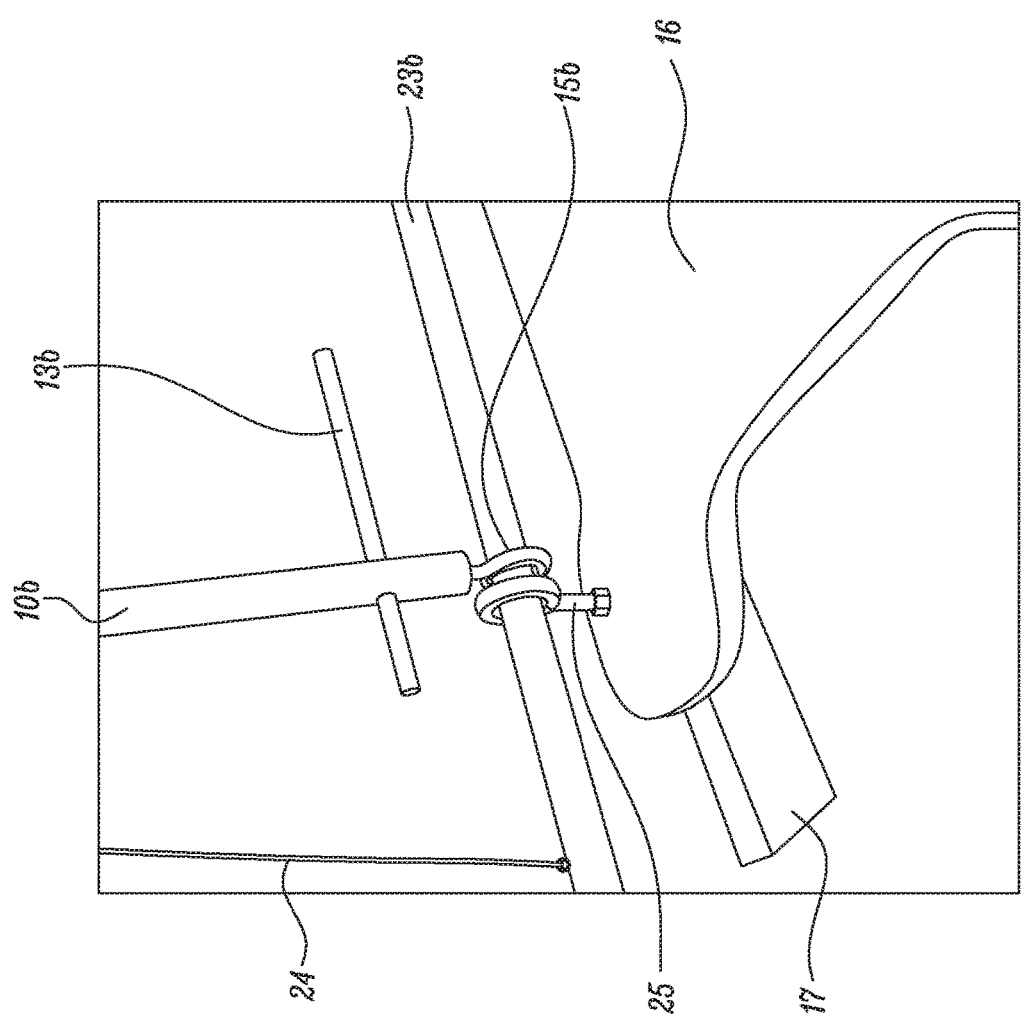
Figure 30:
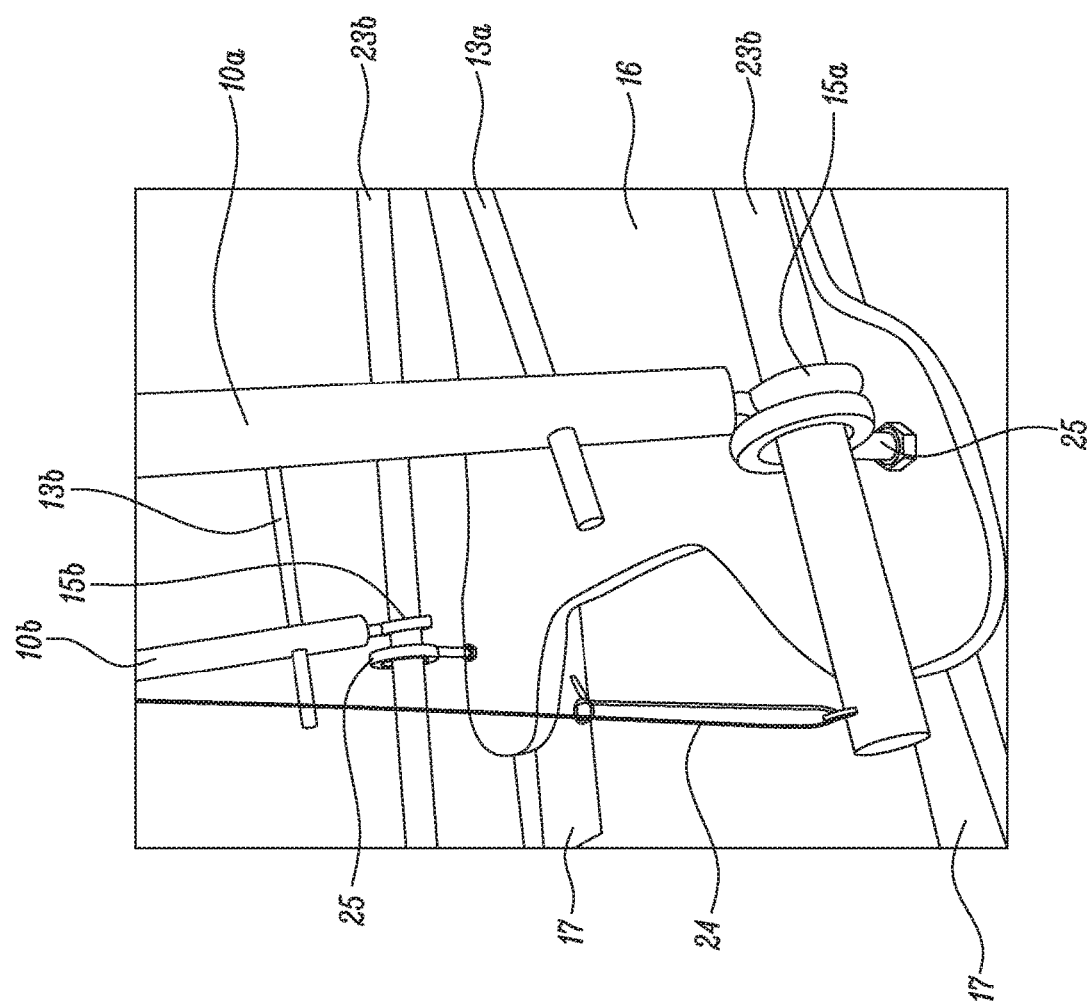
Figure 31:
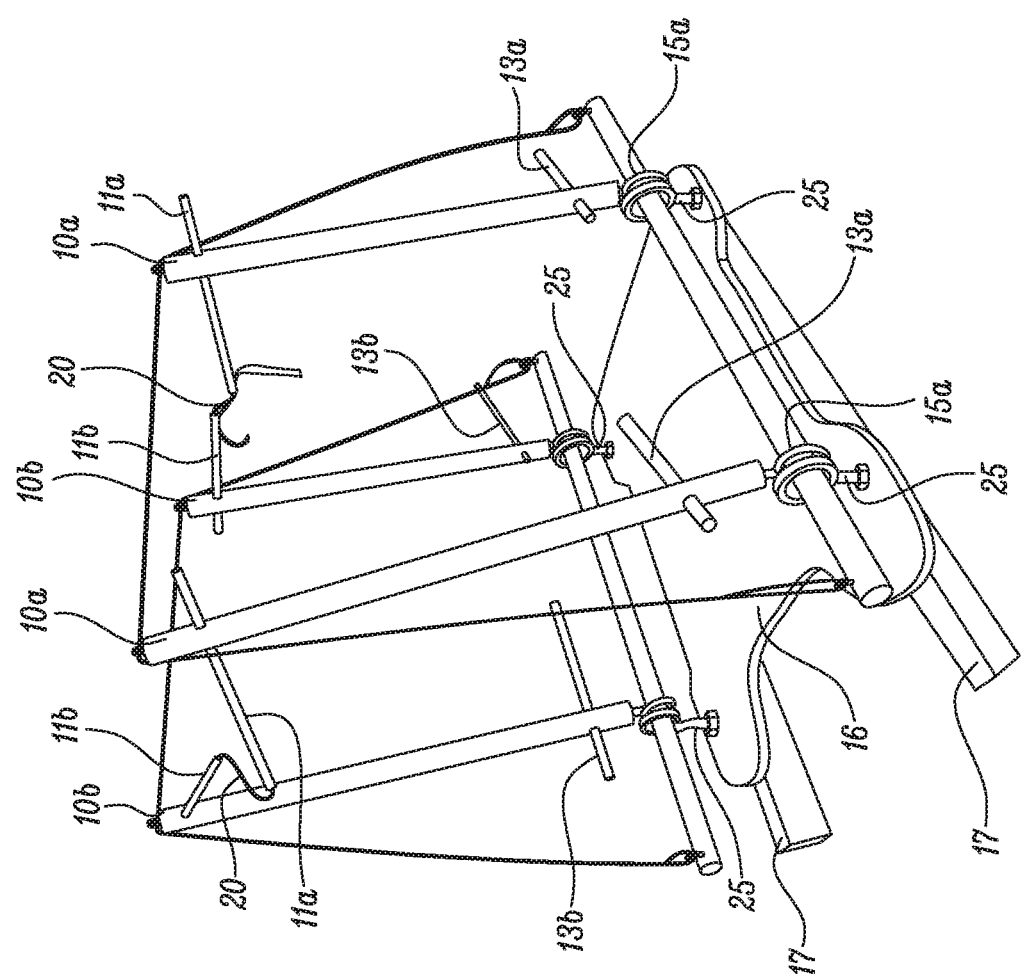
Figure 32:
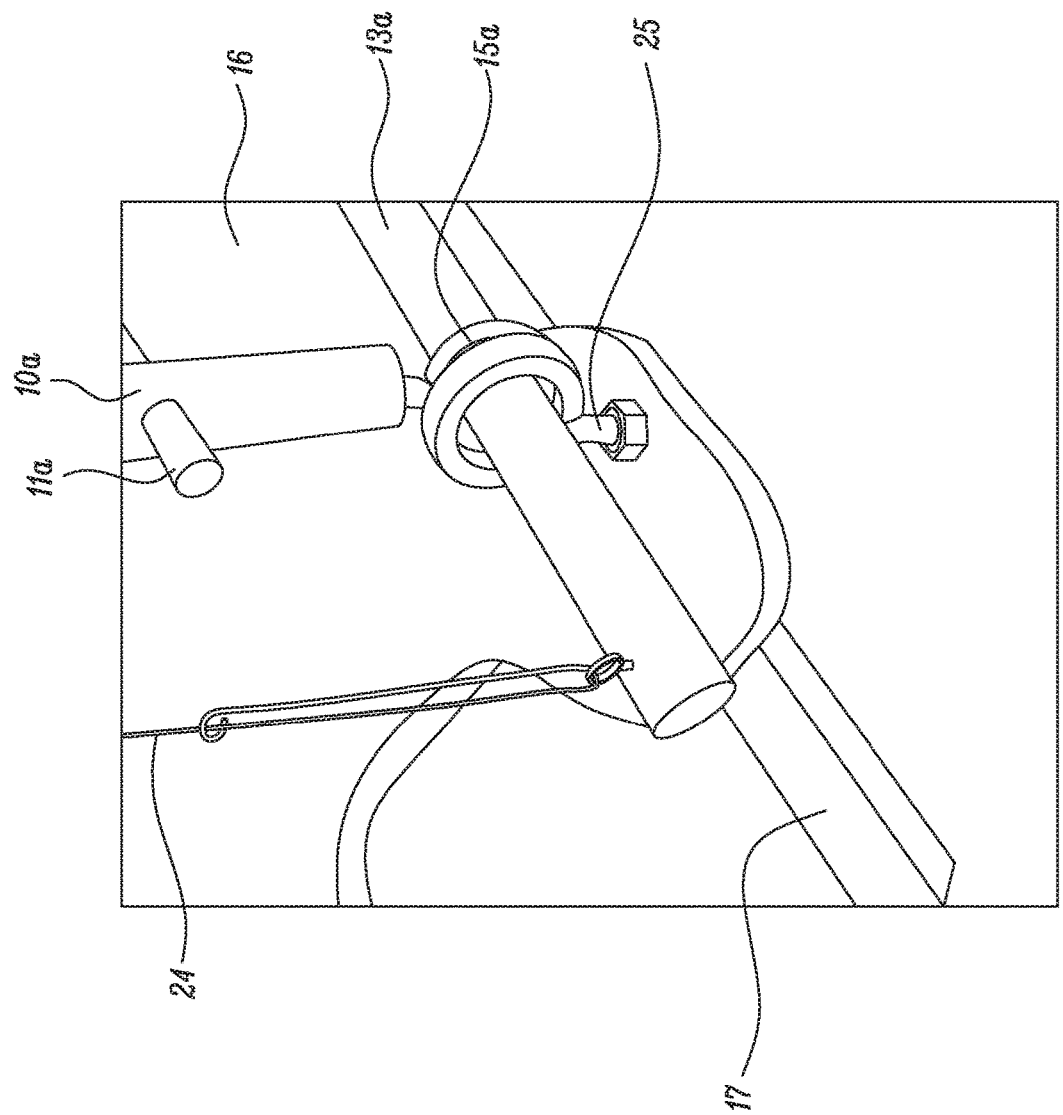
Figure 33:
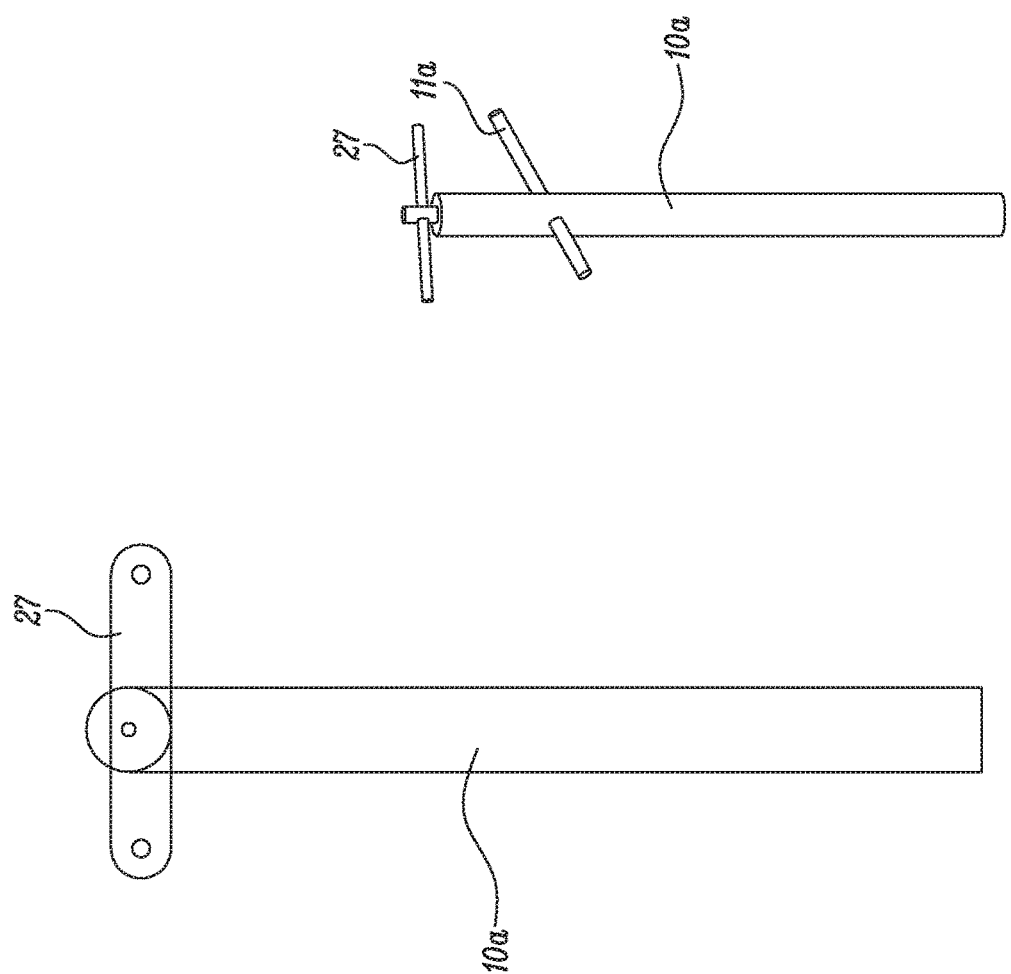
Figure 34:
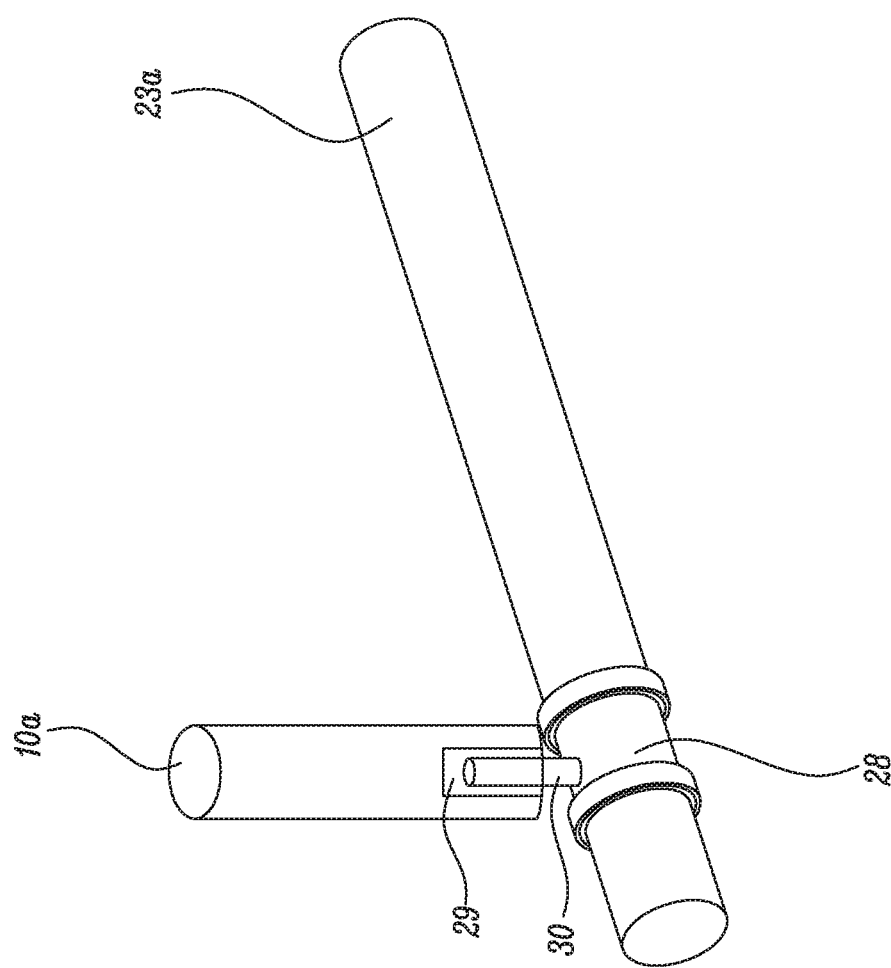
Figure 35:
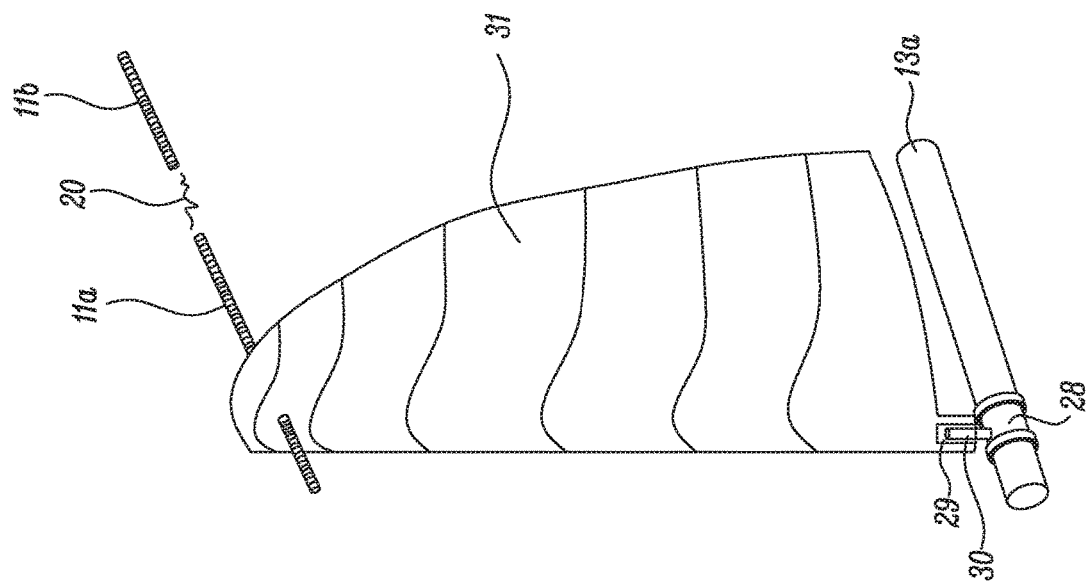
Figure 36:
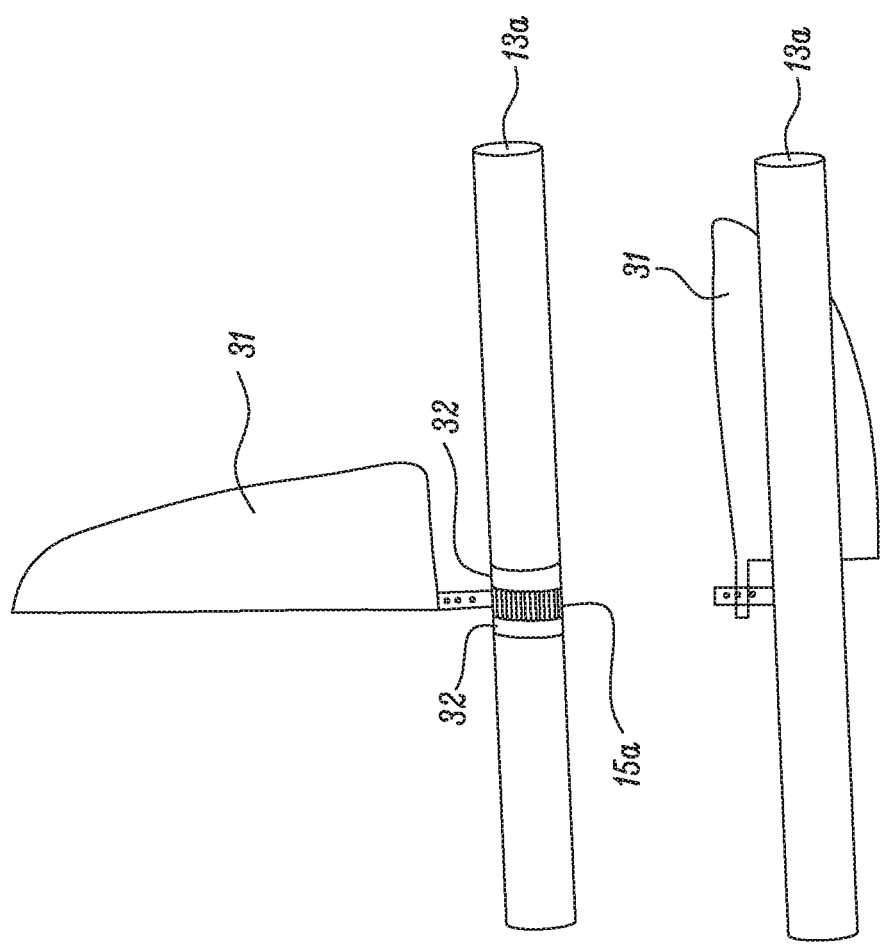
Figure 37:
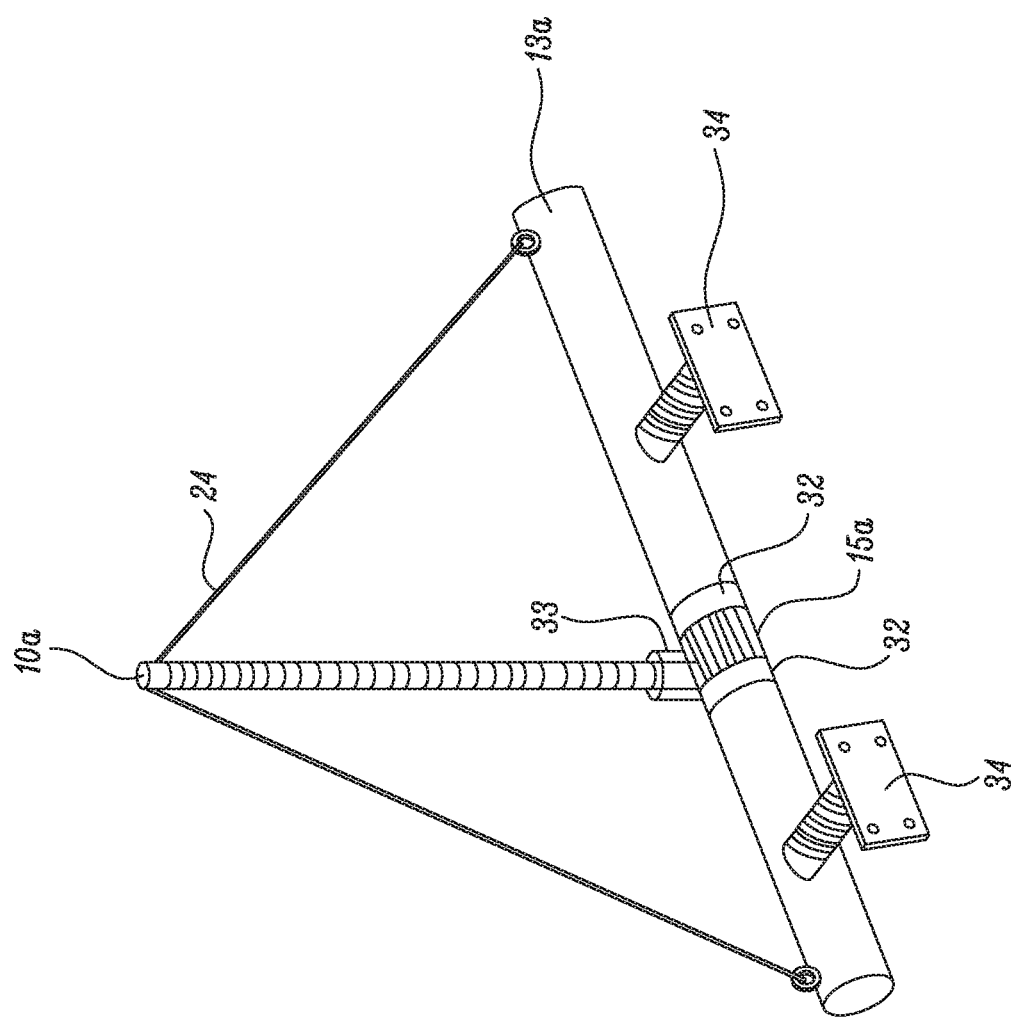
Figure 38:
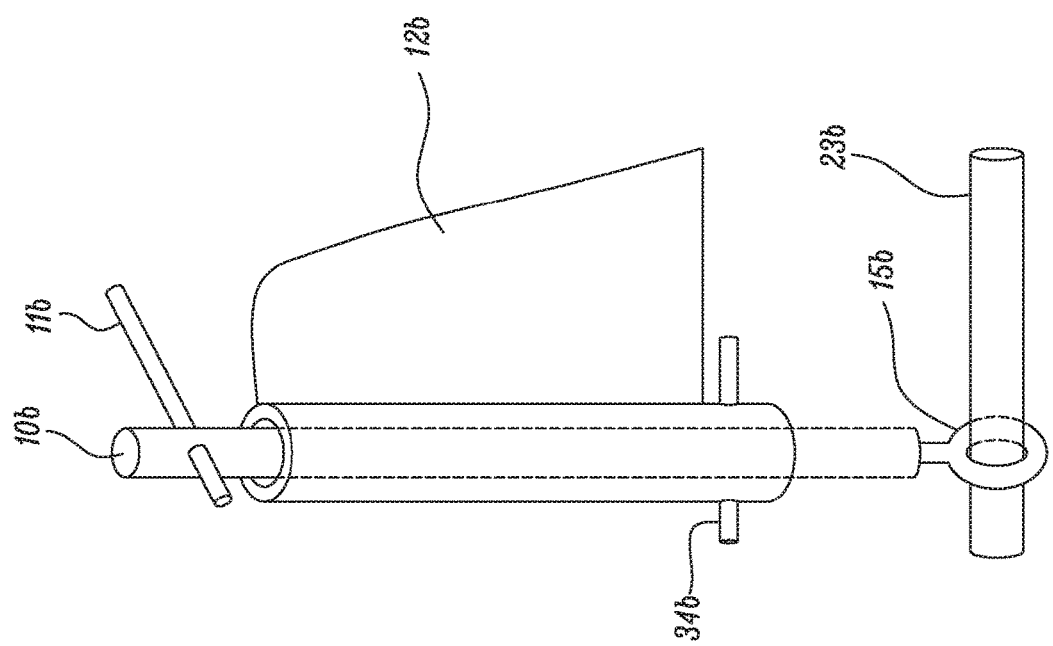
Figure 39:
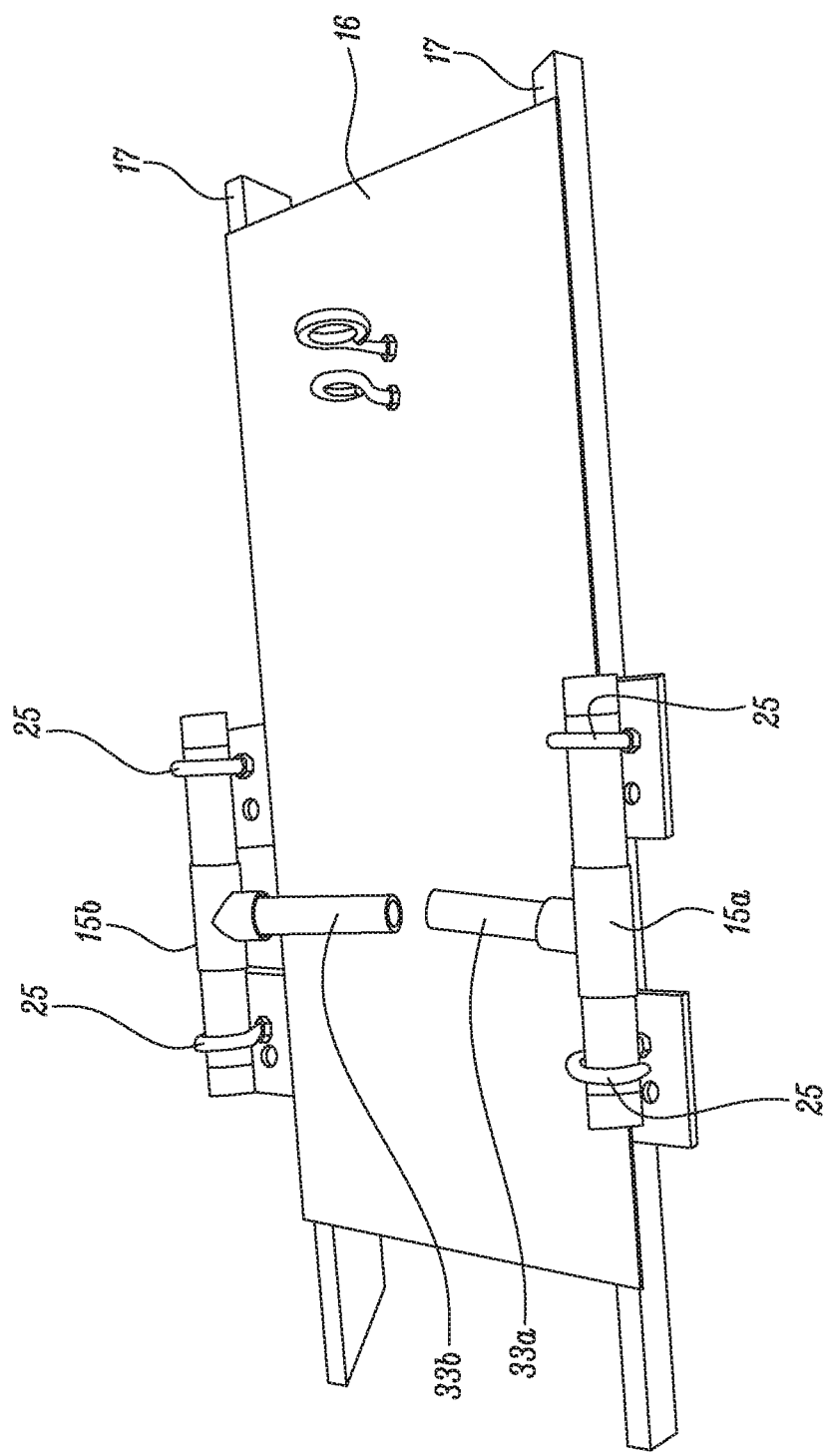
Figures 40A, 40B, 40C:
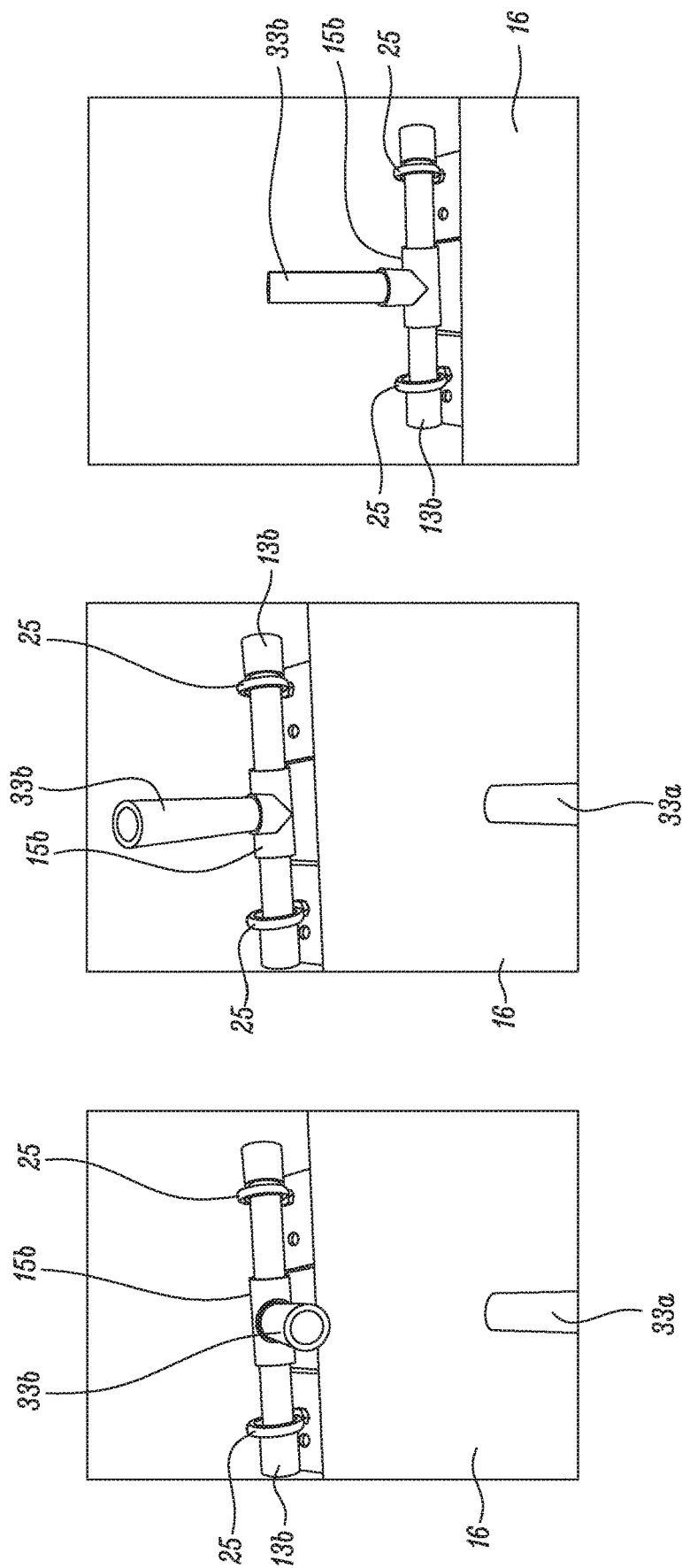
Figure 43A:
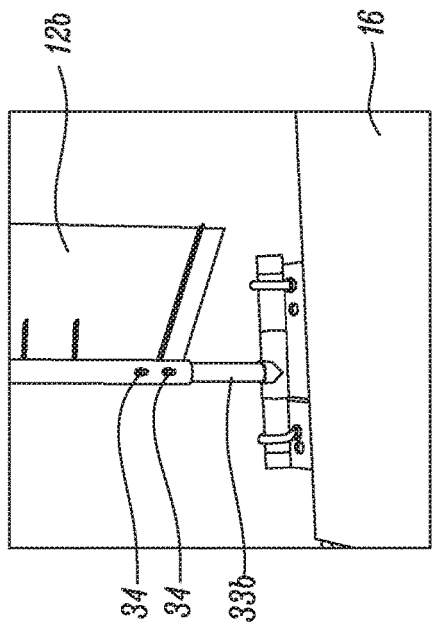
Figure 43B:
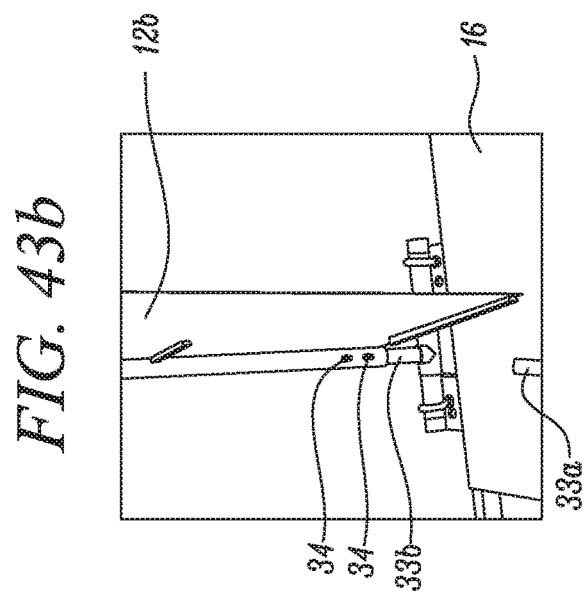
Figure 43C:
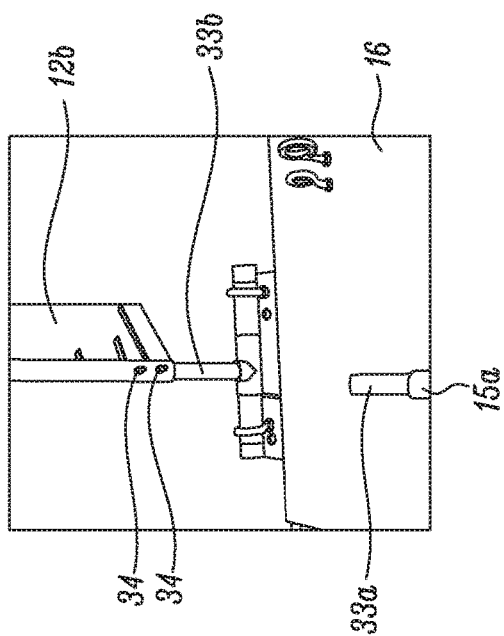
Figure 43D:
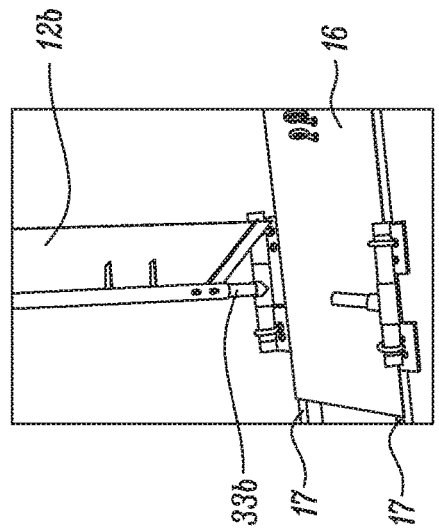
Figure 44A:
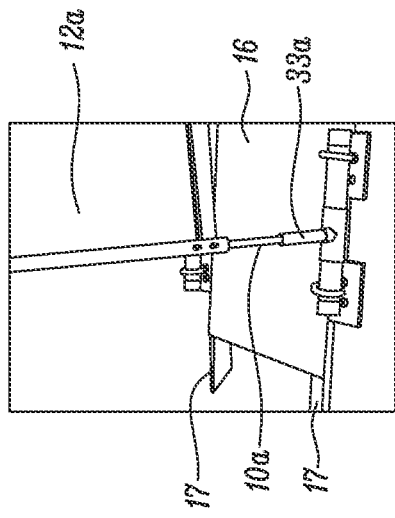
Figure 44B:
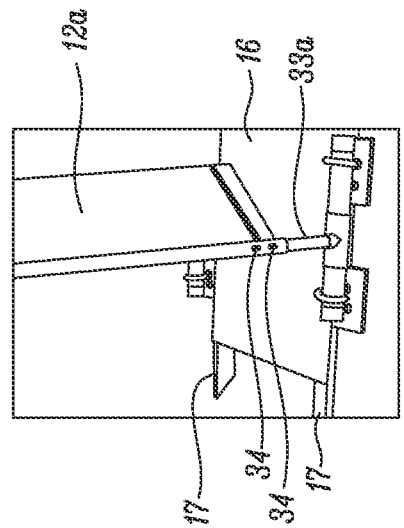
Figure 44C:
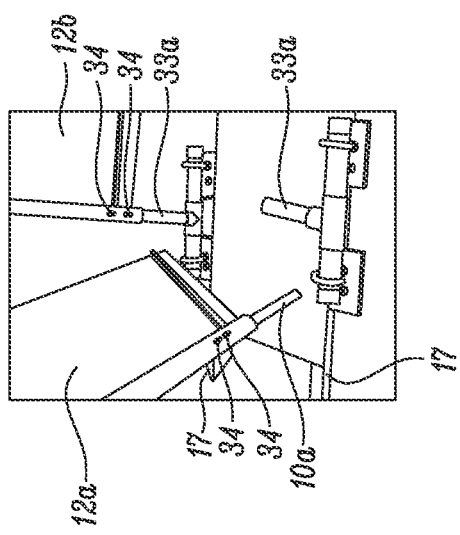
Figure 44D:
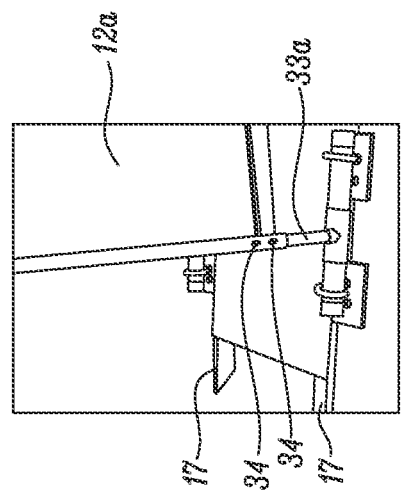
Figure 45B:
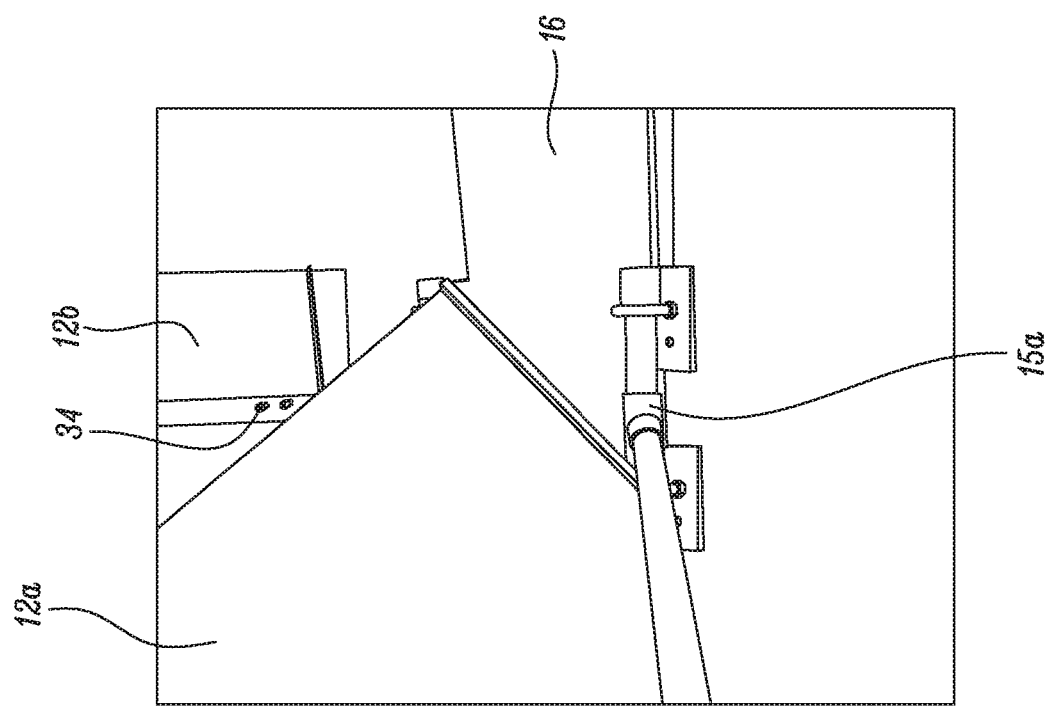
Figure 45A:
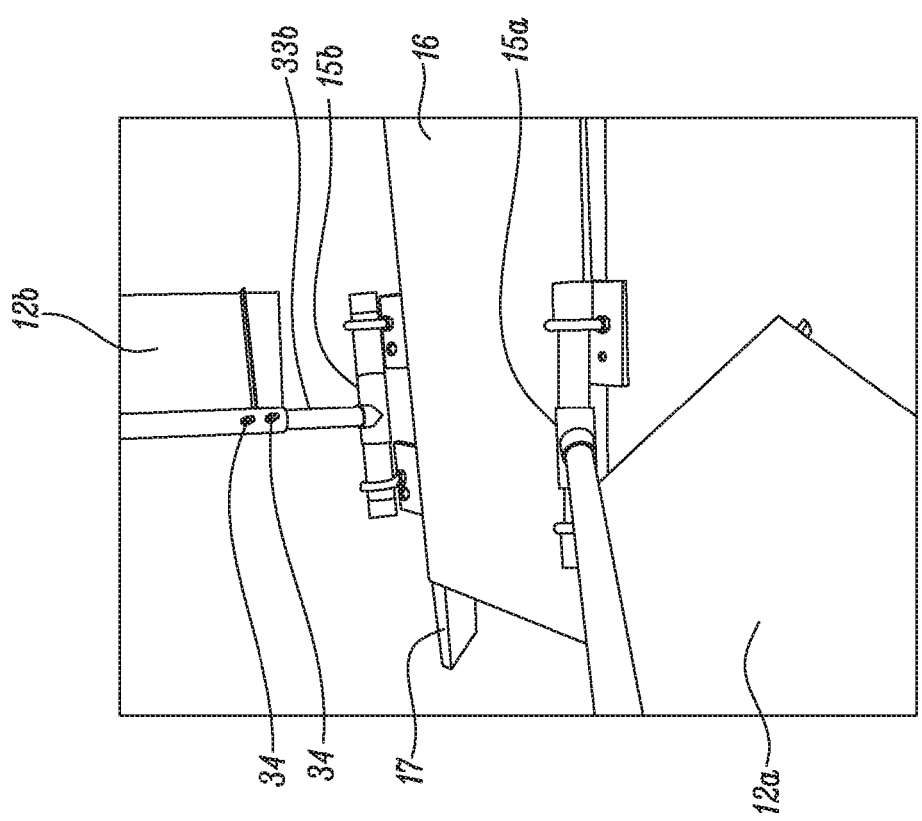
Figure 46B:
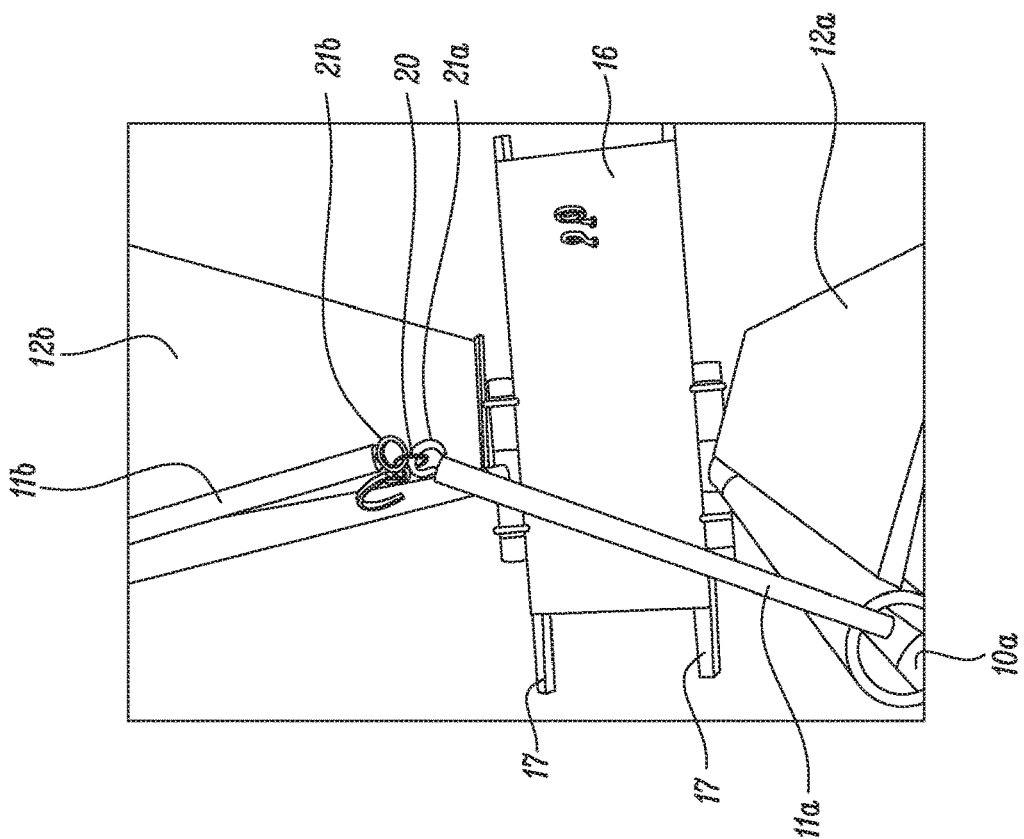
Figure 46A:
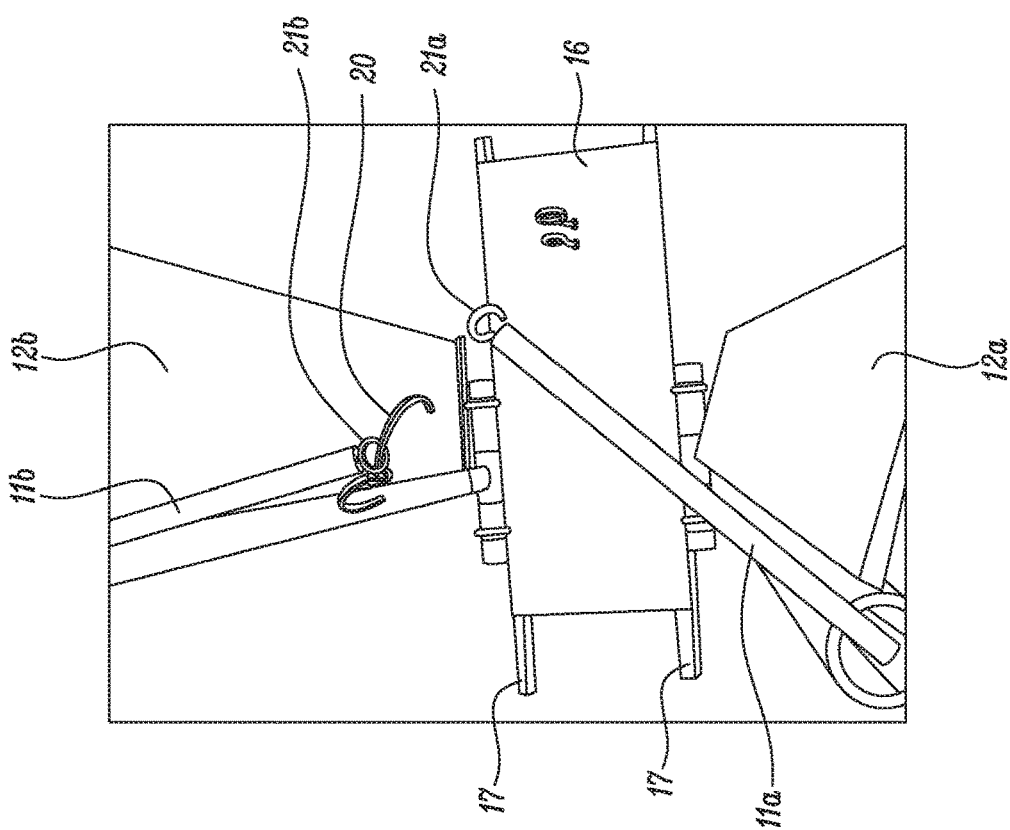
Figure 47:
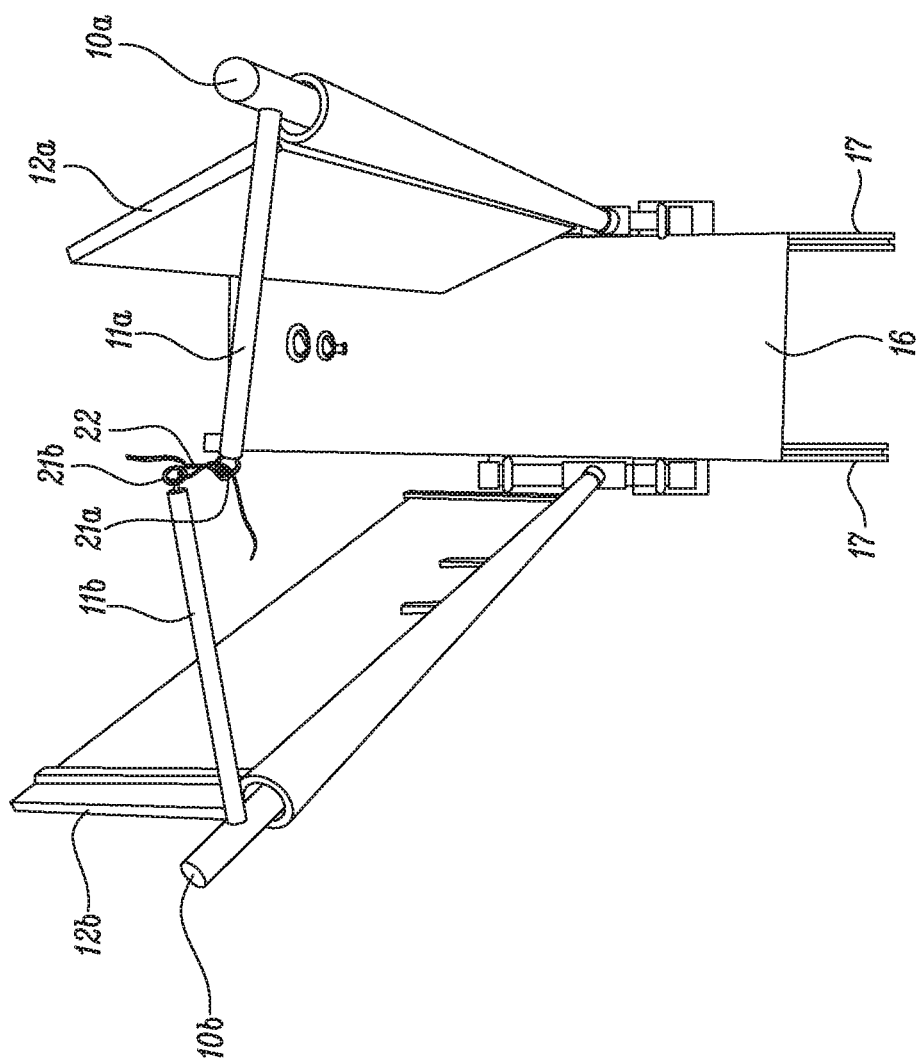
Figure 48:
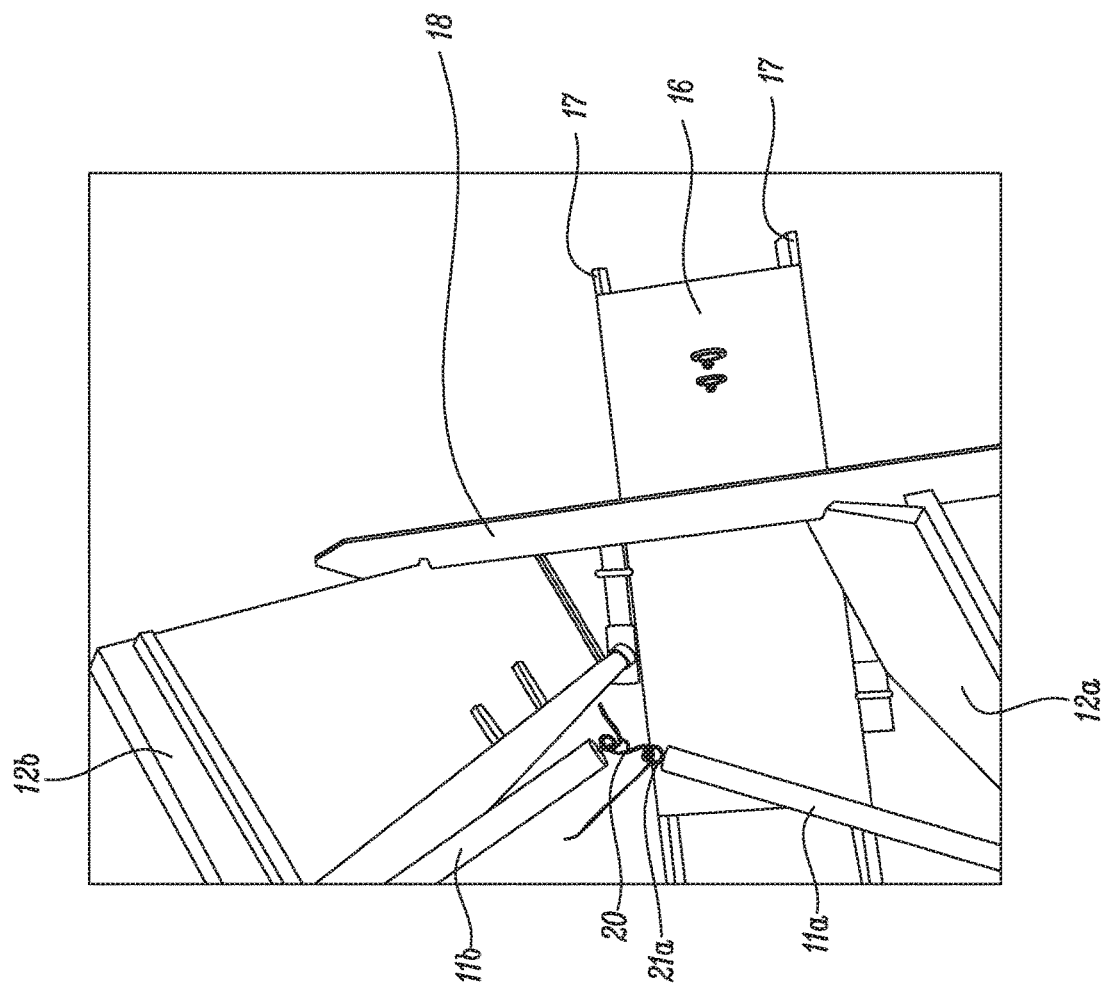
Figure 49:
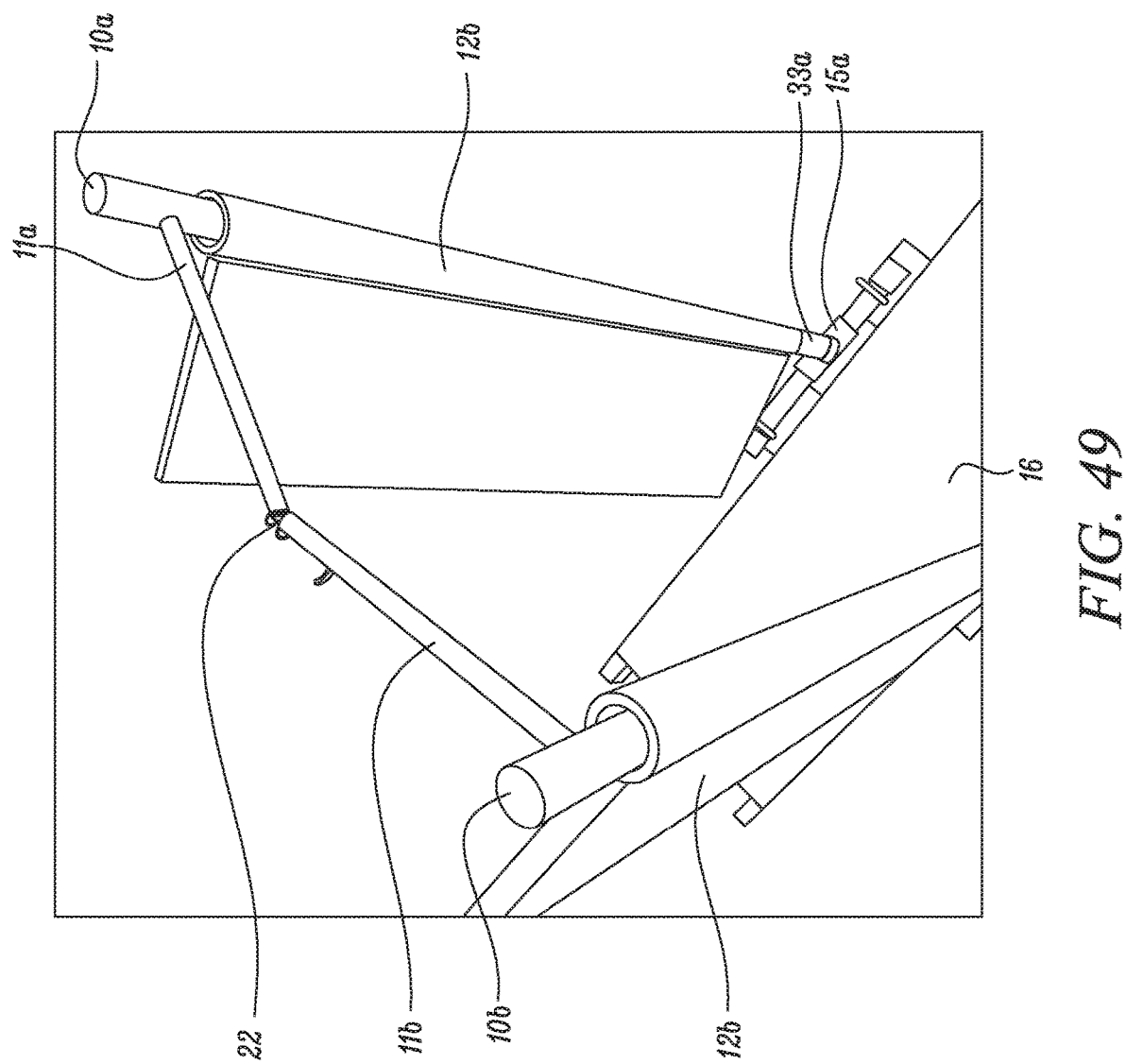
Figure 50:
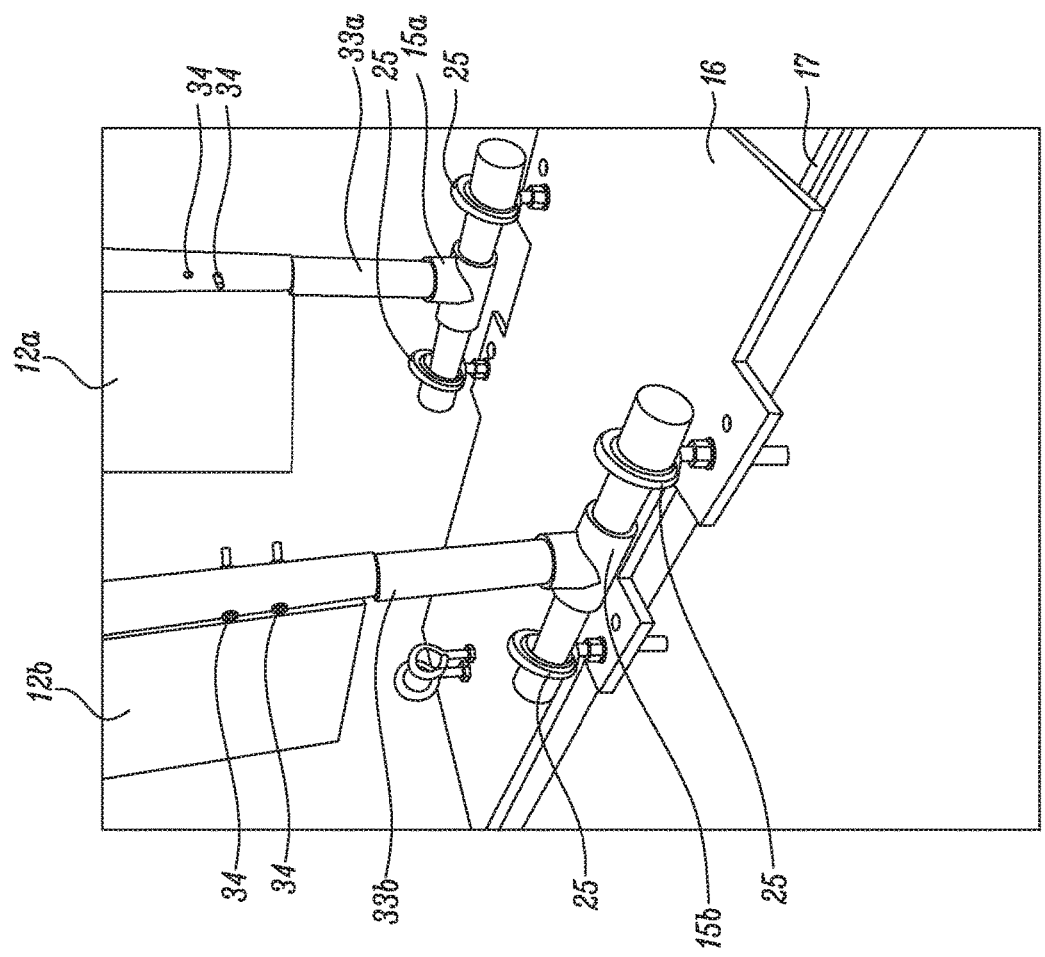
Figure 51:
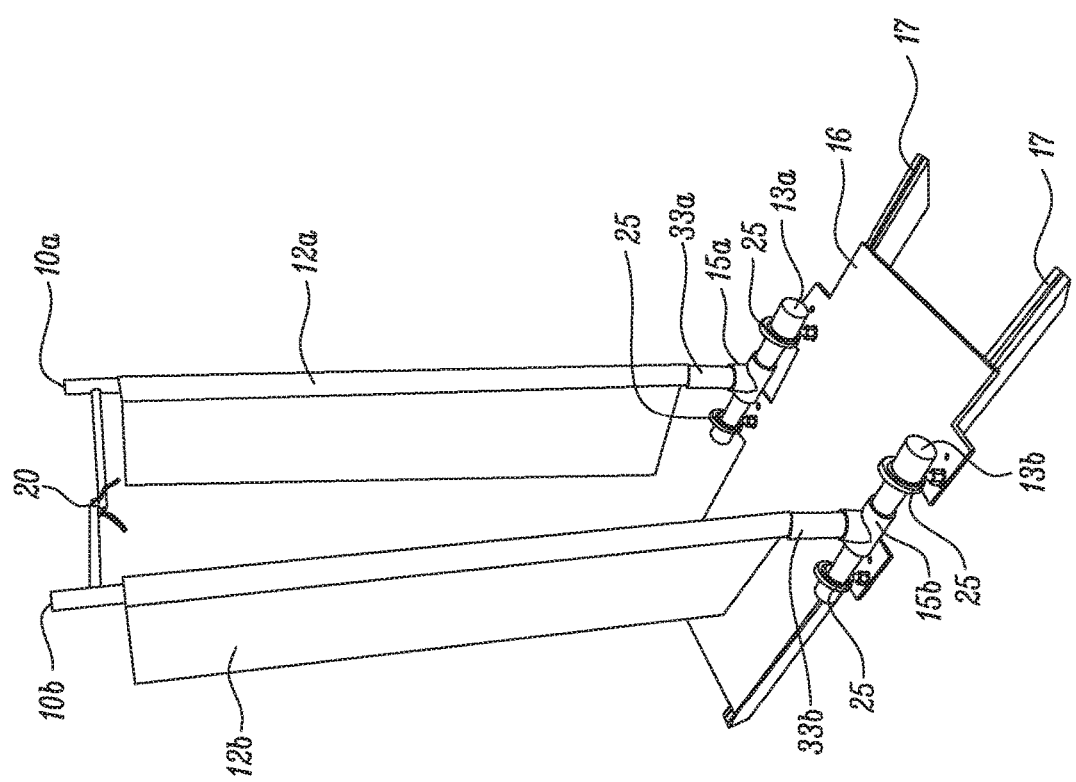
Figure 52:
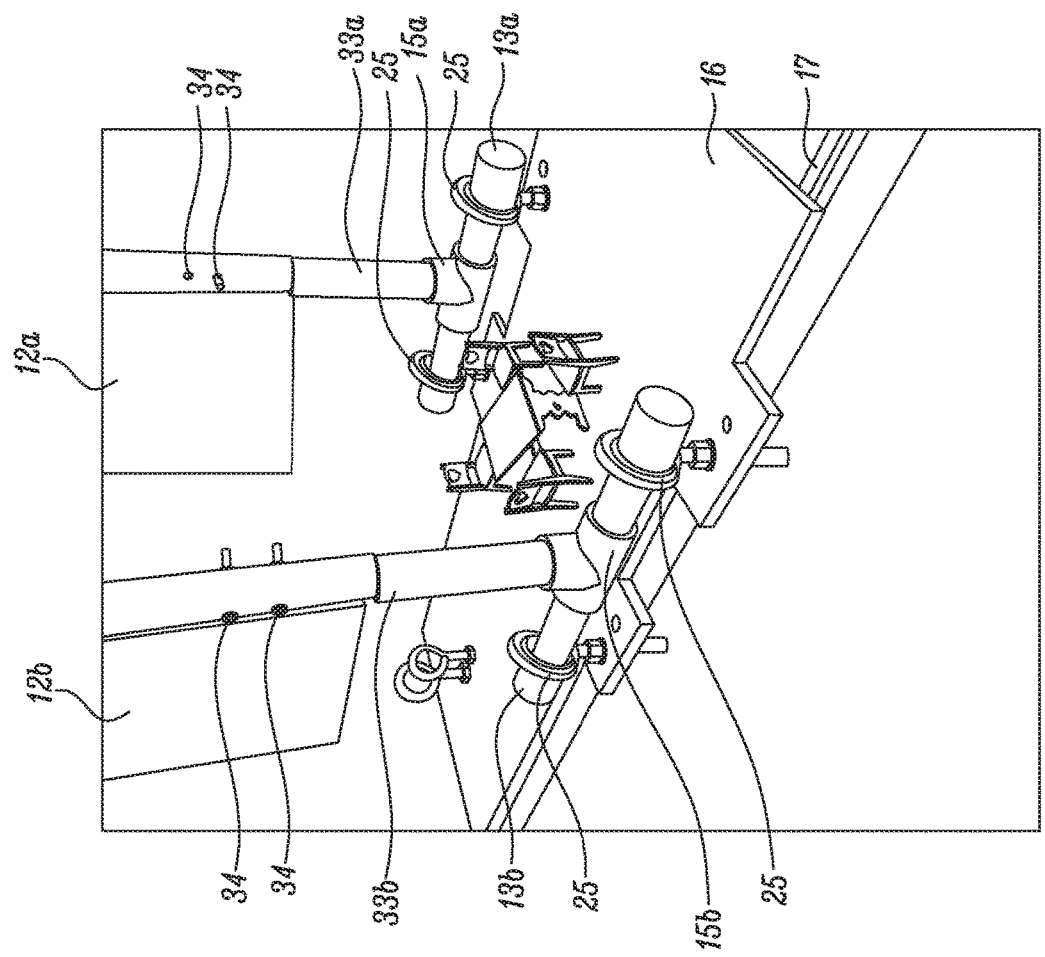

FIG. 8 is a front end view of a catamaran equipped with a single pair of parallel self-righting masts depicting the off-setting forces as the mast structures move in relation to each other by force of the wind is a front end view of a catamaran equipped with a single pair of parallel self-righting masts depicting the off-setting forces as the mast structures move in relation to each other by force of the wind;

FIG. 9 is a front end view of a catamaran equipped with a single pair of parallel self-righting masts depicting the offsetting forces as the mast structures move in relation to each other by force of the wind;

FIG. 10 is a front end view of a catamaran equipped with a single pair of parallel self-righting masts with a strut structure at the top of the masts for attaching fore and aft stays without impairing the rotation of the masts around the masts' vertical axis;

FIG. 11 is a top-down view of a catamaran equipped with a single pair of parallel self-righting masts with a strut structure at the top of the masts;

FIG. 12 is a front end view of a catamaran equipped with a single pair of parallel self-righting masts;

FIG. 13 is a front end view of a catamaran equipped with a single pair of parallel self-righting masts;

FIG. 14 is a front end view of a catamaran equipped with a single pair of parallel self-righting masts;

FIG. 15 is a front end view of a catamaran equipped with a single pair of parallel self-righting masts;

FIG. 16 is a side view of a catamaran equipped with two pairs of parallel s self-righting masts;

FIG. 17 is a side view of the bow portion of a catamaran equipped with two pairs of parallel self-righting masts;

FIG. 18 is a view of the top portion of a single pair of parallel self-righting masts;

FIG. 19 is a top view of the bow portion of a catamaran equipped with two pairs of parallel self-righting masts;

FIG. 20 is a top view of the bow portion of a catamaran equipped with two pairs of parallel self-righting masts;

FIG. 21 is a view of a portion of a single pair of parallel self-righting masts;

FIG. 22 is a view of a portion of a boat equipped with two sets of paired, parallel self-righting masts;

FIG. 23 is a side view of the bow portion of a boat equipped with a set of paired, parallel self-righting masts with a wind indicator;

FIG. 24 is a side view of the bow portion of a boat equipped with a set of paired, parallel self-righting masts with a wind indicator;

FIG. 25 is a side view of the bow portion of a boat equipped with a set of paired, parallel self-righting masts;

FIG. 26 is a top view of the bow portion of a boat equipped with a set of paired, parallel self-righting masts;

FIG. 27 is a front view of a catamaran-type boat equipped with two sets of paired, parallel self-righting masts;

FIG. 28 is a close-up view of the base of one mast of a set of paired, parallel self-righting masts;

FIG. 29 is a close-up view of the base of one mast of a set of paired, parallel self-righting masts;

FIG. 30 is a side view of the base of both masts of a set of paired, parallel self-righting masts;

FIG. 31 is a top view of a boat equipped with two sets of paired, parallel self-righting masts;

FIG. 32 is a close-up view of the base of one mast of a set of paired, parallel self-righting masts;

FIG. 33 is two views of the top of a mast of a set of paired, parallel self-righting masts depicting a structure for enabling the mast to swivel independently of fore-and-after stays;

FIG. 34 is a close up view of the base of a mast of a set of paired, parallel self-righting masts wherein the base of the mast is set on a rotating pin;

FIG. 35 is a view of a mast of a set of paired, parallel self-righting masts wherein the mast, sail, boom and fore equalizer are a single integrated unit;

FIG. 36 is a view of a mast of a set of paired, parallel self-righting masts wherein the mast is foldable;

FIG. 37 is a view of a mast of a set of paired, parallel self-righting masts wherein the entire mast structure has attachment structures for attaching and detaching the structure to the side of a hull of a boat;

FIG. 38 is a schematic of a mast inside of a sail tube;

FIG. 39 is a view of two mast holders, each rotated inward;

FIGS. 40a, 40b and 40c show the rotation of a mast holder from inboard on the deck through vertical to outboard around the long axis of one side of a boat;

FIGS. 41a, 41b and 41c show a similar rotation of the second mast (of the paired masts) holder on the opposite side of a boat;

FIGS. 42a, 42b, 42c, 42d and 42e show a sail tube (with integral sail) being inserted in a mast holder, as well as a sail tube's rotational locking mechanism;

FIGS. 43a, 43b, 43c and 43d depict a sail tube (with integral mast) rotationally locked to the mast;

FIGS. 44a, 44b, 44c and 44d depict the opposing mast with a sail tube (with integral mast) rotationally locked to the mast;

FIGS. 45a and 45b depict one of a paired mast rotating away from its paired mast on the opposite side of the deck as its mast-base sleeve rotates around the long axis of the side of the side of the boat, and, independently, a mast and sail tube rotating around the vertical axis of the mast-base sleeve;

FIGS. 46a and 46b show a top view of inward ends of a paired set of force equalizer spars dynamically retractably attached at their inward ends;

FIG. 47 shows a top view of a boat with a single set of paired masts with the structures depicted in FIGS. 38-46;

FIG. 48 is a top view depicting opposing and off-setting arc motions of the ends of two force equalizer spars in a set of paired masts;

FIG. 49 shows closer-in top view of the tops of a single set of paired masts with the structures depicted in FIGS. 38-46;

FIG. 50 shows closer-in top side of the bases of a single set of paired masts with the structures depicted in FIGS. 38-46;

FIG. 51 shows a top/front view of a boat with a single set of paired masts with the structures depicted in FIGS. 38-46; and FIG. 52 shows a front view of a boat with a single set of paired masts with a deck area unimpeded by masts, rigging or lines.

DETAILED DESCRIPTION OF THE INVENTION

In contrast to the description of the Background of the invention, the disclosure provided herein provides a system of paired, side-by-side masts located at or near the sides of the boat, and with force equalizer spars located near the tops of the masts that does not impair the use of the main central space of the hull, the deck and above the deck, freeing that space for use for any purpose, such as superstructure, housing, space for cargo, space for human activities or otherwise. Further, this paired mast design obviates the need for side-to-side rigging and locates the fore-and-aft rigging along the sides or even outboard of the sides of the boat.

Additionally, such a system of paired, side-by-side masts can be added (including detachably) to boats not otherwise designed for sails and masts. For instance, an existing container ship may have such a paired, side-by-side mast system retrofitted to it without changing the superstructure and cargo/container areas of the ship. In additional, in such a context, such a paired, side-by-side mast system may be detachably integrated into the hull such that the masts may be installed to assist in ocean passages (thereby reducing fuel costs and other environmental costs of combustion engines and propellers) and may be removed prior to the container ship docking under the cranes and systems that place and remove the containers from the ship.

Multiple pairs of paired, side-by-side masts may be installed on a boat and/or designed for new boat designs that are optimized for utilizing paired, side-by-side mast systems.

For daysailer sailboats with the standard in-line mast, the heeling of the boat as well as the small cockpit with the mainsail boom swinging low (and frequently) dangerously overhead, and frequently a centerboard case located in the cockpit (necessitated to assist in preventing excessive heeling and capsizing), creates a difficult environment for anyone onboard, and especially for the elderly and people with limited mobility (and next to impossible for those in wheelchairs), not to mention a very difficult, if not dangerous, environment for them just to climb onboard.

The open deck (no mast or boom over the centerline, and no centerline ropes, pulleys, winches, and related gear located at a minimum under and along the boom, at the base of the mast and in and around the cockpit area) and anti-heeling design enabled by the paired, side-by-side masts creates a far more friendly environment for everyone, including the elderly, people with limited mobility and people in wheelchairs who otherwise would find a normal daysailer or cruising boat almost impossible to be on, let alone enjoy. Further, a multi-hull, open-deck design with no masts or booms overhead except above the sides of the boat, enables a boarding process from a dock that enables wheelchairs to cross a ramp from the dock directly onto an open, flat deck, for instance, at the bow, stern or sides.

Further, the paired, side-by-side masts design offers an entirely new opportunity to optimize and increase sailing performance, whether with a single pair of side-by-side masts or multiple pairs. And, the design offers the opportunity to utilize new foil/wing type sails to optimum advantage while at the same time reducing the complexity and challenges of sailing current-design high performance catamarans that tend to be at significant risk of extreme heeling, capsizing and roll-overs, due in part to a combination of single large mainsails and jibs and centerline masts and rigging.

In particular, the present disclosure provides a parallel (dual, side-by-side) paired mast design whereby the masts are installed in one or more pairs, with each mast in a pair located across from the other mast in the pair, whereby the foot of each such paired mast is located on or near the sides of the boat. Further each mast's base is moveably attached to the sides or deck of the boat such that (a) the tops of the masts each rotate side-to-side but not fore-and-aft around the foot of the mast, and (b) the masts each rotate around its vertical axis. Further, the boom of the sails (or the foot of the foil if the sails are an integrated mast/sail foil/wing design) are fixably attached to the masts such that when the sail/foil boom rotates, the sail/foil boom causes the mast to rotate around its vertical axis.

In an illustrative example, the sail is fixably attached to a hard case sleeve that rotates around the center long axis of the mast such that the sail and sleeve are enabled to rotate 360 degrees independently around the center long axis of the mast. Additionally, the sleeve/sail component incorporates a rotation control and locking mechanism to the mast. The rotation control and locking mechanism enables the user to (1) set the rotational position of the integral sleeve/sail at any point in the 360 degrees around the center axis of the mast, and (2) lock the sleeve/sail component at that rotational position. When the sleeve/sail component is locked in position, any rotation of the sleeve causes the mast to rotate identically as if sail/sleeve and mast were a single component.

The rotational position and locking mechanism may be implemented as a single component, or as separate mechanisms. An implementation of the rotational position control consists of ropes or wires that attach to two external points on the sleeve which ropes or wires lead to one or more winches that a user engages to rotate the sleeve/sail in one direction or another in the 360 degree rotation around the center long axis of the mast. By cleating or tying down the wires/ropes, the rotational position of the sleeve is held at a specific point. The locking mechanism may be a set of physical pins that are inserted through two (or more) opposing holes in the sleeve and which pins pass through aligned holes in the mast. The aligned holes in the mast are set at various compass points around the mast. By passing a pin through a hole in the sleeve, then through a specific compass point hole in the mast, through the mast and through the opposing hole in the sleeve, the sleeve/sail is locked in that compass point rotation around the mast.

Alternate systems for rotating and locking the sleeve may include such systems as motorized and electronic systems, ball bearings and remote controls.

The rotational controls of the sleeves on each of a paired set of masts are managed to synchronize their rotational position. In this way, the rotational position setting of each sleeve on each mast is, in a dynamically controlled rotational position setting system, set to the same compass points around their respective masts by a single controller system operated by a user. An implementation of this single controller for the rotational position setting of the sleeves of each of the paired set of masts is in the form of a wheel located at or near the boat's steering position, which wheel, when rotated by the user, operates a winch/pulley system whereby the wire/ropes that are fixably attached to each sleeve are reeled in or out simultaneously to rotate to and hold the sleeves at a new compass position around their respective masts. The sleeves are then locked to the mast such that a rotation of the sleeves serves to rotate the mast, and pivoting of the sail serves to pivot the mast.

The force equalizer spars work identically in this sleeve/sail implementation as they work as elsewhere described. The spars are fixably attached at a specific compass point on each mast such that the spars point inwards towards each other. When the sleeves are unlocked from the masts, the sleeves are rotatable to a new compass point around the mast without changing the orientation of the spars. These spars further enable this sleeve system to rotate in 360 degrees around a mast because, for instance, the spars in a paired set of masts obviate the need for sail controls and mast rigging that would otherwise prevent or inhibit an operative full 360 degree (or even partial 360 degree, such as 180 degree or less) rotation of a mainsail boom, such as, among other pieces of rigging and sail control on standard sailboats: travellers, mainsheets and side stays.

This sleeved system for setting the rotational position of the sails enables a de-coupling of the rotational position of the sleeve/sails even in the context of a paired mast system. By releasing the synchronized coupling of the rotational position of the sleeves in a paired mast system, each of the sails can be set in an outward position if desired for sailing downwind, and then re-coupled when sailing at a non-downwind point to the wind direction.

A benefit of this 360 degree rotational sleeve system is that a sailboat is enabled to sail backwards (effectively making the stern act as the bow of the boat). In other words, as an example, if the wind is coming from a compass point from abeam to aft of the boat, and (1)(a) the sailor desires to move in a forward and non-directly downwind position, then the sleeve/sails are set (simultaneously if using a coupled rotational system) and locked at their appropriate position relative to the direction for the boat to sail in relation to the wind with the luff and clue of the sail towards the stern, or (1)(b) the sailor desires to sail forward and directly downwind direction, then the sleeves/sails are decoupled rotationally and set such that each sail is outboard from its respective side of the boat; however (2) if the sailor desires to sail in a backward direction, the sailor simply rotates the sleeves 180 degrees and locks them such that the luff of each sleeve/sail is pointed to stern and the clew of the sail is pointed towards the bow.

To the extent rigging is required by a specific implementation of the disclosure, rigging is fore-and-after for purposes of maintaining the mast orientation in relation to the bow-to-stern axis of the boat, but the rigging to the sides of the boat is replaced by a dynamic spar system (force equalizer spars) fixably attached near or at the top of the masts. Each mast in a paired set of masts has its own force equalizer spar oriented at 90 degrees to the fore-and-aft axis of the boat and aiming inwards towards the other of the paired masts. The inward pointing length of each of a paired set of force equalizer stars are less than ½ the length of the distance between the tops of the paired side-by-side masts. The inward ends of the paired-masts' force equalizer spars are attached via a system that allows each such spar to rotate in multiple dimensions, but that creates, for each spar, an equal and counter-balancing counter-force such that the spars, interacting with each other both work to constantly align the masts in a vertical position relative to each other regardless of the direction and power of the wind. This dynamic mast/spar system of "force equalizer spars translates the lift force generated by the sail area(s) to forward motion of the boat without placing a heeling force on the body of the boat. The replacement of side rigging with the dynamically attached force equalizer spars combined with the two rotational movements of each mast create a dynamic self-righting (wind-driven) mast system independent of the hull design and weight of the boat, and reducing or eliminating the need for keels or centerboards as far as those are utilized to prevent heeling and capsizing.

There are other structures/ways of using masts to offset the heeling of a boat, such as by attaching the masts to foils below water that, when the masts tilts, the foils provide opposing lift. The illustrative example described in the preceding paragraphs and in the figures provides a desirable structure for many reasons, including (1) the simplicity of the dual, dynamically connected force equalizer spar system described therein, (2) the leverage achieved by locating the spars at or near the tops of the masts, and (3) the added benefits of locating the dynamically connected spars at or near the tops of the paired masts with benefits include deck and superstructure clearance for use other purposes.

Figure 1:
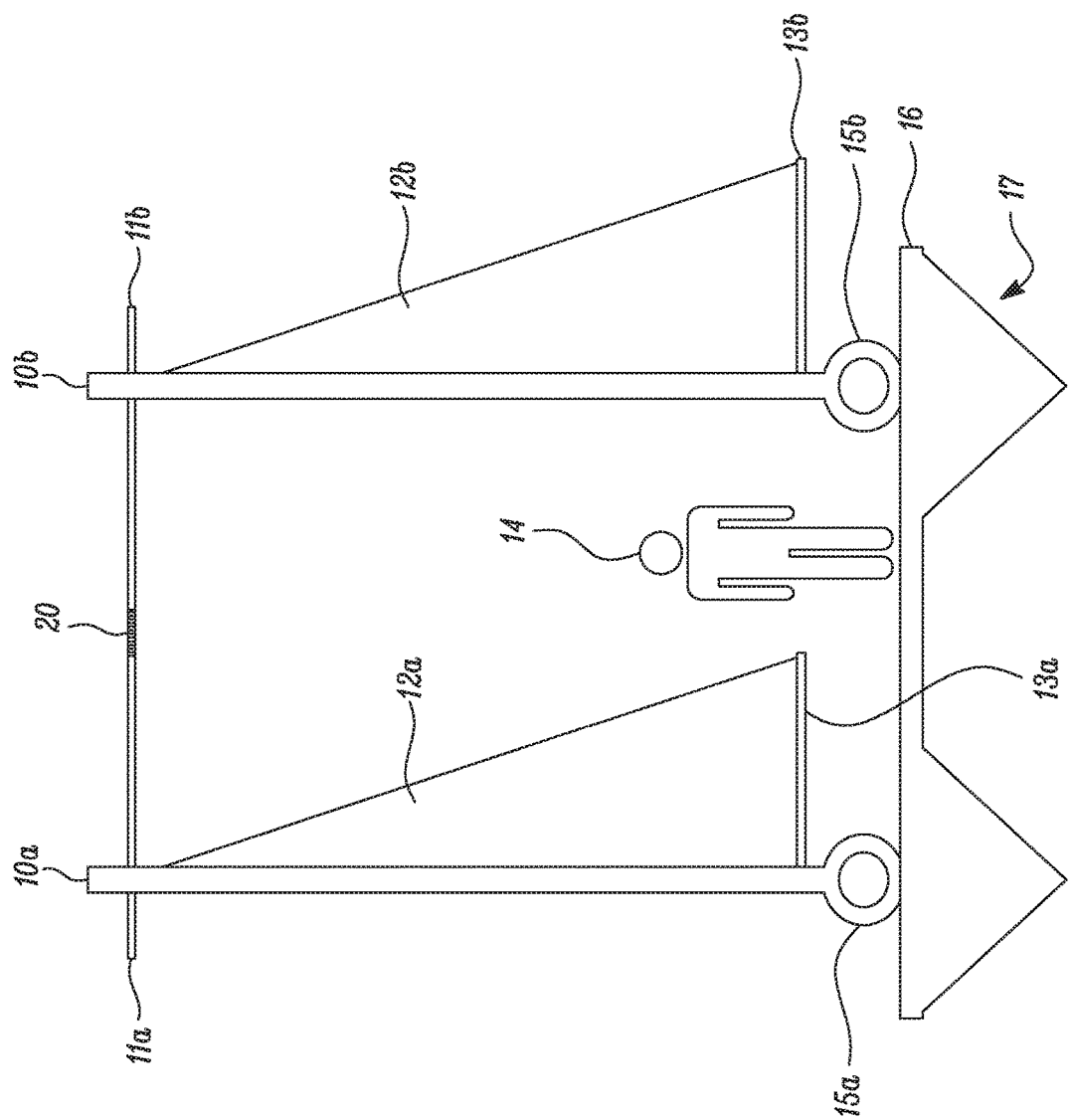
FIG. 1 is a front end view of a boat equipped with a single pair of parallel self-righting masts.

FIG. 1 is a front end view of a boat in the form of a catamaran with a deck 16 and two hulls 17 which is equipped with a single pair of parallel self-righting masts (Mast A 10a and Mast B 10b). Mast A 10a has a sail 12a, boom 13a and force equalizer spar 11a. Mast B 10a has a sail 12b, boom 13b and force equalizer spar 11b. The force equalizer spars of Mast A and Mast B are retractably attached at their inboard ends by a dynamic connector system 20.

While this figure shows a catamaran-style hull, the disclosure can be applied to multiple hull configurations, such as single hull designs and trimarans. The masts, booms, force equalizer spars and sails may be made of any type of material used in those contexts in current or historic sailboats, including, for instance masts and spars made of wood, metal and carbon fiber, or combinations or composites thereof. Further, the sail may be made based on airplane wing designs. And, as depicted in subsequent Figures, the sail and boom may be an integrated piece.

Both Mast A and Mast B incorporate at their respective bases a connection system 15a, 15b to the deck such that each mast rotates side-to-side towards and away from the other mast (in a plane perpendicular to the bow-stern axis).

The dynamic connector system 20 regulates the opposing movements of the inward ends of the paired mast system's force equalizer spars 11a, 11b by counter-acting the motion of the inward ends of the two force equalizer spars to maintain the vertical alignment of each of the masts 10a, 10b in the paired system.

Figure 2:
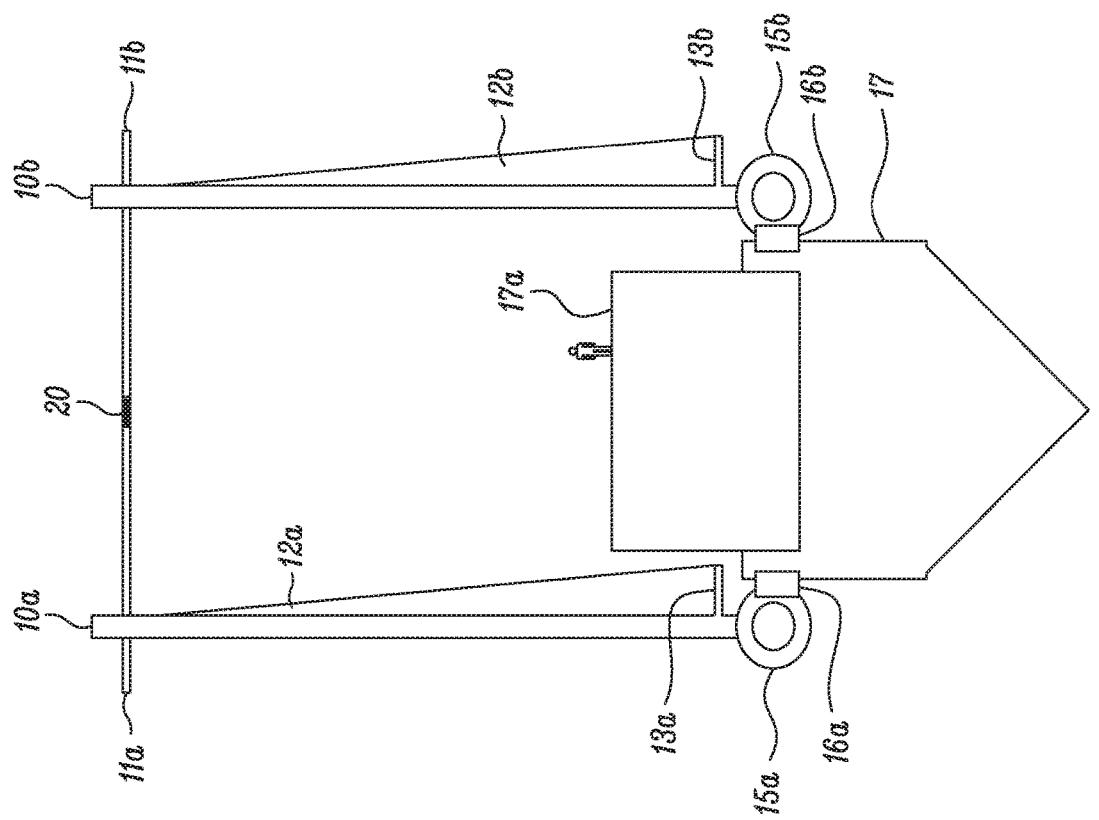
FIG. 2 is a front end view of a single hull cargo ship equipped with a single detachable pair of parallel self-righting masts.

FIG. 2 is a front end view of a single hull 17 ship equipped with a single detachable pair of parallel self-righting masts 10a, 10b. The view depicts the space above the deck stacked with cargo and/or the superstructure 17a of the ship. In this implementation, each of the masts 10a, 10b is detachably attached to the hull 17 at an attachment point 16a for mast 10a and an attachment point 16b for mast 10b.

The masts have the components as described in FIG. 1.

Figure 3:
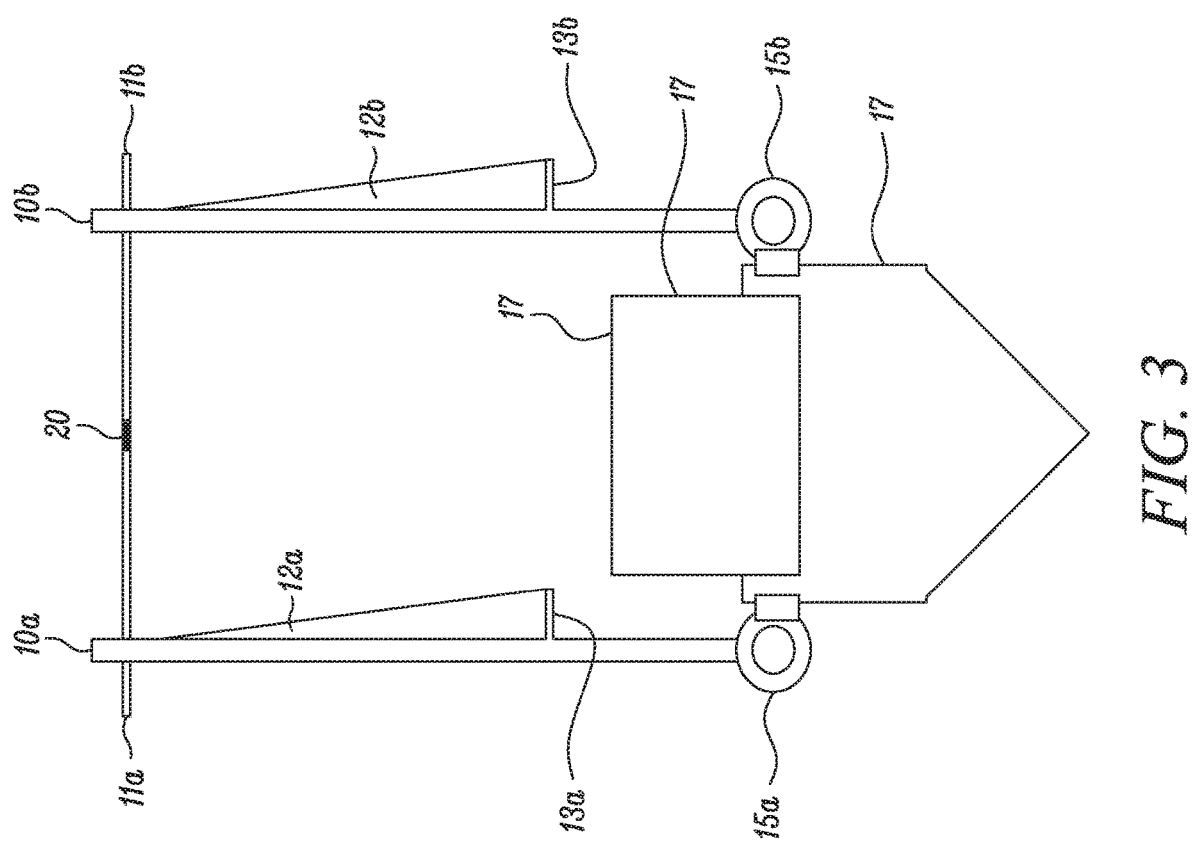
FIG. 3 is a front end view of a catamaran equipped with a single pair of parallel self-righting masts with sails above the level of the deck-stacked cargo load.

FIG. 3 is a front end view of a single hull ship equipped with a single pair of parallel self-righting masts with sails as described in FIG. 2 above, except that booms 13a, 13b at the base of the sails 12a, 12b are set above the level of the top of the deck-stacked cargo load and/or above-deck superstructure of the ship.

Figure 4:
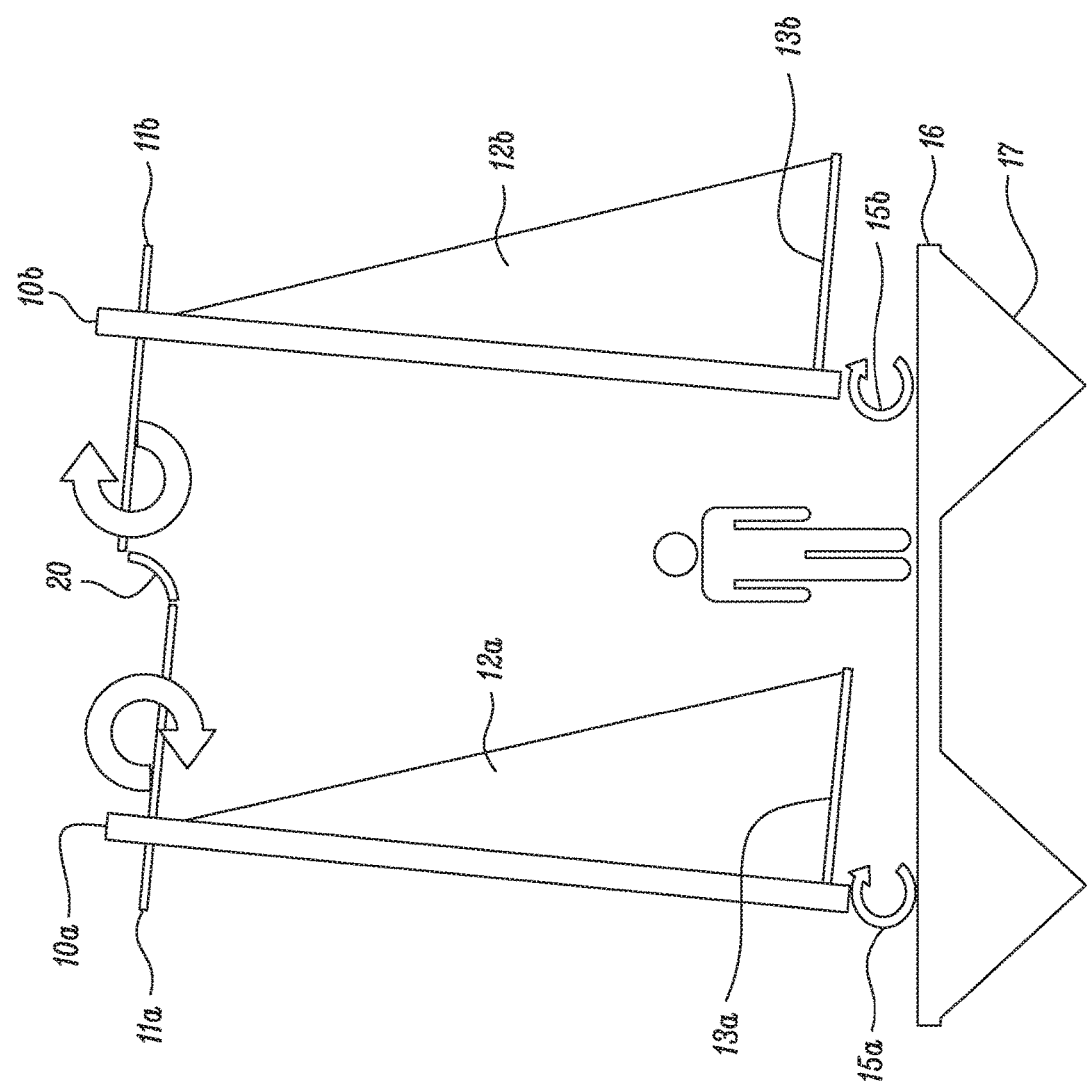
FIG. 4 is a front end view of a catamaran equipped with a single pair of parallel self-righting masts depicting the off-setting forces as the mast structures move in relation to each other by force of the wind.

FIG. 4 is a front end view of a boat equipped with a single pair of parallel self-righting masts depicting the off-setting forces as the mast structures 10a, 10b move in proscribed synchronous rotations in relation to each other by force of the wind. As the wind moves across the windward side of the boat, the top of the windward mast of the paired masts (in this Figure, mast 10a) is rotated inwards, which moves the inward end of that mast's force equalizer spar 11a in an arc that is partly downwards. Similarly, as the wind moves across the windward side of the boat, the top of the leeward mast of the paired masts (in this Figure, mast 10b) is rotated outwards, which moves the inward end of that mast's force equalizer spar 11b in an arc partly upwards. Thus, the inward end of force equalizer spar 11a is driven in an arc downwards and away from the inward end of force equalizer spar 11b which is driven in an arc upwards and away from the inward end of force equalizer spar 11a. The dynamic connector system 20 retracts the ends of the two force equalizer spars 11a, 11b, thereby maintaining equilibrium in the paired mast system with the masts in their vertical position. The counter-synchronized circular arrows depict the rotation of the force equalizer spars 11a, 11b in a relation to each other as wind blows into the sails 12a, 12b of the paired masts.

Mast A 10a: the inward end of Mast A's force equalizer spar 11a inscribes an arc as the windward side mast 10a tilts to leeward as wind hits the mast's sail. The connection system 15a for mast 10a allows the mast 10a to rotate to leeward (inward towards the centerline of the boat, and towards Mast B).

Mast B 10b: the inward end of Mast B's force equalizer spar 11b inscribes an arc as the windward side mast 10b tilts to leeward as wind hits the mast's sail. The connection system 15b for mast 10b allows the mast 10b to rotate to leeward (outward from the centerline of the boat, and away from Mast A).

Figure 5:
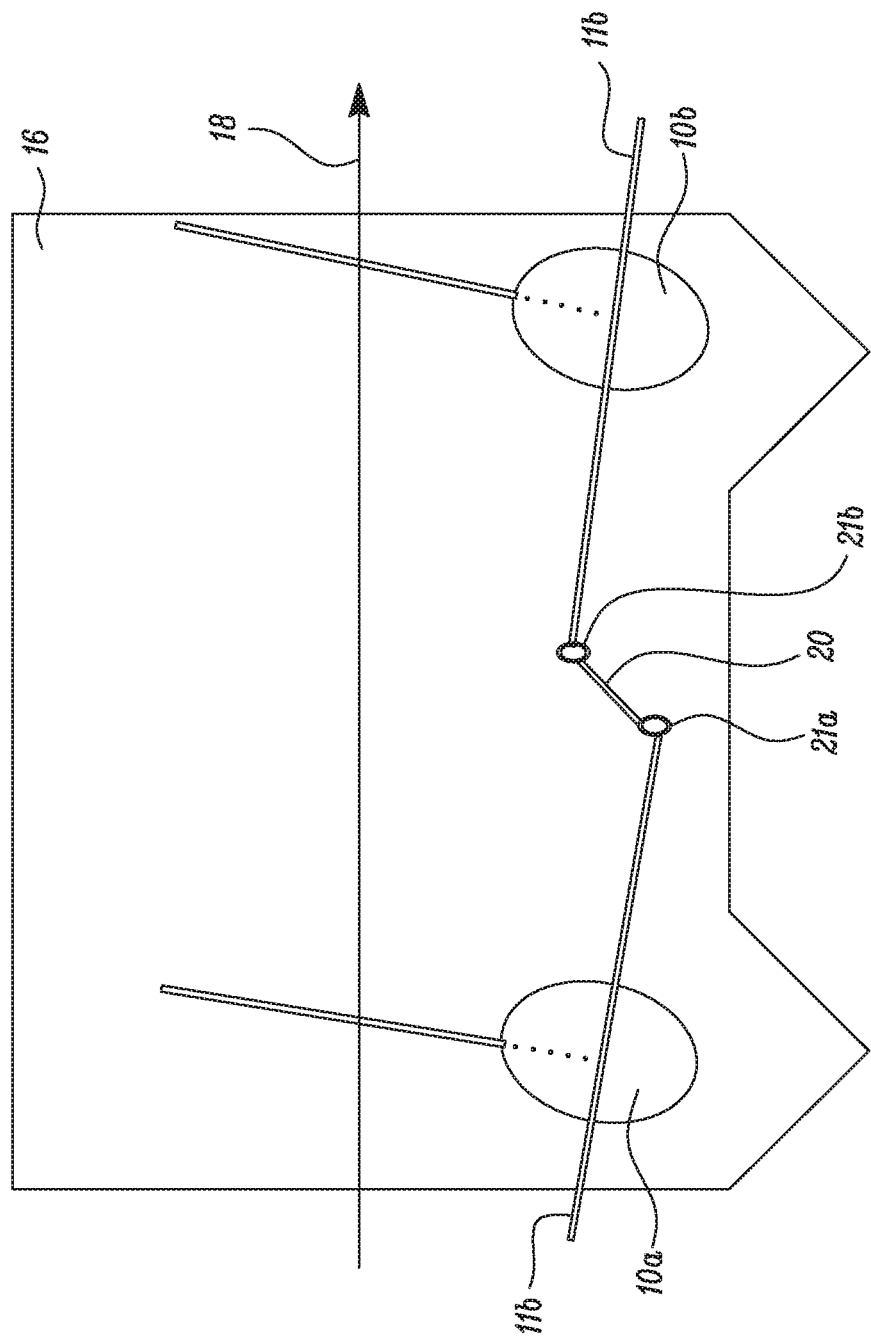
FIG. 5 is a top-down view a catamaran equipped with a single pair of parallel self-righting masts depicting the off-setting forces as the mast structures move in relation to each other by force of the wind.

FIG. 5 is a top-down view a boat equipped with a single pair of parallel self-righting masts 10a, 10b depicting the off-setting forces as the mast structures move in relation to each other by force of the wind with a wind direction/force indicator 18. The dynamic connector 20 regulates and retracts each of the entire masts 10a, 10b systems by offsetting the opposing arcs of the inward ends of the two opposing force equalizer spars 11a, 11b.
The how of the boat is indicated by the pointed ends of the deck 16. The stern of boat is the flat end of the deck 16. In this Figure, the force equalizer spars 11a, 11b are integral components of each of the masts, and their inward ends incorporate attachment mechanisms 21a, 21b for the dynamic connector system 20 that regulates and retracts the ends of the force equalizer spars 11a, 11b to return to their nearest point to each other.

Mast A: The outward end of Mast A's sail's boom rotates inward towards the center bow/stern axis of the hull, while maintaining a 90 degree orientation of the line of the sail's boom to the line of the mast's force-equalizing spar. Similarly, the inward end of Mast A's force equalizer spar rotates towards the bow as (windward side) Mast A's sail's boom rotates inwards, and maintaining a 90 degree orientation of the sail boom to the force-equalizing spar.

Mast B: The outward end of Mast B's sail's boom rotates outward away from the center bow/stern axis of the hull, while maintaining a 90 degree orientation of the line of the sail boom to the line of the mast's force-equalizing boom. The inward end of Mast B's force equalizer spar rotates towards the stern as (leeward side) Mast B's sail's boom rotates outwards, while maintaining a 90 degree orientation of the line of the sail's boom to the line of the mast's force-equalizing spar.

While the ends of the booms of the sails of the paired masts move in the same direction as the end of the other boom (both move away from the direction the wind is coming from), the ends of the force equalizer spars 11a, 11b move in opposing directions from each other as each of the masts 10a, 10b rotate both with their respective booms and with the hull attachment systems 15a, 15b. Consequently, the opposing arcs inscribed by the inward ends of each of the force equalizer spars 11a, 11b traverse the inside of a curved plane with each of the planes' concave sides facing its respective force equalizer spar's inward end. As they two ends of the force equalizer spars 11a, 11b move in arcs away from each other, the dynamic connector 20 activates to retract them back to their nearest position to each other.

Figure 6:
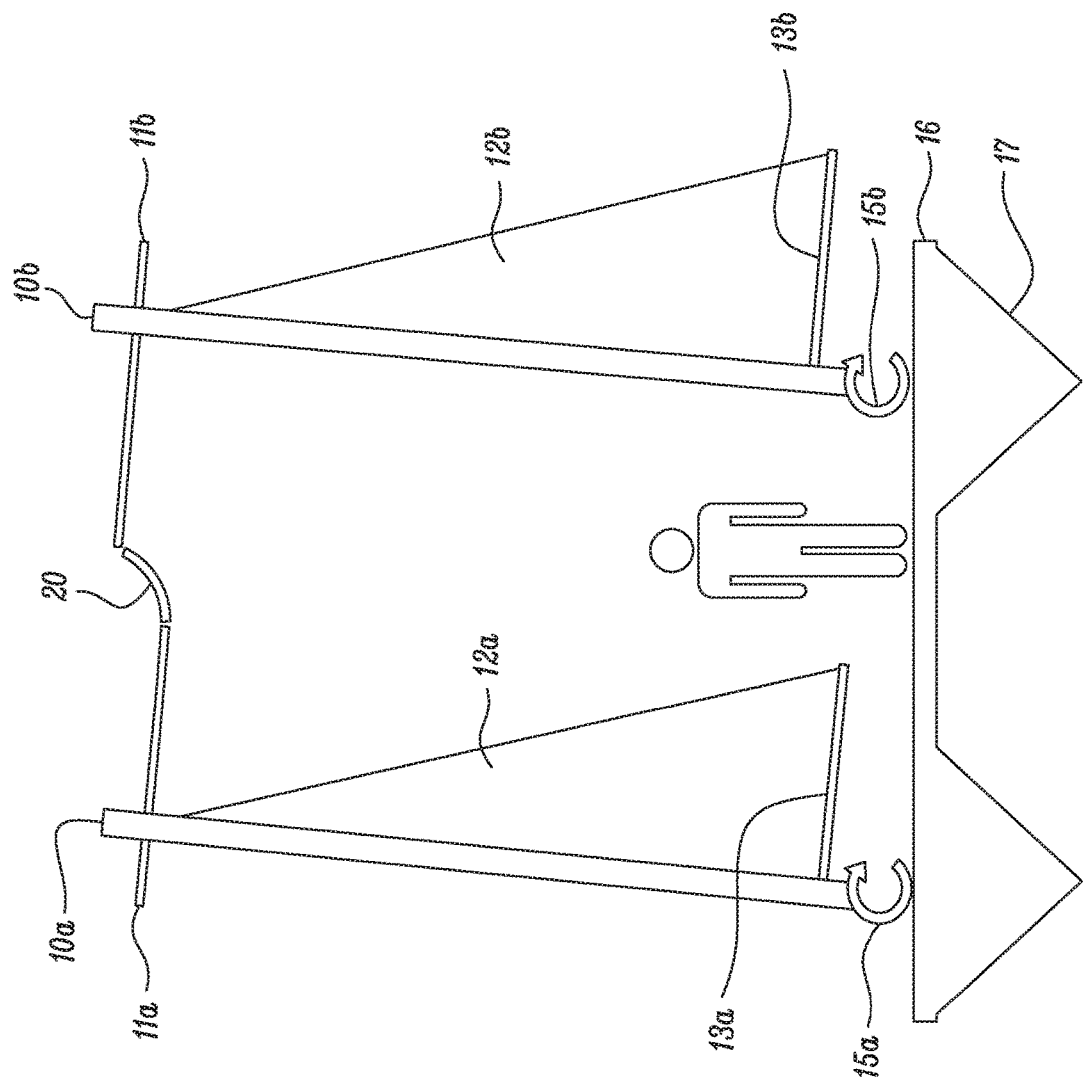
FIG. 6 is a front end view of a catamaran equipped with a single pair of parallel self-righting masts depicting the off-setting forces as the mast structures move in relation to each other by force of the wind.

FIG. 6 is similar to FIG. 4 wherein the system attaching each of the paired masts 10a, 10b to the deck 16 shows the inward rotation of the windward mast 10a and the outward rotation of the leeward mast 10b, which simultaneously causes the inward end of the windward mast's force equalizer spar 11a to arc downwards and away from the inward end of the leeward mast's 10b force equalizer spart 11b which is arcing upward and away from the inward end of the windward mast's force equalizer spar 11a. The opposing arcs activate the dynamic connector 20 to retract the two ends of the force equalizer spars back to their nearest point to each other, thereby utilizing the force of the wind to dynamically stabilize the entire mast/sail systems in upright positions, and driving the boat in the desired direction.

A simple implementation of the dynamic connector 20 is an elastic cord that stretches as the inward ends of the force equalizer spars arc away from each other, and draws the two ends back as the elastic cord retracts to its unstretched state. More complex control systems are implemented for the dynamic connector depending on the design and performance specifications for the boat. These control systems may include motorized retraction of the two inward ends of the force equalizer spars, including by wired controls through the mast to a control center on or near the deck of the boat, a similar motorized retraction system operated wirelessly by remote and/or machine learning. A further alternate implementation when a powered system is not desired, is a winched retraction system using a cord or rope running from the inward end of one or both of the force equalizer spars through the mast to the deck area where a winch system is located.

In this figure, each of the sails' booms 13a, 13b are fixably attached to their respective masts 10a, 10b in a fixed position such that each sail boom rotates its respective mast as the wind pressures the sail and boom to rotate. In later figures, each unified sail/boom assembly 12a, 12b incorporates a sleeve component inside of which is the mast component, and which sleeve permits each sail/boom assembly to be detachably fixed at rotation points around the mast effectuating the combined benefit of maintaining the direct inward alignment of the force equalizer spars while enabling the sail assemblies to be optimally set in relation to the desired point on the wind at which the boat is desired to be sailed.

In another illustrative example, the force equalizer spar is slide-ably attached (such a hydraulically) to the mast such that the force equalizer spar's inboard end can be slid outward and away from the opposing paired mast's force equalizer spar thereby exerting additional force to offset the rotational forces of the wind on the sails of each mast.

Figure 7:
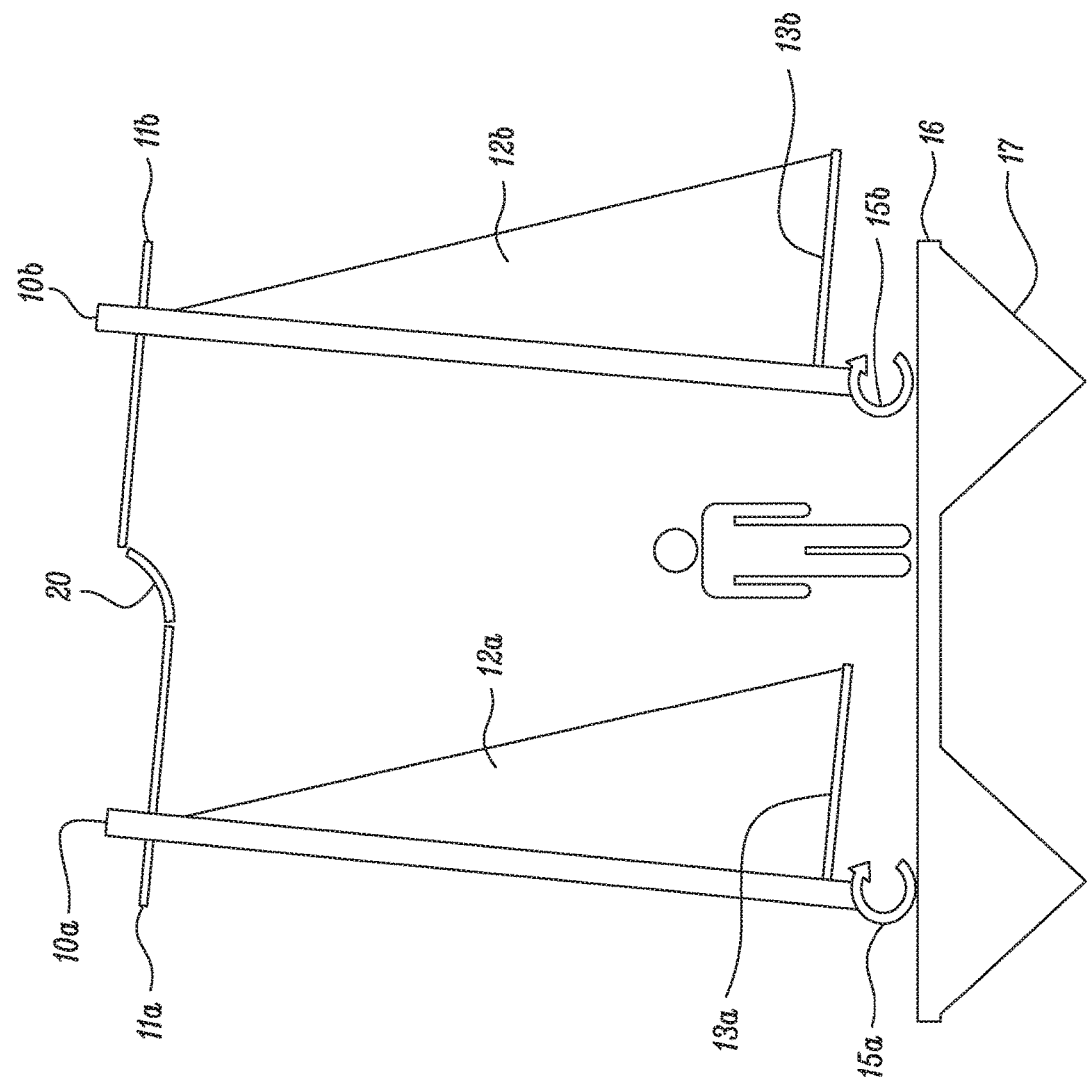
FIG. 7 is a front end view of a catamaran equipped with a single pair of parallel self-righting masts depicting the off-setting forces as the mast structures move in relation to each other by force of the wind.

FIG. 7 is similar to FIG. 6. This Figure depicts a boat with a single set of paired masts 10a, 10b. In other illustrative examples, a boat may have multiple paired mast systems. Multiple paired mast systems on the same size boat permit alternate performance specifications. For instance, using 2 sets of paired masts create an option for smaller sail area and/or shorter masts and one set of the paired masts to be located farther towards the stern and the other farther towards the bow. In contrast, a boat with a single paired mast system will have the masts located more towards the fore-and-aft center of the boat, and may incorporate taller masts and larger individual sail areas. Again, the choice of these options will be determined by the desired performance and other criteria for the specific application and market for a specific vessel.

FIG. 8 depicts a view of the combined effect of the (a) rotation of each of the masts 10a, 10b around their center core, and (b) the tilt/rotation of each of the masts 10a, 10b approximately at their connection assemblies 15a, 15b to the deck 16 (in a plane with the corresponding tilt/rotation of the its paired mast on the opposite side of the hull) which cause the inner ends of each of the force equalizer spars 11a, 11b to each sweep an arc that maps to the inside of a curved plane where the center-most, outer-most point of the curved planes are facing each other at or near the nearest point of the retracted dynamic connector 20. Further, this and other figures depict that the paired mast system of this disclosure incorporates connector assemblies 15*a*, 15*b* for the masts 10*a*, 10*b* wherein the connector assemblies both permit and control/proscribe the motion of the masts 10*a*, 10*b* to rotate towards and away from each other and simultaneously to rotate around the vertical axis of each of the masts 10*a*, 10*b*, both of which rotations are driven by the force of the wind in their respective sail assemblies and booms 13*a*, 13 *b* when the booms are fixably attached to their respective masts 10*a*, 10*b*, meaning, that, this is in contrast to most booms connection points to a mast which permit the boom to move independently of the mast.

This manner of connecting the mast/sail assemblies to the boat does not require the mast to penetrate through the deck and to have a mast stepping system that holds the mast vertical in combination with side stays, forestays and backstays. Not only does this open up the deck area from side stays (and, depending on the specific implementation) fore and back stays, but it further allows the paired mast assemblies to be located on the outside edges of the deck 16 or even to be located (detachably or fixed) outboard on locations on the hull 17.

FIG. 9 depicts a view of the disclosed structures as described in FIG. 8 with the addition of a wind direction indicator arrow across the sails/foil/wings 12*a*, 12*b*. Further, this FIG. 9 includes rotational arrows superimposed on the mast-to-deck connection assemblies 15*a*, 15*b* indicating that the system permits and proscribes that the paired masts rotate synchronously in the same direction as each other at their base. In contrast, the arc movements at the inward ends of the force equalizer spars 11*a*, 11*b* have arc directional arrows showing the opposing directional arcs of the inward ends of the respective inwards end of the force equalizer spar 11*a* of the windward mast 10*a* in contrast to the motion of the inward end of the force equalizer spar 11*b* of mast 10*b*.

In other words, the wind force on sails/wings/foils with booms fixed to their respective masts rotates the masts at or near their base both around the long axis of the mast and rotates the masts to leeward at the connection point to the deck. The inward ends of two force equalizer spars, retractably attached by the dynamic connector 20, move in opposing arcs to each other as the masts to which each of the force equalizer spars is attached rotates as described in the preceding sentence.

A fundamental purpose of utilizing a connector mechanism 20 between the two inner ends of the inward-facing force equalizer spars 11*a*, 11*b* is to use the directional forces of the paired masts 10*a*, 10*b* to offset each other without imparting a heel to the boat while at the same time driving the boat forward. Through this dynamically interconnected system, the masts are dynamically maintained in or near their "resting" position as each movement of one mast and the inner end of its force equalizer spar is matched by an equal and opposite movement of the inner end of the force equalizer spar of its paired mast.

Hence, the inner ends of the two opposing force equalizer spars 11*a*, 11*b* are closest to each other when each Mast is in its neutral (vertical) with the two masts forming parallel vertical lines. In a simple implementation, each mast's boom is fixably attached to the mast, and in the mast's resting state described above, the booms of the paired masts forming parallel horizontal lines along the fore/aft axis of the boat. In a more advanced implementation described in later figures, the sail/boom component encircles the mast using a sleeve structure such that the sail/boom can rotate around the mast and be locked to the mast at any compass point, in which implementation the booms can be in any direction relative to each other while the force equalizer spars retain their inward facing positions.

As the force of the wind on the sails of each of the masts causes the respective masts to (a) tilt/rotate off the vertical (off 90 degrees) in relation to the hull, and (b) to rotate around their cores, the inner ends of the equalizer booms inscribe arcs that increase the distance between them.

In this instance, as the two inboard ends of the force equalizer spars move in arcs away from each other, the connector mechanism activates to return them dynamically to their closest point of approach to each other.

The sail structures can be manufactured in any number of materials, shapes and designs, including, for instance (a) flexible sail materials (with or without battens) in any of the fabrics/materials used by sail manufacturers for sailing vessels ranging from wind-surfers, daysailers, racing one-designs, catamarans, trimarans and other wind-powered vessels and vehicles, (b) wing structures such as used in sail planes (gliders), (c) wing structures with moveable edge components such as used in numerous powered plane wing designs, and (d) next generation plane wing designs such as being researched by MIT engineers in their recently published studies of advanced materials that dynamically form and reform efficient wing shape during operation and independent of motors and wired or wireless powered control systems and surfaces.

FIG. 10 is a front end view of a boat equipped with a single pair of parallel self-righting masts 10*a*, 10*b* with a strut/rigging structure consisting of wire stays 21 at the top of the masts that provide additional support for the force equalizer spars 11*a*, 11*b* to manage the tensions and stresses on the spars as they are used in combination with a dynamic connector 20 to maintain the alignment of the masts in an optimal configuration to transmit the force of the wind on the sails into the desired directional movement of the boat. While the force equalizer spars 11*a*, 11*b* and their associated rigging 21 are depicted as wires and spars, these can be implemented in multiple designs depending on the engineering requirements of a specific type of boat and paired mast system. For instance, an alternate design is a single force equalizer component in the area inscribed by the rigging lines 21.

FIG. 11 is a top-down view of a catamaran equipped with a single pair of parallel self-righting masts with a strut/rigging structure 21 at the top of the masts, providing an additional example of rigging running between each inward end of the force equalizer spars 11*a*, 11*b* to points at the end of spreaders 22. In this implementation, the spreader 22 is situated below the top of the mast and fixed to (or integral with) the mast at approximately the height of the force equalizer spar wherein the spreader runs along the fore-aft axis of the boat. The strut/rigging 21 and spreader 22 can be implemented to provide passive structural support to force equalizer spar to which they are attached, and, if required by the specifications for the design of the boat, can alternatively provide active structural support by control systems that actuate or release tension and form of the strut/rigging and spreaders.

In many of the Figures, the force equalizer spars are depicted as extending outward from the mast in addition to inward. This bi-directional extension works in combination with strut/rigging to provide strength and support as the dynamic connector continually acts to retract the ends of the force equalizer spars to their nearest point in relation to each other.

FIG. 12 is a front end view of a catamaran equipped with a single pair of parallel self-righting masts. A dynamic connector mechanism 20 is, on simple daysailers, constructed of a length of highly tensile resistance band material that is taut when the inboard ends of the two force equalizer spars are at their closest point. The connector mechanism's resistance to stretching as the inboard ends of the two force equalizer spars are forced apart in arcs causes the masts to return to and dynamically remain in their "resting" position, utilizing the offsetting force of the movement of the opposing end of the force equalizer spars.

In other illustrative examples, such as for cargo or container vessels, cruise ships and racing and cruising and other larger and/or more sophisticated contexts, the dynamic connector mechanism may consist of any one of a number of more complex mechanisms, such as hydraulics, user or AI controlled motorized movement restraints utilizing advanced sensors and electronics that track the motion, tensions, stresses and other performance parameters of the masts, sail booms, sail area, wind direction, force equalizer spars, and utilize the user's personal skills and/or algorithms to manage the connector mechanism to constantly monitor and control the separation of the inward ends of the force equalizer spars to maintain the masts in their optimal position relative to wind and other conditions to drive the boat forward.

In certain instances, such as running downwind where the most effective sail boom position is for each of the sail booms to be each swung outboard almost to perpendicular to the fore-after axis of the boat and outwards from each other, the connector mechanism may release tension sufficient to allow for the sail booms to be in such a position, provided, however, that the sail sleeve component described in later Figures obviates that need for releasing the inwards ends of the force equalizer spars, as described in those Figures.

Additionally, the force equalizer spars may be controllably and moveably attached to their respective masts such that their respective positions augment the dynamic connector mechanism's capabilities in maintaining the paired masts in their resting alignment thereby maximizing forward motion translated to the hull while at the same time minimizing heel.

FIG. 13 is a front end view of a catamaran equipped with a single pair of parallel self-righting masts. In illustrative examples of a connector mechanism wherein the connector mechanism is electronically powered, power cables may be run up through the inside of the mast from and out a force equalizer spar to its connector mechanism. Each force equalizer spar may have such a connector mechanism, or one such boom may have the powered connector mechanism, and the other force equalize boom may have an attachment point. For transmitting and receiving commands to and from a powered connector mechanism, the connector mechanism may have a wireless transmitter/receiver and/or may have the signals transmitted along cables running through the mast and outward inside the applicable force equalizer spar.

In certain instance, such as running downwind where the most effective sail boom position is for each of the sail booms to be each swung outboard almost to perpendicular to the fore-after axis of the boat, the connector mechanism may release tension sufficient to allow for the sail booms to be in such a position. Alternatively, as depicted in later figures, the "sleeve" structure of the sail/booms enables the locking (and unlocking) positioning of the respective sails/booms at independent compass points around their respective masts without affecting the inward facing positions of the force equalizer spars.

In implementations where halyards and/or other lines need to be run up the masts, these may be run up the outside of the masts, up channels/tubes inside the masts and/or up channels/tubes in the sail sleeves, each choice depending on the design and performance specifications of the specific boat and paired masts system.

FIG. 14 is a front end view of a catamaran equipped with a single pair of parallel self-righting masts.

Data points that may be collected and analyzed (and presented visually to an operator either to a mobile app or to one or a set of dashboard monitors independently or as part of the connector mechanism and sailboat operations software) include, for instance, the various angles and rotations of the paired masts and their respective sails/booms and force equalizer spars, the stresses and tensions on the various parts of the rigging, the wind direction and strength at various points on the sail area, the masts, booms and rigging, the operational data from the connector mechanism itself (such as, directional retraction/extension, internal temperature, power supply level, external temperature, anti-icing or other temperature control monitoring and actions, angles of rotation and tilt of all parts of the masts, booms, sails and rigging, forces impacting at all points, forces generated (such as forward motion etc).

FIG. 15 is a front end view of a catamaran equipped with a single pair of parallel self-righting masts.

The connector mechanism 15a, 15b of the foot of each mast to the hull (directly or indirectly) allows the mast to rotate in the two planes described in Figures above.

In earlier and other Figures (such as FIG. 16 below), these motions are achieved (and controlled) through a dual attachment mechanism consisting of (1) an eye at the foot of the mast that has a horizontal cylinder or post running through the eye which cylinder runs along the length of the hull above which the mast is located as shown in those Figures, and (2) a neck attached to the eye that runs internally into the vertical column of the mast allowing the mast to rotate around the axis of the neck.

A benefit of horizontal cylinders that extend along a length of the sides of the boat is such a design permits that paired masts may be relocated to more forward or more aft positions along the horizontal cylinder for optimizing performance during a sail. Further, to the extent a design of the force equalizer spars and connector mechanism are selected that operates in this type of paired mast alignment, this permits locating the position of the masts in a paired mast set in positions not precisely opposite each other. The horizontal cylinders may variously also be used as storage lockers, equipment and battery bays and other uses both in relation to the operation of the paired mast system and otherwise in relation to the operation and use of the boat generally.

Other illustrative examples of the attachment mechanism of each mast directly or indirectly to a hull involve a similar dual synchronized rotational capability for the paired masts while imparting forward motion from each sail to the hull. For instance, in later Figures, alternate connector mechanisms that permit the proper rotational motions of the masts are depicted.

FIG. 16, is a side view of a catamaran equipped with two pairs of parallel self-righting masts.

Each set of paired masts 10a, 10b have opposing force equalizer spars 11a, 11b with dynamic connectors 20 that dynamically draws each of the paired mast sets back to their original (mast vertical) position when the wind hits their sail causing the ends nearest each other of the force equalizer spars to move in opposing directions and increasing the space between them. The attachment/connector mechanisms 15a, 15b located at the foot of each mast perform the function of moveably attaching the masts to hull (directly or indirectly) while at the same time enabling and containing/directing the rotational motions of the mast described in earlier figures. This Figure further depicts fore-and-aft rigging 24 that provides for-and-aft stability to the masts by running from the bow end of a set of horizontal poles 23a to the aft end of the horizontal poles (or, alternatively to other fore/aft structural attachment points on the hull, such as the bow and stern of each of the hulls of a catamaran).

In this FIG. 16, horizontal poles 23a (to which masts 10a, 10b are inward/outwardly rotationally attached by a connector mechanism 15a) are attached to a deck or hull of a boat by their own connectors 25. These connectors 25 may be integral to the horizontal poles, or separate components. Further, depending on the design specifications for a specific or class or type of boat, the horizontal poles 23a, 23b and pole-to-deck connectors 25 may be implemented per mast, rather than a single, long horizontal pole for all paired masts (such as the two sets of paired masts depicted in this Figure). Later figures depict alternate designs for components 23a, 23b, 25 and 15a, 15b that all permit and constrain the rotational mast movements necessary to effectuate the opposing arcing of the inward ends of the force equalizer spars in each paired mast set which opposing arcing is regulated by the dynamic connectors 20.

Multiple and various other designs and implementations of what are depicted here as horizontal poles/cylinders may be implemented depending on the specific design, performance and use specifications for a boat so long as the designs permit and constrain the rotational mast movements necessary to effectuate the opposing arcing of the inward ends of the force equalizer spars in each paired mast set which opposing arcing is regulated by the dynamic connectors 20.

FIG. 17 is a close up, side view of the bow portion of a catamaran equipped with a two pairs of parallel self-righting masts, as described in FIG. 16.

Each set of paired masts have opposing force equalizer spars attached via a mechanism that dynamically draws them back to their original (mast vertical) position when the wind hits their sales causing the ends nearest other of the force equalizer spars to move in opposing directions and increasing the space between them.

The attachment mechanism of the foot of each mast to the hull (directly or indirectly) allows the mast to rotate (or pivot) in the two planes, while at the same time translating the lift force created by the sails into forward motion of the boats. By the bifurcated system of attaching the masts to the deck, the motion of the masts is controlled by and regulated independently of the hull of the boat.

FIG. 18 is a view of the top portion of a single paired self-righting masts set, with masts 10a, 10b; opposing, inward facing force equalizer spars 11a, 11b; dynamic connector 20; mast 10b's sail boom 13; and fore-and-aft rigging/stays 24 for mast 10a. FIG. 18 shows a passively activated dynamic connector 20 that acts to return the inwards ends of the paired opposing force equalizer spars to their closest position relative to each other whenever they are drawn apart by the independent rotational motions of the masts to which they are respectively attached.

FIG. 19 is a top view of the bow portion of a catamaran equipped with two pairs of parallel self-righting masts. FIG. 19 shows another view of a passively activated dynamic connector 20 that acts to return the inwards ends of the paired force equalizer spars 11a, 11b to their closest position relative to each other whenever they are drawn apart by the independent motions of the masts to which they are respectively attached.

FIG. 20 is a top view of a bow portion of a catamaran equipped with two pairs of parallel self-righting masts. When wind hits the sails/wings/foils of each of the masts 10a, 10b in a paired set, inboard ends of their force equalizer spars 11a, 11b move in precisely opposing directions, and, hence, activate the dynamic connector mechanism 20 such that the inboard ends of each of the force equalizer spars are returned to their original position nearest to each other, which continuously maintains the masts in their upright positions as the wind shifts in intensity and direction relative to the direction of the boat, and the lift from the sails is directed to the forward motion of the boat, without causing heeling because the motion of the masts is controlled by and regulated independently of the hull of the boat.

FIG. 21 is a view of a top portion of a single pair of parallel self-righting masts. FIG. 21 shows another view of a passively activated dynamic connector 20 that acts to return the inwards ends of the paired force equalizer spars 11a, 11 b to their closest position relative to each other whenever they are drawn apart by the independent motions of the masts 10a, 10b to which they are respectively attached.

FIG. 22 is a top view of a portion of a boat equipped with two sets of paired, parallel self-righting masts wherein the Figure depicts a set of force equalizer spars connected by a dynamic connector 20 of one of the paired sets of masts, and, to the stern of that pair, a single mast of the second paired set of masts. FIG. 22 depicts the extension (and hence increased retraction force) of an illustrative example of a force equalizer connector 20 mechanism, which extension is created by the dual rotations of the pair of masts (set on opposing sides of the boat from each other) that are connected by the dynamic connector 10 that drive the inboard end of the windward mast's force equalizer spar to inscribe an arc towards the bow and downwards when the wind hits the sail of that (windward) mast. In FIG. 22, the corresponding and opposing arc of the inboard end of the leeward mast's force equalizer spar is not depicted. FIG. 23 is a side view of the bow portion of a boat equipped with a set of paired, parallel self-righting masts 10a, 10b with a wind indicator 18. Wind indicator arrow 18 indicates a direction and force of wind on the sail booms, causing each of the masts to rotate to leeward and to rotated around its vertical axis as the ends of the sail booms 13a, 13b inscribe an arc to leeward, thereby causing the inward end of the windward mast's force equalizer spar 11a to inscribe an arc downwards and towards the bow and the inward end of the leeward mast's force equalizer spar 11b to inscribe an arc upwards and to the aft. The opposing arcs of the two ends of the connected force equalizer spars are dynamically offset by the dynamic connector 20 mechanism that attaches to the two inward ends of the force equalizer spars and continuously activates to cause them to return to their position nearest to each other, inhibiting their ability to inscribe the arc, and convey the lifting force to the boat at the point where the base of each mast connects to the hull or deck by a combination of base of mast attachment components 15a, 15b, horizontal poles 23a, 23b and pole-to-deck connectors 25 which permit the masts to move independently of the deck of the boat, while imparting forward motion to the boat through or on the water.

The hull or hulls may be constructed of multiple types of materials depending on the design and specifications of the boat. For instance, hulls can be manufactured of wood, plywood, aluminum, fiberglass, carbon fiber and other composites, and a combination of the foregoing. Similarly, a single hull sailboat or a trimaran's three hulls could be similarly constructed. An inflatable or partially inflatable hulled boat (whether single hull, multi-hull or dinghy-style) can effectively utilize the system of the combination of base of mast attachment components referenced in the preceding paragraph (utilizing, in part, the horizontal pole) without placing traditional mast-based loads on the inflatable hulls.

FIG. 23 further depicts fore-and-aft rigging 24 for each of the paired masts 10a, 10b for certain implementations of the self-righting paired mast system where the loads on the masts require additional fore-and-aft support in addition to that provided by the combination of base of mast components.

FIG. 24 is a similar depiction from another angle as FIG. 23.

FIG. 25 is a top view of the bow portion of a boat equipped with a set of paired, parallel self-righting masts. The orientation of the booms 13a, 13b and force equalizer spars 11a, 11b of each of the masts 10a, 10b indicates no wind, otherwise, with wind, their relative position to each other as between those of each mast would be aligned such that, for instance, the downwind ends of the booms 13a, 13b would both be away from the direction of the wind.

This figure shows a passively activated dynamic connector 20 that, when activated, acts to return the inwards ends of the paired force equalizer spars 11a, 11b to their closest position relative to each other whenever they are drawn apart by the independent motions of the masts to which they are respectively attached.

If wind were coming across the side of the hull at the bottom of the Figure (making the port side of the boat (bow to the left of the Figure) the windward side of the boat), then the leeward boom would be rotated outwards from the starboard side (the Figure does not show this effect) and hence, the leeward mast's force equalizer spar's 11a inboard end would be moved towards the stern of the boat (versus what is depicted here where the wind effect is not included in the orientation of the masts, as similarly in some of the other figure's photos). In other words, instead of the ends of the force equalizer spars 11a, 11b being both rotated to the same end of the boat, in actuality with wind force applied, the ends of a paired set of force equalizer spars move in opposite directions, thereby activating the dynamic connector 20 to return them to their closest position relative to each other.

FIG. 26 is a top view of the bow of a boat equipped with two sets of paired, parallel self-righting masts. The orientation of the booms indicates no wind, as more fully explained for the preceding Figure. FIG. 26 depicts a vertical view from above the tops of a paired set of masts demonstrating the open deck area 16 that is created by masts located at the sides of the hull, and side stay rigging replaced by masts paired together by way of the force equalizer spars attached at their inward ends by the force connector mechanism. This contrasts with traditional mast locations at the center-line of the deck (and, generally, also going through the deck to a footing or other mast support structure underneath or below the deck), and, wherein, frequently side-stays are additional used to support the mast, and additional centerline rigging and sail and boom control mechanisms (ropes, pulleys, travellers, downhauls and related) all directly impair and limit the available areas on, above and even below the central deck. By removing all that, the paired mast system opens up these areas for various uses such as on-deck storage, superstructure, cargo stacking, housing and other uses.

Further, by creating a self-regulating, integrated mast/sail/boom system, the sailing is simultaneously highly simplified and with enhanced capabilities (such as sailing in reverse) over prior sailboat designs. In the context of scientific studies showing serious degradation of oceans and other waterways caused in part by boats with combustion engines and boats driven by propellers (causing, for instance, acoustic interference with orcas and other marine life, as well as compromised mixing of surface and subsurface ocean layers) and other motor-driven propulsion systems, advances in and broadened application of sail/wind powered systems for a wide range of boat designs (everything from small and large inflatable hull boats and recreational daysailers to the most advanced racing sailboats to large cargo container ships and cruise ships) become imperatives.

FIG. 27 is a front view of a catamaran-type boat equipped with a deck 16; two hulls 17; two sets of paired, parallel self-righting masts 10a, 10b; horizontal poles 23a, 23b and pole-to-deck connectors 25. The masts are moveably connected to the horizontal poles, and, separately, the horizontal poles are attached to the deck. The slack orientation of booms 13a, 13b and force equalizer spars 11a, 11b indicates no wind. FIG. 27 depicts an attachment mechanism of the base of each of a paired set of masts implemented as eye bolts that attach the base of each of the masts indirectly to the hull/deck via the horizontal poles 23a, 23b. Each of those eye bolts, with pressure on the sails, drives the eyebolt forward to contact the mechanisms attaching the horizontal poles 23a, 23b (in this Figure, also eye bolts 25 bolted through the deck), thereby translating lift from the wind in the sails to forward motion for the hull. This system controls for and minimizes the forces of traditional mast designs (e.g., with masts fixably attached directly to the hull, and frequently supported additionally by side stays) that impart heel to the hull.

In FIG. 27 (and in other provided figures), the rigging and dynamic connector mechanism are not at full tautness, and hence the masts are not being maintained in their full vertical and parallel aligned positions. The slack orientation of these components, such as of booms 13a, 13b and force equalizer spars 11a, 11b, indicates no wind.

While eyebolts are depicted in this Figure both for attaching the masts to the horizontal poles permitting synchronized inward and outward rotation of the paired mast sets, and providing fore-aft vertical orientation to the masts, many other connector mechanisms that perform these functions replace these eyebolts for designs requiring or desiring specifications for which eyebolts are not the optimal choice or configuration. Some alternate designs are depicted in later Figures.

Additionally, for the horizontal poles 23a, 23b and their eyebolt attachments 25 to the deck 16, many other mechanisms that perform these functions replace these components for designs requiring or desiring specifications for which these components are not the optimal choice or configuration. Some alternate designs are depicted in later Figures.

FIG. 27 further depicts a side and front view from the bow demonstrating the open deck 16 area that is created by masts 10a, 10b located at the sides of the hull, side stay rigging replaced by masts paired together by way of the force equalizer spars 11a, 11b attached at their inward ends by the force connector mechanism 20.

FIG. 28 is a close-up view of a base of a mast of a set of paired, parallel self-righting masts showing an indirect connector system that includes the following (a) the base of the mast is permitted to rotate inward or outwardly, but constrained in its movement in other directions; (b) heeling forces on the hull from the masts are controlled and minimized; and (c) forward directed forces on the mast are translated into forward motion of the hull.

The attachment mechanism of the foot of each mast to the hull (directly or indirectly) allows the mast to rotate (or pivot) in the two planes while at the same time imparting the lift from the wind in the sails to propel the boat forward in the water.

FIG. 29 is a different view of a close-up view of the base of one mast of a set of paired, parallel self-righting masts depicting comparable components and structures as described in FIG. 28.

FIG. 30 is a side view of bases of both masts of a set of paired, parallel self-righting masts. This figure depicts mirroring connector systems and components at the bases of both masts in a paired set of masts. By permitting, controlling and constraining to synchronized movement of the masts at the base of the masts, and, as depicted in other Figures at the top of the masts via the dynamically connected force equalizer spars, as well as the boom fixed to a compass point on the mast, a holistic self-righting system for powering vessels directionally is implemented.

FIG. 31 is a top view of a boat equipped with two sets of paired, parallel self-righting mast systems.

Four eyebolt connectors 25 bolted through a deck depict a system whereby each of a set of paired mast assemblies are removably attached from the deck (or hull) of the boat.

In this illustrative example, rigging is also attached to a component (the horizontal poles) that are removably attached to the hull/deck. In another illustrative example, the rigging may be attached directly to points on the deck or hull.

Further, this figure conveys that rigging, booms, mast and mast assemblies are entirely away from the main center deck area, and are installed and aligned along the outside fore-and-aft edges of the hull or deck, except at the tops of each of the two sets of paired masts wherein the inward facing force equalizer spars 11a, 11b over-reach the deck 16, at a height that enables free movement of people and whatever cargo or infrastructure is desired to be placed on the deck.

The connectors 25 to the deck 16 depict a system whereby the mast assemblies are removably attached from the deck.

Further, as the disclosed structure maintains sail booms 13a, 13b along a fore-and-aft axis of a boat at each of the sides of the boat, the booms are manageably prevented from sweeping over the deck area with its open space, cargo and/or infrastructure. In certain illustrative examples, the sail booms may be placed at a height above the deck in, for instance, the case in which the cargo or infrastructure on or above the deck inhibits wind flow and hence obviates the efficacy of sail area below a certain point of the masts.

Alternatively, the sail booms themselves may be moveably attached to a mast such that they can be lowered or raised vertically, but remain fixably attached in terms of translating wind on their sails to rotate their mast around the mast's vertical axis.

FIG. 32 is a close-up view of a base of a mast of a set of paired, parallel self-righting masts depicting a similar configuration of components as FIGS. 28 and 29. An attachment mechanism between the foot of each mast and the hull or deck (directly or indirectly) allows the mast to rotate (or pivot) solely in two planes at 90 degrees to each other in this instance, and, more generally, solely in the rotational motions required for the synchronized action of all the components of each of the sets of paired masts independently from the deck and hull.

FIG. 33 is two views of a top of a mast 10a (of a set of paired, parallel self-righting masts) depicting a structure 27 for enabling the mast to rotate independently of fore-and-aft stays/rigging while utilizing the fore-and-aft rigging to provide fore-and-aft alignment support for the mast in implementations requiring such rigging. Any number of structures may be implemented for achieving this purpose, with the components and design being selected based on the performance and other specifications for the entire boat. Holes at either end of the structure 27 enable connections of fore and aft stays, while the pin at the top center of structure 27 enables the mast to rotate independently of structure 27.

FIG. 34 is a close up view of a base of a mast 10a (of a set of paired, parallel self-righting masts) wherein the base of the mast is set on a pin 30 which pin is integrally part of a component 28 that rotates around the long axis of the horizontal pole 23a.

The connection point between the top of the pin and the base of the mast may include connections for electronics that run up the inside of the mast, such as to control the dynamic connector 20, or otherwise for controlling key surfaces, weather and wind measurement equipment at or on the mast, and for other required uses. Similarly, the sail/sleeve component described in various figures may also have connection points to the mast or to a mast base sleeve for power and data information flow from the sail and controllable and/or measurable sail components and surfaces.

Any of these components that permit and control rotational movement can include ball bearings and other passive and non-passive control and enabling components used in commercial and industrial contexts requiring rotation of components in assemblies.

FIG. 35 is a view of a mast 10a (of a set of paired, parallel self-righting masts) wherein the mast, sail, boom and fore equalizer are a single integrated unit, and in which attachment mechanisms to the deck (and related components) are as described in FIG. 34. Further, a force equalizer spar 11a of mast 10a is depicted, together with a schematic of a dynamic connector 20 to the inward end of the opposing paired mast's force equalizer spar 11b.

FIG. 36 is a view of a mast of a set of paired, parallel self-righting masts wherein the mast is foldable and wherein a different design for the attaching the integral mast/sail component to its associated horizontal pole 13a is depicted. In this FIG. 36, the mast folds at its base by three vertically aligned bolt holes, wherein the bolt holes hold the mast in vertical position when bolts are run through the holes and associated holes in the mast when the mast is upright. Alternative ways for releasably holding a folding mast upright are used in contexts where the specifications, performance and other design parameters of the paired masts indicate an alternative to the bolt holes is preferred.

FIG. 37 is a view of a mast 10a (of a set of paired, parallel self-righting masts) wherein the entire combined mast structure and horizontal pole has attachment structures 34 for attaching (and detaching) the structure to the side of a hull of a boat. This permits, for instance, the retro-fitting of one or more pairs of self-righting masts to boats that were not originally designed for sail power, such as, for instance, container ships, cruise ships and research vessels.

For ships where the facilities for docking and unloading/loading of people and cargo do not permit extra space for these structures, they can be attached after the ship has left its dock and/or harbor, utilized for assisted wind power propulsion during the transit of the journey, and removed prior to entering the destination harbor or docking facilities.

FIG. 38 is a schematic of a mast 10b inside of an integrated sail component 12b that incorporates a sleeve that surrounds the mast 10b, and which includes a locking mechanism 34b that is utilized to lock the sail component at a compass point to the mast such that (a) a force on the sail translates to rotation of the mast (of the rotations permitted and managed by the components described in other Figures), and (b) that, consequently, moves the inward end of the mast's force equalizer spar 11b in its intended arc (as described in other Figures).

In this figure, a mast 10b rotates around a horizontal cylinder 23b by way of a circular eye bolt 15b that rotates around the horizontal cylinder. Later Figures depict a mast that is fixably attached to a horizontal cylinder that, itself, pivots/rotates to effectuate and manage the permitted rotations for the paired mast system as described in other Figures.

FIG. 39 is a view of open cylindrical holders for mast bases with mast-base holder sleeves 33a, 33b rotated (or pivoted) inwards wherein the mast base sleeves are fixably attached to horizontal pivoting (rotating) side cylinders.

Port side of a paired mast system: The port-side mast-base sleeve 33a (base of mast fits into this), sleeve-to-horizontal cylinder connector component 15a and pivoting port-side horizontal cylinder are connected to the deck by components 25.

Starboard side of a paired mast system: The starboard-side mast-base sleeve 33b (base of mast fits into this), sleeve-to-horizontal cylinder connector component 15b and pivoting starboard-side horizontal cylinder are connected to the deck by components 25.

FIGS. 40a, 40b and 40c show the rotation of a mast base holder 33b from inboard on the deck through vertical to outboard around the long axis of one side of a boat.

FIGS. 41a, 41b and 41c show a similar rotation of the second mast (of the paired masts) holder on the opposite side of a boat.

FIGS. 42a, 42b, 42c, 42d and 42e show a mast 10b (with sleeve sail 12b) being inserted in a mast holder 33b, as well as a sail sleeve's mast compass point locking mechanism 34. The provided sequence of figures shows the starboard side mast (inserted inside its sail/sleeve) with the base of the mast being inserted into the pivoting mast-base sleeve.

The mast 10b (and its positionally locked sail 12b) rotates freely around its vertical axis inside the mast-base sleeve 33b. Further, the mast 10b pivots inwardly and outwardly around the long axis of the horizontal pole (either fixably with the pole rotating, or via a mechanism that rotates around the pole, each as described in preceding Figures). Consequently, the intended dual rotations of a mast 10b are permitted within the design parameters for the paired mast set to operate to perform its intended function of a self-regulating wind propulsion system for directionally moving a vessel.

FIGS. 43a, 43b, 43c and 43d depict a sail with integral sleeve 12b rotationally locked to its mast (not visually depicted because the mast component is inside both the sail/sleeve 12b and the base of mast holder sleeve 33b) at a variety of compass points around the mast. This system permits the inward end of the force equalizer spar to be pointed inward at the inward end of its paired mast's force equalizer spar regardless of the compass point around the mast at which the sail/sleeve is locked. Consequently, the benefit of positioning the sail/sleeve optimally for maximum directional power for the boat in relation to the direction of the wind is combined with the benefit of dynamically connected, inward-facing force equalizer spars. The provided sequence of drawings shows a starboard side sail/sleeve (with its mast inserted inside it and with the sail/sleeve locked at a rotational (around mast's vertical axis) compass point to the mast such that the sail/sleeve and mast act as a single, integral unit) rotating around the vertical axis of the mast independently of the mast-base sleeve.

Mast-base sleeve 33b and horizontal cylinder allow a combined mast and sail/sleeve 12b to rotate around the vertical axis of the mast, while themselves (together with the combined mast and sail sleeve) pivot around the horizontal axis of the cylinder. For clarity in the preceding sentence, the references to the vertical axis and horizontal axis are not references to the physical components, but only to the respective axis lines.

FIGS. 44a, 44b, 44c and 44d depict an opposing mast structure (of the paired mast set of FIGS. 43a, 43b, 43c and 43d). This sequence shows a port side mast (inserted inside its sail/sleeve) with the base of the mast being inserted into a pivoting mast-base sleeve. The mast and sail/sleeve thereby are controllably enabled to rotate around the vertical axis of the mast independent of the mast-base sleeve and cylinder. The mast and sail/sleeve are locked to each other at a selected one of a number of rotational compass points around the vertical axis of the mast via a system, in this instance comprising removable locking pins 34.

FIGS. 45a and 45b depict a top view of a set of paired dynamically regulated paired masts, with one of the paired combined mast/sail structures 12b rotating away from its opposing paired combined mast/sail 12b on the opposite side of the deck as its mast-base sleeve rotates outward around the long axis of its combined horizontal pole and pole/mast-base sleeve system (33b and 15b) along the side of the side of the boat, and, independently, a combined mast and sail sleeve/tube 12a inserted into and rotating around the vertical axis of its mast base sleeve 15a as that sail/sleeve 12a is locked at various compass points around its mast inside the sail component.

FIGS. 45a and 45b depict the masts/sail sleeves/mast-base sleeve and cylinder rotating as a single unit around the horizontal axis of the cylinder while the masts/sail sleeves rotate (independently of the mast-base sleeve and cylinder) around the vertical axis of the mast.

Solely for purposes of emphasis in depicting these two independent rotations in FIGS. 45a and 45b, the dynamic connectors of the force equalizer spars at the top of these pairs masts have been loosened (albeit not necessarily detached) from each other. Otherwise, the two masts would move synchronously.

A component-based rotational control setting system 34 for setting the sail/sleeve at a specific compass point around the vertical axis of the mast is, in this instance, implemented as done by hand to unlock the sail/sleeve, rotate it to the desired rotational compass point around the mast and then re-lock the sail/sleeve to the mast such that they then act as an integral unit. In other implementations, as driven by the design specifications and performance parameters of a paired mast system and a vessel, the component-based rotational control setting system 34 may be motor-driven, effectuated by ropes and pulleys or otherwise managed using systems for locking and unlocking a sleeve component at various compass points around a structural piece internal to the sleeve component. Further, the sleeve component may be constructed of similar or different materials from the mast, and may be one seamless tube, or a tube with multiple parts and/or openings, such as to lighten and strengthen the sleeve component. Further, the sleeve component may be integrally constructed with its sail such that the entire sail/sleeve/boom consists of an integral wing component with or without control surfaces and internal surface control mechanisms such as wings on gliders and wings on powered aircraft. Alternatively, any type of fabric-type material (with or without battens) such as sails used in daysailer boats and high performance racing sailboats may be used for the sail, and whereby the sail is connected to the sleeve in any manner used for connecting sails directly to masts on traditional mast/sail designs, including the ability to raise and lower the sail and remove it and exchange it for a different sail with a different set of performance characteristics (such as light wind versus heavy wind condition sails, and/or larger or smaller dimension sail areas).

FIG. 46a shows a top-down view of the inward ends of the force equalizer spars 11a, 11b with dynamic connector component 20 detached from the inward end of a port side force equalizer spar.

FIG. 46b shows a top-down view of the inward ends of the force equalizer spars 11a, 11b with the dynamic connector component 20 attached to each inward end of the two force equalizer spars of this paired mast set.

Further, FIGS. 46a and 46b depict a mast 10a inside a sail/sleeve component 12a, with a force equalizer spar 11a of that mast fixably attached to its mast at a point above the combined sail/sleeve component 12a. Rotation of mast 10a thereby directly effectuates motion of force equalizer spar 11a thereby causing the inward end of the force equalizer spar to inscribe an arc as described in previous Figures. By unlocking sail/sleeve 12a from mast 10a, the orientation of the sail/sleeve to the wind can be set independently of changing the inward direction of force equalizer spar 11a until the sail/sleeve 12a is again locked to mast 10a at which time the locked sail/sleeve 12a and mast 10a act as an integral unit such that pressure of the wind on the sail/sleeve 12a causes the inward end of force equalizer spar 11a to inscribe an arc away from the inward end of its opposing force equalizer spar 11b, thereby activating the dynamic connector mechanism (automatically or controlled otherwise) to retract the two inward ends of the force equalizer spars back to their nearest position, which rights the entire paired mast system on a self-regulating, dynamic basis.

FIG. 47 shows a top view of a boat with a single set of paired masts with structures/components as depicted in FIGS. 38-46. FIG. 47 shows a top-down view of the entire assembly of a paired, side-to-side mast system, including masts 10a, 10b; inward pointing force equalizer spars 11a, 11b fixably attached to each mast; sail/wing/foil sleeves 12a, 12b movably inserted over the masts; rotational locking systems to lock the sails/sleeves to the masts; and mast-base sleeves and cylinders that rotate with the masts around the horizontal axis of the cylinders but do not rotate when the masts rotate inside of the mast-base sleeve around the masts' vertical axis.

FIG. 48 is a top view depicting opposing and off-setting arc motions of inward ends of two force equalizer spars 11a, 11b in a set of paired masts based on the wind direction. FIG. 48 shows a wood arrow 18 as a wind indicator, that approximately demonstrates that (1) the force of the wind causes the combined, locked sails/masts 12a, 12b to move in the same direction (to leeward), (2) as these move in the same, synchronized direction, the ends of the force equalizer spars move in opposing directions with the inward end of the windward mast's force equalizer spar 12a moving in arc towards the bow of the boat and downwards and the inward end of the leewards mast's force equalizer spar moving in an arc towards the stern of the boat and upwards, (3) the sails/sleeves in locked position relative to the masts cause the masts to rotate (around their vertical axis) and pivot around the base which causes the ends of the force equalizer spars to inscribe the described opposing arcs, and (4) the dynamic connector 20 at the ends of the force equalizer spars acts to restrain and retract the integrated, self-synchronizing system to its original orientation of vertical masts.

FIG. 49 shows closer-in top view of the tops of a single set of paired masts with the structures depicted in FIGS. 38-46.

FIG. 50 shows a closer-in top side view of the bases of a single set of paired masts with the structures depicted in FIGS. 38-46, as follows:

Port: Port sail/sleeve with mast inside 12a
Port-side mast-base sleeve with mast inside 33a
Port-side mechanism locking the sail/sleeve to the mast at a variety of compass points
Port-side deck attachment system 25 for attaching the horizontal, rotating set of components 25
Starboard: the starboard side mirror to the port-side structures/components/systems described above.

FIG. 51 shows a top/front view of a boat with a single set of paired masts with the structures depicted in FIGS. 38-50.

FIG. 52 shows a front view of a boat with a single set of paired masts with a deck area unimpeded by masts, rigging or lines. This figure depicts the boat of FIG. 51 with the central deck area used for seating for a day-sailing type boat category. This demonstrates an example of a use of the anti-heeling capability of the paired, side-to-side masts wherein the mast/base systems control and minimize a heeling force of the wind on the sails to the hull. The capability of managing heeling (including in combination with an open deck area with no mast, overhead boom or overhead sails and associated control deck lines and systems such as mainsheets, pulleys, rackets and winches) is usefully applied in multiple contexts, such as for enabling wheelchair or other limited mobility sailors, working and research vessels (small, medium or larger), people transport boats, and other contexts.

Other illustrative examples, for example, include cruising catamarans with housing and living and dining area superstructure in the center area and in the hulls, and single-hull container ships (wherein the mast-base and cylinders detachably attach to the exterior of the hull(s) such that, for instance, a container ship utilizes the sails during ocean voyages and tender boats detach the sails prior to the container ship entering harbor such that the container ship passes under bridges and docks at standard-boat container ship docks) with the center deck area used for shipping containers and/or superstructure.

It will be readily observed by those persons of ordinary skill in the art that the various components that comprise parallel (dual side-by-side) self-righting paired masts described herein may each be implemented using any of several known off-the-shelf components. For example, the masts and spars may be constructed in a manner similar to masts, spreaders, booms and rigging used on current sailboats, such as from wood, aluminum or carbon fiber. The components used attachably between the ends of a set of paired force equalizer spars may be constructed of any number of materials, such as elastic cords, hydraulics, electromechanical systems and wires and motors, with some being passively activated and some being powered. Also, for example, electronic componentry, if any, and whether or not controlled in part or in whole remotely, wirelessly and/or by a human power, AI, or other controller, may be constructed of electronic components, receivers, transmitters, pre-installed code and remotely installed code/app(s) on a mobile or other device, which remote, wireless connectivity may include a secure identification system for providing control over the force equalizer spars' dynamic connective system's internal electronic components and circuitry exclusively to authorized device(s), and in an illustrative example including encryption.

Additionally, various companies can be utilized to source the fabrication and assembly of components.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the illustrative examples of the invention (especially in the context of the following claims) are to be construed to cover both the singular and the plural, unless otherwise indicated herein or clearly contradicted in the context. The terms "comprising," "having," "including" and "containing" are to be construed as open-ended terms (i.e., meaning "including, but not limited to") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Illustrative examples of this invention are described herein. Variations of those illustrative examples may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Accordingly, the invention should only be limited by the appended claims and equivalents thereof, which claims are intended to cover such other variations and modifications as come within the spirit and scope of the invention.

What is claimed is:

1. A vessel, comprising:
    at least one hull,
    at least one set of paired masts,
    wherein each paired mast of the at least one set of paired masts has a first mast located to one side of the vessel and a second mast located on the opposite side of the vessel, and
    wherein each mast of the at least one set of paired masts has a spar located at or near the top of the mast, and
    wherein each one of the spar located at or near the top of the mast extends inwards towards a center plane of the vessel, and an inward end of the spar is connected by a connector to another inward end of another one of the each one of the spar located at or near the top of the mast, and
    wherein the connector imparts a dynamic force upon connected spars that responsively pulls the connected ones of the inward ends of the spars to their nearest position when tops of the masts to which the spars are fixably attached move away from a relative nearest position to a paired one of one set of paired masts.

2. The vessel of claim 1 wherein each mast is removably attached to the hull.

3. The vessel of claim 1 wherein each mast is attached to a component, wherein the component is removably attached to the hull.

4. The vessel of claim 1 wherein a sail boom of each mast is fixably attached to the mast.

5. The vessel of claim 1 wherein an attachment point of each mast to the hull permits the mast to rotate around a vertical axis and, separately and simultaneously, to rotate inwardly and outwardly.

6. The vessel of claim 1 wherein each one of the at least one mast, and corresponding mainsail booms and mainsails are an integral unit resembling a wing on an aircraft.

7. The vessel of claim 1 wherein the connector comprises an elastic material.

8. The vessel of claim 1 wherein the connector comprises a motorized element.

9. The vessel of claim 1 wherein the connector comprises a hydraulic element.

10. The vessel of claim 1 wherein the connector comprises an electro-mechanical element.

11. The vessel of claim 1 wherein the connector comprises a set of components.

12. The vessel of claim 11 wherein the set of components is wirelessly controlled.

13. The vessel of claim 11 wherein the set of components is controlled by a set of code comprising machine learning.

14. The vessel of claim 11 wherein the set of components is powered and controlled by wires leading from each of the spars through their respective masts to the hull of the boat.

15. The vessel of claim 1 wherein a sail for each mast of the at least one set of paired masts incorporates a hard surfaced-sleeve,
    wherein the hard-surfaced sleeve fits over the mast from a point near a base of the mast to a point below a fixed attachment point of a respective spar of the mast, and wherein the hard-surfaced sleeve rotates freely 360 degrees around the mast until locked by a locking mechanism to a compass point on the mast, and wherein at which time the mast and the hard-surfaced sleeve move as a single unit.

* * * * *